(12) United States Patent
Morishima

(10) Patent No.: US 8,728,976 B2
(45) Date of Patent: May 20, 2014

(54) PRINTING PAPER FOR PRINTING STEREOSCOPIC IMAGE, STEREOSCOPIC IMAGE PRINTED MATTER, AND METHOD FOR PROVIDING STEREOSCOPIC IMAGE

(75) Inventor: Shinichi Morishima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 217 days.

(21) Appl. No.: 13/317,642

(22) Filed: Oct. 25, 2011

(65) Prior Publication Data

US 2012/0107530 A1    May 3, 2012

(30) Foreign Application Priority Data

Oct. 28, 2010 (JP) .................. 2010-242854

(51) Int. Cl.
*B41M 5/50* (2006.01)
*G03C 8/02* (2006.01)

(52) U.S. Cl.
USPC ........ 503/227; 428/1.31; 428/32.11; 430/200

(58) Field of Classification Search
USPC ................ 428/1.31, 32.11; 430/200; 503/227
See application file for complete search history.

(56) References Cited

FOREIGN PATENT DOCUMENTS

| JP | 5-210182 | 8/1993 |
|---|---|---|
| JP | 7-261024 | 10/1995 |
| JP | H08-095176 A | 4/1996 |
| JP | 2010-152351 A | 7/2010 |

*Primary Examiner* — Bruce H Hess
(74) *Attorney, Agent, or Firm* — Jean C. Edwards; Edwards Neils PLLC

(57) ABSTRACT

Provided is printing paper for printing a stereoscopic image, including a light-transmitting image-receiving layer (12) and a linear polarizing layer (14), wherein a linear polarizing layer is patterned in a first domain and a second domain whose directions of polarizing axes are at an angle of 90° with respect to each other.

10 Claims, 5 Drawing Sheets

MASK A

MASK B

PATTERNED LINEAR POLARIZING LAYER

PRINTING PAPER FOR PRINTING STEREOSCOPIC IMAGE, STEREOSCOPIC IMAGE PRINTED MATTER, AND METHOD FOR PROVIDING STEREOSCOPIC IMAGE

CROSS-REFERENCE TO RELATED APPLICATIONS

This application claims priority from Japanese Patent Application Nos. 2010-242854, filed Oct. 28, 2010, the contents of which are hereby incorporated by reference in their entirety.

BACKGROUND OF THE INVENTION

1. Field of the Invention

The present invention relates to a stereoscopic image printed matter with stereoscopic display of an image, a printing paper therefor, and a method for providing the stereoscopic image to a viewer.

2. Description of the Related Art

Conventionally, various methods have been proposed as a method for producing a stereoscopic image printed matter. For example, JP1993-210182A (JP-H05-210182A) suggests a method for producing a stereoscopic image printed matter including mixing a left eye pixel and a right eye pixel in a certain arrangement, wherein a polarization filter is disposed on an upper surface of the left eye pixel and right eye pixel, a quarter-wave plate is further laminated on the polarizing film, and a polarizing axis of the polarizing film and a retardation axis of the quarter-wave plate are at an angle of ±45° with respect to each other for the left eye and for right eye.

SUMMARY OF THE INVENTION

According to the foregoing conventional method, when printed matter is observed by a viewer wearing circular polarized glasses, the printed matter can be recognized as a stereoscopic image with a sense of depth. However, there is a need for improvements, because the occurrence of crosstalk or ghost images may be observed.

Therefore, the present invention has been made in view of the above conventional problems, and it is an object of the present invention to reduce crosstalk and ghost images of the stereoscopic image printed matter. More specifically, the present invention is intended to provide a stereoscopic image printed matter with reduced crosstalk or ghost images, a stereoscopic image printing paper capable of printing the stereoscopic image, and a method for providing the same stereoscopic image printed matter.

As a result of various investigations, the inventors of the present invention have discovered that although the foregoing related art describes the delineation of a right eye pixel and a left eye pixel on a planar sheet, the formation of a desired right eye pixel and left eye pixel may fail depending on the nature of a planar sheet, which is responsible for the occurrence of crosstalk and ghost images. Based on these findings, further investigations have been made and thus the present invention has been completed.

The above and other objects can be accomplished by the provision of the following means.

[1] A printing paper for printing a stereoscopic image including a light-transmitting image-receiving layer and a linear polarizing layer, wherein the linear polarizing layer is patterned in a first domain and a second domain whose directions of polarizing axes are at an angle of 90° with respect to each other.

[2] The printing paper according to [1], wherein the linear polarizing layer is a coating-type linear polarizing layer formed by coating a liquid crystal composition containing a dichroic dye.

[3] The printing paper according to [1] or [2], wherein the linear polarizing layer is formed of a liquid crystal composition containing at least one of the dichroic dyes represented by formula (I), formula (II), formula (III), formula (IV) or formula (VI) below.

[Chem. 1]

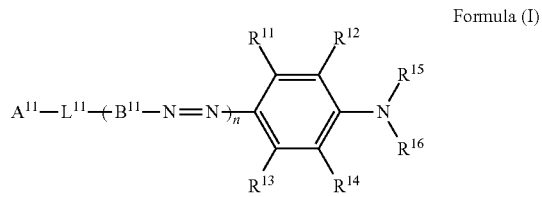

Formula (I)

(In Formula (I), $R^{11}$ to $R^{14}$ each independently represent a hydrogen atom or a substituent; $R^{15}$ and $R^{16}$ each independently represent a hydrogen atom or an alkyl group which may have a substituent; $L^{11}$ represents —N=N—, —CH=N—, —N=CH—, —C(=O)O—, —OC(=O)—, or —CH=CH—; $A^{11}$ represents a phenyl group which may have a substituent, a naphthyl group which may have a substituent, or an aromatic heterocyclic group which may have a substituent; $B^{11}$ represents a divalent aromatic hydrocarbon group or divalent aromatic heterocyclic group which may have a substituent; and n denotes an integer of 1 to 5, and when n is 2 or more, plural $B^{11}$'s may be the same as or different from each other.)

[Chem. 2]

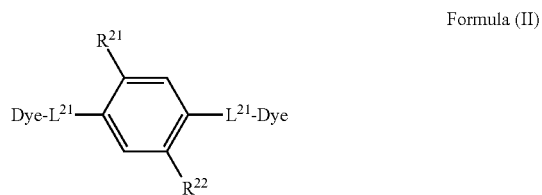

Formula (II)

(In Formula (II), $R^{21}$ and $R^{22}$ each represent a hydrogen atom, an alkyl group, an alkoxy group, or a substituent represented by -$L^{22}$-Y, provided that at least one of $R^{21}$ and $R^{22}$ represents a group other than a hydrogen atom; $L^{22}$ represents an alkylene group wherein one $CH_2$ group or two or more non-adjacent $CH_2$ groups present in the alkylene group may be substituted by —O—, —COO—, —OCO—, —OCOO—, —NRCOO—, —OCONR—, —CO—, —S—, —SO$_2$—, —NR—, —NRSO$_2$—, or —SO$_2$NR— (R represents a hydrogen atom or an alkyl group having 1 to 4 carbon atoms); Y represents a hydrogen atom, a hydroxy group, an alkoxy group, a carboxyl group, a halogen atom, or a polymerizable group; each of $L^{21}$ represents a linking group selected from the group consisting of an azo group (—N=N—), a carbonyloxy group (—C(=O)O—), an oxycarbonyl group (—O—C(=O)—), an imino group (—N=CH—), and a vinylene group (—C=C—); and each of Dye represents an azo dye residue represented by formula (IIa) below;

[Chem. 3]

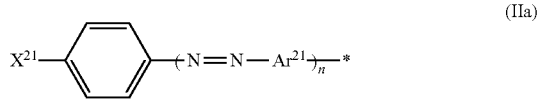

In formula (IIa), * represents a binding site to $L^{21}$; $X^{21}$ represents a hydroxy group, a substituted or unsubstituted alkyl group, a substituted or unsubstituted alkoxy group, an unsubstituted amino group, or a mono or dialkylamino group; each of $Ar^{21}$ represents an aromatic hydrocarbon ring group or aromatic heterocyclic group which may have a substituent; and n denotes an integer of 1 to 3, and when n is 2 or more, two $Ar^{21}$ may be the same as or different from each other.)

[Chem. 4]

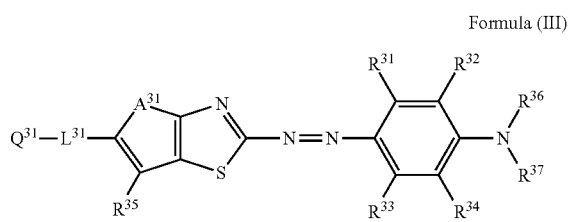

Formula (III)

(In Formula (III), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, aromatic heterocyclic group or cyclohexane ring group which may have a substituent; $L^{31}$ represents a divalent linking group; and $A^{31}$ represents an oxygen atom or a sulfur atom.)

[Chem. 5]

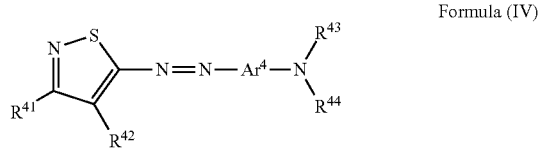

Formula (IV)

(In Formula (IV), $R^{41}$ and $R^{42}$ each represent a hydrogen atom or a substituent, or alternatively $R^{41}$ and $R^{42}$ taken together may form a ring; $Ar^4$ represents a substituted or unsubstituted divalent aromatic hydrocarbon group or aromatic heterocyclic group; and $R^{43}$ and $R^{44}$ each represent a hydrogen atom or a substituted or unsubstituted alkyl group, or alternatively $R^{43}$ and $R^{44}$ taken together may form a heterocyclic ring.)

[Chem. 6]

Formula (VI)

(In Formula (VI), $A^1$ and $A^2$ each independently represent a substituted or unsubstituted hydrocarbon ring group or heterocyclic group.)

[4] The printing paper according to any one of [1] to [3], wherein the printing paper has a quarter-wave layer on an upper layer of the linear polarizing layer, and a polarizing axis of the linear polarizing layer and a slow axis of the quarter-wave layer are at an angle of ±45°.

[5] The printing paper according to [4], wherein the quarter-wave layer is formed by curing a curable liquid crystal composition.

[6] The printing paper according to any one of [1] to [5], wherein the linear polarizing layer is formed by alignment immobilization of a dichroic dye composition which is alignment-controlled by a pattern-exposed photo-aligned film.

[7] The printing paper according to any one of [1] to [6], wherein the light-transmitting image-receiving layer is a layer formed by any unit of coating unit, spray unit and dropping unit.

[8] The printing paper according to any one of [1] to [7], wherein the light-transmitting image-receiving layer is an image-receiving layer which is capable of receiving an image by silver halide photography, a thermal transfer method or an inkjet method.

[9] The printing paper according to any one of [1] to [8], wherein the light-transmitting image-receiving layer is an image-receiving layer capable of receiving an image by silver halide photography and has a blue photosensitive emulsion layer, a green photosensitive emulsion layer and a red photosensitive emulsion layer.

[10] The printing paper according to any one of [1] to [8], wherein the light-transmitting image-receiving layer is an image-receiving layer capable of receiving an image by a thermal transfer method, and contains at least one dyeability-receiving polymer.

[11] The printing paper according to any one of [1] to [8], wherein the image-receiving layer is an image-receiving layer capable of receiving an image by an inkjet method, and is formed of a composition containing at least a water-soluble polymer and inorganic fine particles.

[12] A stereoscopic image printed matter including a printing paper of any one of [1] to [11] and a left eye image and a right eye image formed on a light-transmitting image-receiving layer of the printing paper and having a parallax therebetween, wherein pixels constituting each of the left eye image and the right eye image are formed at positions corresponding to a first domain and a second domain of the linear polarizing layer of the printing paper.

[13] The stereoscopic image printed matter according to [12], further including a non-depolarizing reflective layer at the side opposite to the viewing side of a viewer.

[14] A method for providing a stereoscopic image, including preparing a stereoscopic image printed matter of [12] or [13], and displaying the stereoscopic image printed matter to a viewer with polarized glasses in which a lens-for-left-eye and a lens-for-right-eye are circular polarizing lenses in the opposite direction to each other or are linear polarizing lenses whose polarizing axes are orthogonal to each other.

According to the present invention, a stereoscopic image printed matter with reduced crosstalk or ghost images can be provided.

DESCRIPTION OF THE PREFERRED EMBODIMENTS

Figure 1:
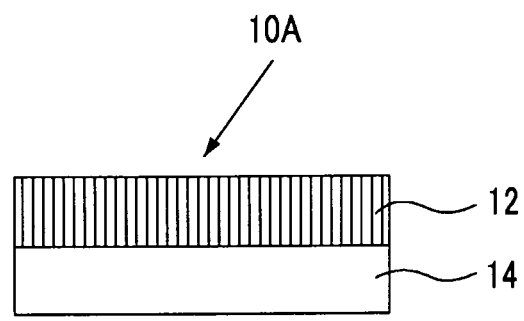
FIG. 1 is a cross-sectional schematic diagram of an example of a stereoscopic image printing paper in accordance with the present invention.

Hereinafter, the present invention will be described in more detail. Further, a numerical range represented by means of "to" in the present specification represents a range including numerical values described before and after "to", as the minimum value and the maximum value.

Further, in the present specification, $Re(\lambda)$ is a front retardation value (unit: nm) at a wavelength $\lambda$ nm, and $Rth(\lambda)$ is a thickness-direction retardation value (unit: nm) at a wavelength $\lambda$ nm. When the measuring wavelength is omitted, the Re and the Rth each refer to a value measured at a wavelength of 550 nm. The in-plane retardation, $Re(\lambda)$ is measured by making light of wavelength $\lambda$ nm incident in the direction of the normal line of the film, in a KOBRA 21ADH or WR (manufactured by Oji Scientific Instruments). The thickness-direction retardation value, $Rth(\lambda)$ is a value calculated based on a value of $Re(\lambda)$, and plural values measured by irradiation of light from inclined directions.

As used herein, the term "visible light" refers to light ranging from 380 nm to 780 nm. Unless the measuring wavelength is specifically indicated as otherwise, the measuring wavelength is 550 nm.

In the present specification, with respect to an angle (for example, an angle of 90° or the like), and the relationship therewith (for example, "orthogonal", "parallel", "intersecting at an angle of 45°", or the like), this is intended to encompass a range of error allowable in the art to which the present invention pertains. For example, this means being within a range of less than ±10° from the specific angle, and an error from the specific angle is preferably 5° or less, and more preferably 3° or less.

As used herein, the term "patterning" means the preparation of two or more regions having directions of polarizing axes different from each other or the provision of two or more identical regions in a film-like (layer-like) subject.

As used herein, the term "crosstalk" and "ghost image" means that an image is recognized as a double image when the right and left images are incompletely separated, and that the image is recognized as an image other than a desired image.

1. Printing Paper for Printing Stereoscopic Image

The present invention is directed to a printing paper for printing a stereoscopic image having a light-transmitting image-receiving layer and a linear polarizing layer, wherein the linear polarizing layer is patterned in a first domain and a second domain whose directions of polarizing axes are at an angle of 90° with respect to each other.

The printing paper in accordance with the present invention is provided with a light-transmitting image-receiving layer and is therefore capable of forming a left-eye image and a right-eye image with a high color density, which have a parallax therebetween. As a result, crosstalk and ghost images can be reduced as compared to conventional printing paper without using an image-receiving layer. Further, in an embodiment having an image-receiving layer which is formed by a coating unit or the like, a reduction of thickness can be achieved and a further reduction of crosstalk and ghost images is possible. Further, in an embodiment having an image-receiving layer which is capable of receiving an image by a thermal transfer method, an inkjet method or silver halide photography (in particular, a light jet method), a left-eye image and a right-eye image with a high color density which have a parallax therebetween can be easily formed at a desired position corresponding to a pattern of a retardation layer, by controlling a thermal head, an inkjet head, or laser light for image delineation.

The present invention utilizes a patterned linear polarizing film having first and second domains whose polarizing axes are orthogonal to each other, for the purpose of separating a left-eye image and a right-eye image. Although the separation of a left-eye image and a right-eye image may be carried out by a method using a laminate of a non-patterned linear polarizing film and a patterned retardation film, the present invention using a patterned linear polarizing film can achieve a further reduction of crosstalk and ghost images due to a shorter distance between an image-receiving layer on which images are formed and a patterned linear polarizing film for separating the formed images into a left-eye image and a right-eye image.

Figure 2:
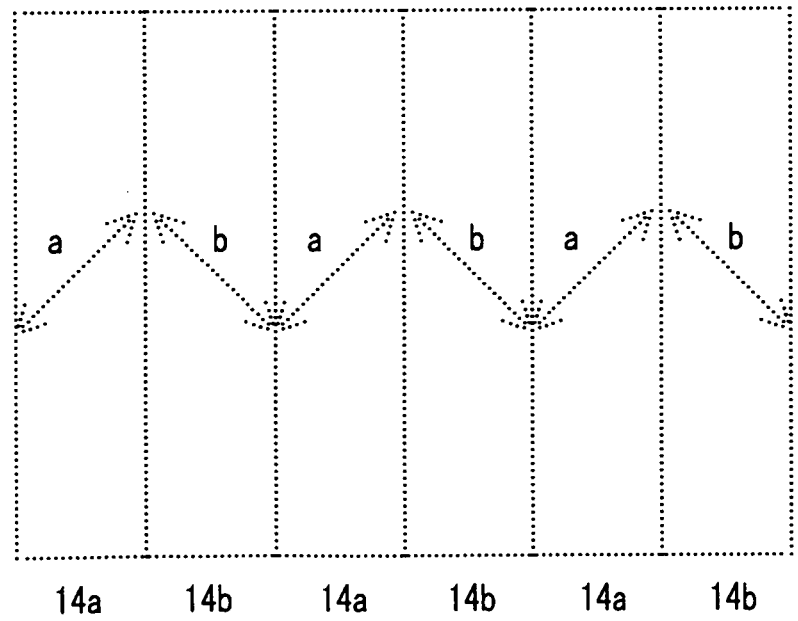
FIG. 2 is a schematic diagram for illustrating the relationship of a polarizing axis of a linear polarizing layer that can be used in a stereoscopic image printing paper in accordance with the present invention.

FIG. 1 is a cross-sectional schematic diagram of an example of the printing paper in accordance with the present invention. A printing paper 10A shown in FIG. 1 has a light-transmitting image-receiving layer 12 and a linear polarizing layer 14 in this order. The linear polarizing layer 14 is patterned in a first domain 14a and a second domain 14b whose polarizing axes are at an angle of 90° with respect to each other. For example, as shown in FIG. 2, the polarizing axis a of the first domain 14a and the polarizing axis b of the second domain 14b are at an angle of 90° with respect to each other. Further, although FIG. 2 shows an embodiment in which the first and second domains 14a and 14b are in the form of sprites, the present invention is not limited to such an embodiment.

The pattern shape of images for the left eye and right eye formed on the image-receiving layer 12 is preferably virtually equal to the shape of the first and second domains of the linear polarizing layer. The patterns of a left eye image and a right eye image formed on the image-receiving layer 12 preferably account for approximately the same area in an image-receiving layer plane. In addition, it is preferable that each region be uniformly distributed throughout without in-plane localization. Since the sensitivity to a resolution of human eyes is low in the vertical direction and high in the horizontal direction, a pattern with increasing resolution in the horizontal direction is preferable. Further, since binocular parallax causing a sense of depth corresponds to shift in the horizontal direction of the position of a subject to be viewed in a visual field of each of left and right eyes, a high resolution in the horizontal direction is preferable from the viewpoint of providing a stereoscopic view with smooth depth.

Specific examples of the pattern shape include horizontal stripes, diagonal stripes, vertical stripes, and checkers. The pattern shape is preferably horizontal stripes, diagonal stripes or checkers, more preferably horizontal stripes, diagonal stripes in which the slope of stripes is 45° or less with respect to the horizontal direction, or checkers, still more preferably horizontal stripes, or diagonal stripes in which the slope of stripes is 30° or less with respect to the horizontal direction, and most preferably horizontal stripes. The distance between pattern boundaries is preferably in a range of from 10 μm to 5 mm, more preferably from 30 μm to 2 mm, still more preferably from 50 μm to 1 mm, and further preferably from 100 μm to 500 μm. If the distance is excessively large, a pattern shape is readily recognized as a black shape to eyes at the side in which a region between the boundaries is recognized as a black mark, resulting in deterioration of image quality, which is therefore undesirable. On the other hand, if the distance is excessively small, this is undesirable because significant crosstalk may take place even with slight misalignment between a polarizer and a printing paper pattern.

When an image is formed on the image-receiving layer 12 and the image is viewed through the linear polarizing layer 14, an image at the position corresponding to the first domain 14a is incident to a viewer's eyes as a linearly polarized image of the direction determined by the polarizing axis a, and an image at the position corresponding to the second domain 14b is incident to a viewer's eyes as a linearly polarized image of the direction determined by the polarizing axis b. Since polarizing axes a and b are orthogonal to each other, when it is viewed by a viewer wearing linearly polarized glasses having the correspondingly axis-aligned linear polarizing lenses as right and left lenses, the linearly polarized images from the first and second domains 14a and 14b can be made incident to only either of the left and right eyes. Therefore, when images are displayed to a viewer with linearly polarized glasses by printing pixels constituting each of the left eye image and the right eye image which have a parallax therebetween, at the positions corresponding to the first and second domains 14a, 14b of the image-receiving layer 12, the displayed images can be recognized as stereoscopic images.

Figure 3:
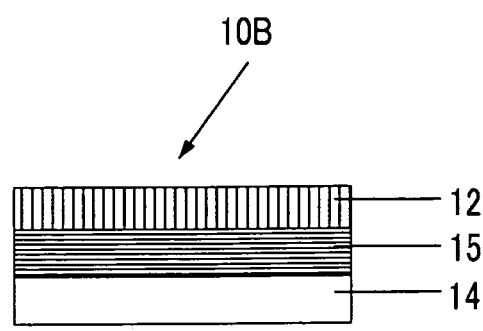
FIG. 3 is a cross-sectional schematic diagram of another example of a stereoscopic image printing paper in accordance with the present invention.

FIG. 3 is a cross-sectional schematic diagram of another example of the printing paper in accordance with the present invention. Like parts with respect to FIG. 1 are identified by like numbers and details thereof are omitted.

A printing paper 10B shown in FIG. 3 has an alignment layer 15 between the image-receiving layer 12 and the patterned linear polarizing layer 14. The alignment layer 15 has alignment control force and is used in the formation of the patterned linear polarizing film 14 from a liquid crystal composition containing at least a dichroic dye. Details thereof will be given hereinafter. As the alignment layer 15, there may be used any of, for example, a photo-aligned film exhibiting alignment control force by light irradiation, a rubbing-aligned film exhibiting alignment control force by rubbing treatment, and the like.

When the patterned linear polarizing film 14 is formed using a dichroic dye, both surfaces of the film 14 may be protected by a polymer film or a curable resin for the purpose of improving durability thereof. If a protective layer disposed on an upper layer of the linear polarizing layer 14 is high in terms of phase difference, this leads to changes in the polarization state of a linearly polarized image being incident to viewer's eyes from the first and second domains 14a, 14b, which consequently contributes to the occurrence of crosstalk and ghost images. Accordingly, a protective layer is preferably low in terms of phase difference. Specifically, the protective layer is a layer in which an in-plane retardation at a wavelength of 550 nm, Re(550) is preferably in a range of 0 to 10 nm, and more preferably 5 nm or less.

Further, since Rth of a protective layer has also an effect on the polarization state of a linearly polarized image and therefore contributes to the occurrence of crosstalk and ghost images, Rth of the protective layer is preferably 20 nm or less, and more preferably 5 nm or less.

A printing paper 10B shown in FIG. 3 is an embodiment in which the patterned linear polarizing layer 14 is formed by coating a liquid crystal composition containing at least a dichroic dye and immobilizing alignment of the composition, and more specifically an embodiment which is formed by controlling alignment of the dichroic dye composition through an alignment film 15 directly formed on an upper layer of an image-receiving layer. For example, where the alignment film 15 is a photo-aligned film, an alignment control force is exerted by light irradiation, and an alignment axis, i.e., polarizing axis is determined depending on the light irradiation direction. The photo-aligned film 15 is capable of forming a first photo-aligned film domain and a second photo-aligned film domain having alignment axes at an angle of 90° with respect to each other, through pattern exposure, and a polarizing axis of a patterned linear polarizing layer is determined parallel to these alignment axes.

Figure 4:
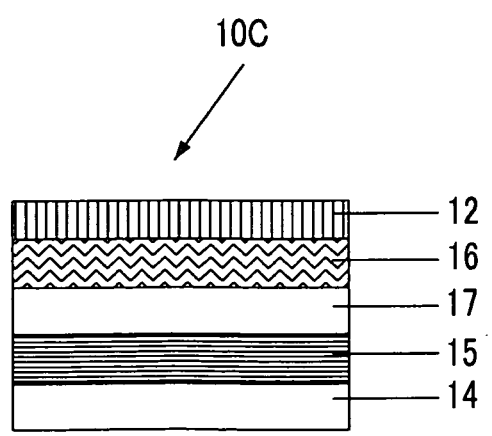
FIG. 4 is a cross-sectional schematic diagram of another example of a stereoscopic image printing paper in accordance with the present invention.
Figure 5:
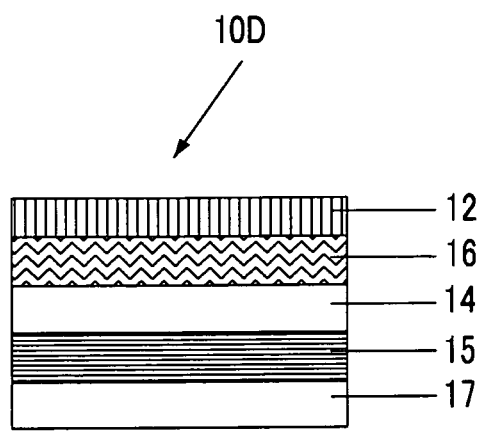
FIG. 5 is a cross-sectional schematic diagram of another example of a stereoscopic image printing paper in accordance with the present invention.
Figure 6:
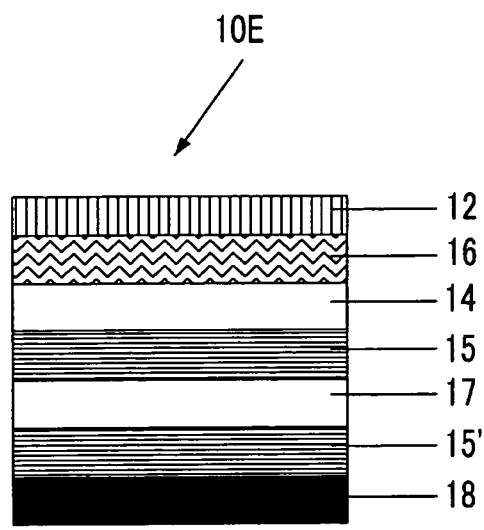
FIG. 6 is a cross-sectional schematic diagram of another example of a stereoscopic image printing paper in accordance with the present invention.

FIGS. 4 to 6 are a cross-sectional schematic diagram of another example of the printing paper in accordance with the present invention. Like parts with respect to FIGS. 1 to 3 are identified by like numbers and details thereof are omitted.

A printing paper 10C shown in FIG. 4 is an embodiment in which the patterned linear polarizing layer 14 is formed by subjecting a laminate formed on the surface of the alignment layer 15 on a transparent support 17 to position matching, and adhesively attaching the image-receiving layer 12 to the rear surface (surface where the linear polarizing layer 14 is not formed) of the transparent support 17, and which has an adhesive layer 16 between the image-receiving layer 12 and the support 17.

A printing paper 10D shown in FIG. 5 is an embodiment in which the patterned linear polarizing layer 14 is formed by subjecting a laminate formed on the surface of the alignment layer 15 on a transparent support 17 to position matching, and adhesively attaching the image-receiving layer 12 to the surface of the linear polarizing layer 14, and which has an adhesive layer 16 between the image-receiving layer 12 and the linear polarizing layer 14.

A printing paper 10E shown in FIG. 6 is an embodiment in which a quarter-wave layer 18 formed using an alignment layer 15' is further laminated on the rear surface of the transparent support 17 of the patterned linear polarizing layer 14 of the printing paper 10D shown in FIG. 5. The slow axis of the quarter-wave layer 18 intersects at one of the polarizing axes of the first domain and the second domain of the patterned linear polarizing layer 14 at an angle of +45° and the other one of the polarizing axes at an angle of −45°. When an image is formed on the image-receiving layer 12 of the printing paper 10E and the image is viewed through the linear polarizing layer 14 and the quarter-wave layer 18, an image at the position corresponding to the first domain 14a is incident to a viewer's eyes as a circularly polarized image of the direction determined by the polarizing axis a and the quarter-wave layer 18, and an image at the position corresponding to the second domain 14b is incident to a viewer's eyes as a circularly polarized image of the direction opposite to the direction determined by the polarizing axis b and the quarter-wave layer 18. Since the circularly polarized images are in the direction opposite to each other, when viewed by a viewer wearing circular polarized glasses having individual corresponding circular polarizing lenses as right and left lenses, the circularly polarized images from the first and second domains 14a and 14b can be made incident to only either of the left and right eyes. Therefore, when images are displayed to a viewer with circularly polarized glasses by printing pixels constituting each of the left eye image and the right eye image which have a parallax therebetween, at the positions corresponding to the first and second domains 14a, 14b of the image-receiving layer 12, the displayed images can be recognized as stereoscopic images.

The quarter-wave layer 18 is a layer which is formed by using the alignment layer 15'. For example, the quarter-wave layer 18 may be a layer in which a liquid crystal composition is rendered to a given alignment state by alignment control force of the alignment layer 15', and then the alignment state is immobilized. As the alignment layer 15', there may be used any of, for example, a photo-aligned film exhibiting alignment control force by light irradiation, a rubbing-aligned film exhibiting alignment control force by rubbing treatment, and the like.

Further, although FIG. 6 shows an embodiment in which the quarter-wave layer 18 is a layer formed using a liquid crystal composition, the quarter-wave layer may be a birefringent polymer film. In an example of the embodiment using a birefringent polymer film, the transparent support 17 in FIG. 5 is used as a quarter-wave layer.

A printing paper 10B to 10E shown in FIGS. 3 to 6 has the patterned polarizing layer 14 formed from a liquid crystal composition containing at least a dichroic dye, taking advantage of the alignment control force of the alignment layer 15. An example is given below of a method of forming the patterned linear polarizing layer 14 made up of the first domain 14a and the second domain 14b shown in FIG. 2, from a liquid crystal composition containing a dichroic dye, using a photo-aligned film as the alignment layer 15.

Figure 7A:
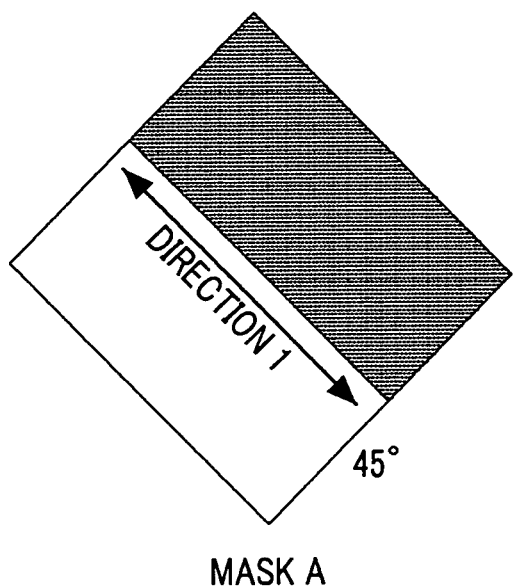
FIG. 7 is a schematic diagram showing an example of a photomask that can be used in the production of a stereoscopic image printing paper in accordance with the present invention.
Figure 7B:
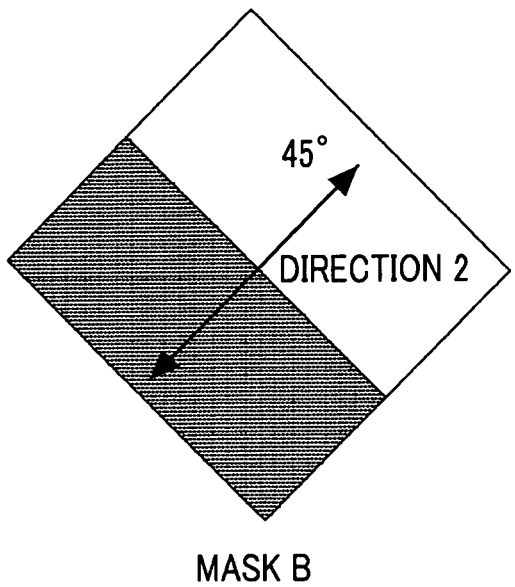
Figure 7C:
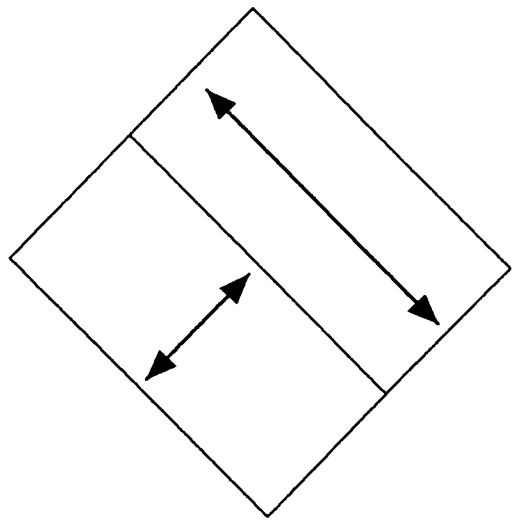

First, the composition for a photo-aligned film is applied onto a surface of a transparent support made of a polymer film or the like, thereby forming a film. Then, linearly polarized light is irradiated using a wire grid. Specifically, first, as shown in FIG. 7(a), a wire grid polarizer is set in the direction 1 and exposed through a mask A (in the drawing, a black portion is a light-shielding section, and a white portion is a light-transmitting section. The same shall apply to a mask B). Thereafter, as shown in FIG. 7(b), a wire grid polarizer is set in the direction 2 at an angle of 90° with respect to the direction 1 and exposed through a mask B. In this manner, first and second photo-aligned film domains can be formed in which alignment axes thereof are orthogonal to each other. Further, when a liquid crystal composition containing a dichroic dye to be described hereinafter is aligned on this photo-aligned film, a dye on the first photo-aligned film domain is aligned along the alignment axis thereof, and a dye on the second photo-aligned film domain is aligned along the alignment axis thereof. Where immobilization is followed in this state, as shown in FIG. 2, the patterned linear polarizing layer 14 made up of first and second domains 14a, 14b can be formed in which polarizing axes a and b are at an angle of 90° with respect to each other.

The printing paper of the present embodiment having a patterned linear polarizing layer formed using a photo-aligned film has only the linear polarizing layer whose polarizing axes are at an angle of 90° with respect to each other, through pattern exposure for which controlling such as position matching is relatively easy, thus resulting in a reduction of axial shift. Accordingly, the stereoscopic image formed on the printing paper of the present embodiment exhibits further decreased crosstalk and ghost images.

Further, with regard to the printing paper of the present invention, all layers are not necessary to be fixed and may be configured to be separable. For example, a light-transmitting image-receiving layer or a laminate containing the same is first separated from other constituent members of a printing paper, followed by image formation and if necessary, formation of a stereoscopic image by development or the like, and then may be laminated in combination with other members in a given laminating order.

Hereinafter, individual members constituting the printing paper of the present invention will be described in more detail.

Light-Transmitting Image-Receiving Layer:

The image-receiving layer in accordance with the present invention is light-transmissive. Specifically, a light transmittance is preferably 70% or more, more preferably 80% or more, and particularly preferably 90% or more. In the present invention, the image-receiving layer is preferably a dye-receiving image-receiving layer formed by any of coating unit, spray unit and dropping unit, from the viewpoint of being capable of forming an image with a high color density and further reducing the occurrence of crosstalk and ghost images. As used herein, the term "image-receiving layer" is an image-receiving layer made up of dyes and the like and capable of receiving an image, and is intended to mean a layer of forming an image through the receipt of red, green and blue photosensitive emulsions, by a light jet method or the like, as in reversal, or a layer of receiving a dye to be transferred as in thermal transfer, or a layer of forming an image through the receipt of an ejected dye as in an inkjet method. In the present invention, as the image-receiving layer, an image-receiving layer is preferably used which is capable of receiving an image by silver halide photography (in particular, light jet method), a thermal transfer method or an inkjet method. By controlling each of a laser light, thermal head or inkjet head for image delineation, a left-eye image and a right-eye image with a high color density which have a parallax therebetween can be easily formed at the desired position corresponding to the pattern of a retardation layer.

[Image-Receiving Layer which is Capable of Receiving an Image by Silver Halide Photography]

The present invention preferably uses an image-receiving layer which is capable of receiving an image by silver halide photography. Particularly preferably, it is preferable to use a reversal film which is capable of receiving an image by a light jet method. Use of a reversal film can achieve control of laser light or the like, formation of a left eye image and a right eye image with a high image density at accurate positions corresponding to first and second domains of a linear polarizing layer, based on digitized image data, and reduction of crosstalk and ghost images. Use of an image-receiving layer which is capable of receiving an image by an inkjet method or thermal transfer method to be described later also contributes to a reduction of crosstalk and ghost images, but it was found that use of a reversal film not only decreases crosstalk and ghost images, but also unexpectedly can further improve a sense of depth of a stereoscopic image. This is believed to be due to the fact that human eyes sensitively respond to a resolution in the horizontal direction. The image delineated on a reversal film (through silver halide photography) by laser light using a light jet method or the like, followed by development can obtain a continuous tone without graininess in terms of halftone gradation, as compared to the image produced by an inkjet method and a thermal transfer method.

Since a stereoscopic image becomes a high-tone image with a sense of smooth depth as a resolution in the transverse direction (horizontal direction) increases, it is considered that a stereoscopic image with a sense of more depth is obtained in the present embodiment using a reversal film.

There is no particular limitation on the reversal film that can be used in the present embodiment. The reversal film may be selected from a variety of reversal films. Among these, a reversal film that can be delineated based on digital data and is capable of applying light jet delineation is preferable. The reversal film to be used is preferably a film with a high optical density (OD) which is specifically preferably 3 or more. An OD of printing paper for inkjet and thermal transfer methods is about 1.2, and a higher OD than that is preferable.

An example of the reversal film that can be used in the present embodiment is a reversal film to which laser delineation by a light jet method is possible, and is a silver halide color reversal film for full color having a blue photosensitive emulsion layer, a green photosensitive emulsion layer and a red photosensitive emulsion layer on a light-transmitting support. Such an example of the reversal film is described in detail in JP1998-232470A (JP-H10-232470A), JP2002-40604A and the like, and therefore can be used in the present invention. Further, commercially available products may be used as the reversal film, and examples thereof include FUJICHROME Velvia 50 Professional RVP50, FUJICHROME T64 Professional, FUJICHROME PROVIA 100F Professional, FUJICHROME PROVIA 400X Professional, FUJICHROME ASTIA 100F Professional, FUJICHROME SensiaIII 100, FUJICHROME Velvia 100F Professional, FUJICHROME Velvia 100 Professional, and FUJICHROME TREBI 100C.

[Thermal Transfer Image-Receiving Layer]

There is no particular limitation on the image-receiving layer which is capable of receiving an image by a thermal transfer method that can be used in the present invention. A variety of thermal transfer image-receiving layers may be used in various manners. For the purpose of receiving the dye that has transferred from a transfer ink sheet upon performing thermal transfer and maintaining the formed image, the image-receiving layer preferably contains an easily dyeable resin (dyeability-receiving polymer) as a main component. Examples of materials for the thermal transfer image-receiving layer include polyester resins, polycarbonate resins, vinyl chloride resins, and cellulose resins. Further, the thermal transfer image-receiving layer containing a polymer having a repeating unit represented by formula (1) below is preferable from the viewpoint of excellent transfer sensitivity and image storability. The polymer may be incorporated as a latex.

[Chem. 7]

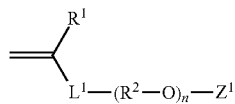

Formula (1)

In formula (1), $R^1$ represents a hydrogen atom, a halogen atom or a methyl group, $L^1$ represents a divalent linking group, $R^2$ represents an alkylene group having 1 to 5 carbon atoms. n denotes an integer of 1 to 40. $Z^1$ represents a hydrogen atom, or a linear, branched or cyclic aliphatic hydrocarbon group having 1 to 30 carbon atoms. Here, an alkylene group for $R^2$ and an aliphatic hydrocarbon group for $Z^1$ may have a substituent, and when n is 2 or more, plural $R^{2'}$s may be the same as or different from each other.

When $R^1$ represents a halogen atom, the halogen atom is preferably a chlorine atom or a fluorine atom.

Although the divalent linking group for $L^1$ may be any linking group, it is preferably a single bond, —O—, —C(=O)—, —$NR^{11}$— wherein $R^{11}$ represents a hydrogen atom, an alkyl group, a cycloalkyl group, an aryl group or an aralkyl group, —S—, —$SO_2$—, —P(=O)($OR^{12}$)— wherein $R^{12}$ represents an alkyl group, a cycloalkyl group, an aryl group or an aralkyl group, an alkylene group, an allylene group, or a divalent linking group formed by combination of two or more thereof, more preferably a group represented by —C(=O)—X— or a phenylene group which may have a substituent, and still more preferably a group represented by —C(=O)—X—. Here, X represents an oxygen atom, a sulfur atom or —N($R^0$)—, and $R^0$ represents a hydrogen atom or a substituent (the substituent is preferably an alkyl group, a cycloalkyl group, an aryl group or a heterocyclic group, and more preferably Rc to be described later). $L^1$ is most preferably —C(=O)—O—.

The alkylene group for $R^2$ may be chain-like or branched, and preferably chain-like. Further, the number of carbon atoms thereof is preferably in a range of 2 to 4.

n preferably denotes an integer of 1 to 30, more preferably an integer of 1 to 20, and most preferably an integer of 1 to 10.

Examples of the aliphatic hydrocarbon group for $Z^1$ include an alkyl group, an alkenyl group, an alkynyl group, a cycloalkyl group, a cycloalkenyl group and a cycloalkynyl group. The aliphatic hydrocarbon group is preferably an alkyl group, an alkenyl group, a cycloalkyl group and a cycloalkenyl group, more preferably an alkyl group and a cycloalkyl group, and still more preferably an alkyl group.

Preferably, an alkenyl group and an alkynyl group are $C_2$-$C_{30}$ (preferably $C_2$-$C_{20}$), a cycloalkyl group is $C_3$-$C_{30}$ (preferably $C_5$-$C_{20}$), and a cycloalkynyl group is $C_6$-$C_{30}$ (preferably $C_6$-$C_{20}$). An alkyl group is more preferably $C_1$-$C_{20}$.

$Z^1$ is preferably a hydrogen atom or an aliphatic group in the above-specified preferred range, and more preferably a hydrogen atom and an alkyl group.

Here, substituents or the substituent in the expression "which may have a substituent" used in individual formulae including the above formula (1) in the present invention will be described.

In the present invention, although the substituent may be any one, substituents selected from the following substituent group are preferable.

(Substituent Group)

an alkyl group (preferably an alkyl group having 1 to 20 carbon atoms, more preferably 1 to 12 carbon atoms, and particularly preferably 1 to 8 carbon atoms, e.g., a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (preferably an alkenyl group having 2 to 20 carbon atoms, more preferably 2 to 12 carbon atoms, and particularly preferably 2 to 8 carbon atoms, e.g., a vinyl group, an allyl group, a 2-butenyl group, or a 3-pentenyl group), an alkynyl group (preferably an alkynyl group having 2 to 20 carbon atoms, more preferably 2 to 12 carbon atoms, and particularly preferably 2 to 8 carbon atoms, e.g., a propargyl group, or a 3-pentynyl group), an aryl group (preferably an aryl group having 6 to 30 carbon atoms, more preferably 6 to 20 carbon atoms, and particularly preferably 6 to 12 carbon atoms, e.g., a phenyl group, a p-methylphenyl group, or a naphthyl group), a substituted or unsubstituted amino group (preferably an amino group having 0 to 20 carbon atoms, more preferably 0 to 10 carbon atoms, and particularly preferably 0 to 6 carbon atoms, e.g., an unsubstituted amino group, a methylamino group, a dimethylamino group, a diethylamino group, or an anilino group), an alkoxy group (preferably an alkoxy group having 1 to 20 carbon atoms, more preferably 1 to 16 carbon atoms, and particularly preferably 1 to 10 carbon atoms, e.g., a methoxy group, an ethoxy group, or a butoxy group), an alkoxycarbonyl group (preferably an alkoxycarbonyl group having 2 to 20 carbon atoms, more preferably 2 to 16 carbon atoms, and particularly preferably 2 to 10 carbon atoms, e.g., a methoxycarbonyl group, or an ethoxycarbonyl group), an acyloxy group (preferably an acyloxy group having 2 to 20 carbon atoms, more preferably 2 to 16 carbon atoms, and particularly preferably 2 to 10 carbon atoms, e.g., an acetoxy group, or a benzoyloxy group), an acylamino group (preferably an acylamino group having 2 to 20 carbon atoms, more preferably 2 to 16 carbon atoms, and particularly preferably 2 to 10 carbon atoms, e.g., an acetylamino group, or a benzoylamino group), an alkoxycarbonylamino group (preferably an alkoxycarbonylamino group having 2 to 20 carbon atoms, more preferably 2 to 16 carbon atoms, and particularly preferably 2 to 12 carbon atoms, e.g., a methoxycarbonylamino group), an aryloxycarbonylamino group (preferably an aryloxycarbonylamino group having 7 to 20 carbon atoms, more preferably 7 to 16 carbon atoms, and particularly preferably 7 to 12 carbon atoms, e.g., a phenyloxycarbonylamino group), a sulfonylamino group (preferably a sulfonylamino group having 1 to 20 carbon atoms, more preferably 1 to 16 carbon atoms, and particularly preferably 1 to 12 carbon atoms, e.g., a methanesulfonylamino group, or a benzenesulfonylamino group), a sulfamoyl group (preferably a sulfamoyl group having 0 to 20 carbon atoms, more preferably 0 to 16 carbon atoms, and particularly preferably 0 to 12 carbon atoms, e.g., a sulfamoyl group, a methylsulfamoyl group, a dimethylsulfamoyl group, or a phenylsulfamoyl group), a carbamoyl group (preferably a carbamoyl group having 1 to 20 carbon atoms, more preferably 1 to 16 carbon atoms, and particularly preferably 1 to 12 carbon atoms, e.g., an unsubstituted carbamoyl group, a methylcarbamoyl group, a diethylcarbamoyl group, or a phenylcarbamoyl group), an alkylthio group (preferably an alkylthio group having 1 to 20 carbon atoms, more preferably 1 to 16 carbon atoms, and particularly preferably 1 to 12 carbon atoms, e.g., a methylthio group, or an ethylthio group), an arylthio group (preferably an arylthio group having 6 to 20 carbon atoms, more preferably 6 to 16 carbon atoms, and particularly preferably 6 to 12 carbon atoms, e.g., a phenylthio group), a sulfonyl group (preferably a sulfonyl group having 1 to 20 carbon atoms, more preferably 1 to 16 carbon atoms, and particularly preferably 1 to 12 carbon atoms, e.g., a mesyl group, or a tosyl group), a sulfinyl group (preferably a sulfinyl group having 1 to 20 carbon atoms, more preferably 1 to 16 carbon atoms, and particularly preferably 1 to 12 carbon atoms, e.g., a methanesulfinyl group, or a benzenesulfinyl group), an ureido group (preferably an ureido group having 1 to 20 carbon atoms, more preferably 1 to 16 carbon atoms, and particularly preferably 1 to 12 carbon atoms, e.g., an unsubstituted ureido group, a methylureido group, or a phenylureido group), a phosphoric acid amido group (preferably a phosphoric acid amido group having 1 to 20 carbon atoms, more preferably 1 to 16, and particularly preferably 1 to 12 carbon atoms, e.g., a diethylphosphoric acid amido group, or a phenylphosphoric acid amido group), a hydroxy group, a mercapto group, a halogen atom (e.g., a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (preferably a heterocyclic group having 1 to 30 carbon atoms, more preferably 1 to 12 carbon atoms, a heterocyclic group containing a hetero atom such as a nitrogen atom, an oxygen atom or a sulfur atom, e.g., an imidazolyl group, a pyridyl group, a quinolyl group, a furyl group, a piperidyl group, a morpholino group, a benzoxazolyl group, a benzimidazolyl group, or a benzothiazolyl group), and a silyl group (preferably a silyl group having 3 to 40 carbon atoms, more preferably 3 to 30 carbon atoms, and particularly preferably 3 to 24 carbon atoms, e.g. a trimethylsilyl group, or a triphenylsilyl group). These substituents may be further substituted by these substituents. When two or more substituents are present, the substituents may be the same as or different from each other. They may bind to each other to form a ring, if possible.

The monomer represented by formula (1) is preferably a monomer represented by the following formula (2).

[Chem. 8]

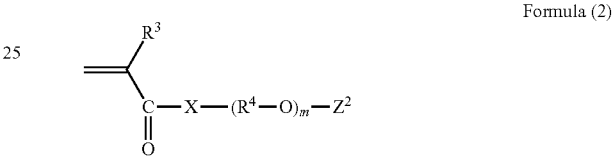

Formula (2)

In formula (2), $R^3$ represents a hydrogen atom, a halogen atom or a methyl group, X represents an oxygen atom, a sulfur atom or —N(Rc)-. Here, Rc represents a hydrogen atom or a $C_1$-$C_8$ alkyl group or a cycloalkyl group which may have a substituent. $R^4$ represents an alkylene group having 1 to 5 carbon atoms. m denotes an integer of 1 to 40. $Z^2$ represents a hydrogen atom, or a linear, branched or cyclic aliphatic hydrocarbon group having 1 to 30 carbon atoms. Here, an alkyl group and a cycloalkyl group for Rc, an alkylene group for $R^4$, and an aliphatic hydrocarbon group for $Z^2$ may have a substituent, and when m is 2 or more, plural $R^4$'s may be the same as or different from each other.

$R^3$, $R^4$, m and $Z^2$ have the same definitions as $R^1$, $R^2$, n and $Z^1$ in formula (1), respectively, and a preferred range thereof is the same.

X is preferably an oxygen atom. An alkyl group represented by Rc is preferably $C_3$-$C_8$, and a cycloalkyl group represented by Rc is preferably $C_3$-$C_8$.

The monomer represented by formula (1) or (2) is more preferably a monomer represented by the following formula (3).

[Chem. 9]

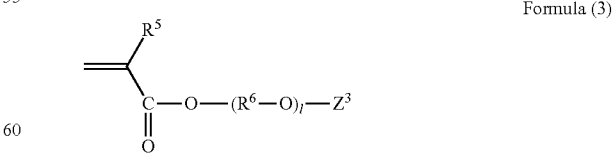

Formula (3)

In formula (3), $R^5$ represents a hydrogen atom, a halogen atom or a methyl group, $R^6$ represents an alkylene group having 2 to 4 carbon atoms. l denotes an integer of 1 to 40. $Z^3$ represents a hydrogen atom, or a linear, branched or cyclic aliphatic hydrocarbon group having 1 to 20 carbon atoms.

Here, an alkylene group for $R^6$ and an aliphatic hydrocarbon group for $Z^3$ may have a substituent, and when 1 is 2 or more, plural $R^4$'s may be the same as or different from each other.

$R^5$, $R^6$ and 1 have the same definitions as $R^1$, $R^2$ and n in formula (1), respectively, and a preferred range thereof is the same. $Z^3$ has the same preferable definition as $Z^1$ in formula (1).

Preferable examples of the monomers represented by formulae (1) to (3) include compounds disclosed in JP2008-105397A, paragraphs [0035] to [0037], and JP2008-105398A, paragraphs [0030] to [0033].

Further, the monomers represented by formulae (1) to (3) are commercially available as the BLEMMER series manufactured by NOF Corporation, and the ARONICS series manufactured by Toagosei Co., Ltd., and therefore these commercial products may also be used.

The polymer having a repeating unit derived from the monomer represented by formulae (1) to (3) may be a copolymer with other monomers. Examples of other monomers include monomers disclosed in JP2008-105397A, paragraphs [0039] to [0042], and preferable examples thereof are also the same. Specific examples of the above polymer include polymers disclosed in JP2008-105397A, paragraphs [0043] to [0047]. Further, as mentioned above, the polymer may be incorporated into the thermal transfer image-receiving layer as a polymer latex, and the polymer latex is also preferably a copolymer of the monomer represented by formulae (1) to (3) with other monomers. Examples of other monomers constituting the polymer latex include other monomers disclosed in JP2008-105398A, paragraphs [0035] to [0048], and preferable examples thereof are also the same. Further, preferable examples of the polymer latex include copolymers disclosed in JP2008-105398A, paragraphs [0053] to [0057], and details of the polymer latex are the same as in the embodiment disclosed in JP2008-105398A, paragraphs [0049] to [0051].

The image-receiving layer may contain at least one of other polymers and/or other polymer latices, in combination with the polymer containing a repeating unit of the monomer represented by formula (1) and the polymer latex. Examples of other polymers and/or other polymer lattices that can be used in combination include those disclosed in JP2008-105397A, paragraphs [0049] to [0074], and JP2008-105398A, paragraphs [0059] to [0075].

The image-receiving layer may be formed by applying a coating composition containing a main component polymer such as the polymer containing a repeating unit of the monomer represented by formula (1) to a surface, and drying the coating film. The preparation of the coating composition may employ an organic solvent (for example, methyl ethyl ketone and toluene), and if possible, a mixed solvent of water and an organic solvent may also be used. The coating composition may contain one or more additives such as an ultraviolet absorber, a release agent and an antioxidant, in combination with a main component polymer. An ultraviolet absorber and an antioxidant are added for the purpose of improving durability of an image-receiving layer. A release agent is added for the purpose of preventing thermal fusion bonding with a thermal transfer sheet laminated upon formation of images. Examples of the release agent include silicone oil, a phosphoric acid ester plasticizer and fluorine compounds. In particular, silicone oil is preferably used. As the silicone oil, modified silicone oils are preferably used such as epoxy-modified, alkyl-modified, amino-modified, carboxyl-modified, alcohol-modified, fluorine-modified, alkyl aralkyl polyether-modified, epoxy/polyether-modified and polyether-modified silicone oils. Among these, preferred is the reaction product of vinyl-modified silicone oil and hydrogen-modified silicone oil. The addition amount of a release agent is preferably in a range of 0.2 to 30 parts by mass based on the main component polymer.

The image-receiving layer may be formed by applying the coating composition onto the surface of a member and then drying the coating layer. The application of the coating composition may be performed according to a known coating method using, for example, an extrusion die coater, an air doctor coater, a blade coater, a rod coater, a knife coater, a squeeze coater, a reverse roll coater, or a bar coater. There is no particular limitation on the coating amount. Generally, the coating amount is preferably in a range of 0.5 to 10 g/m$^2$ (in terms of solid content). Further, there is no particular limitation on the thickness of an image-receiving layer for thermal transfer. Generally, the thickness of an image-receiving layer is preferably in a range of 1 to 20 μm.

The thermal transfer image-receiving layer may be a laminate of two or more layers, for example, a laminate of an image-receiving layer containing the foregoing polymer and an intermediate layer. In this embodiment, an intermediate layer is preferably disposed between the linear polarizing layer and the image-receiving layer. The intermediate layer is disposed underneath an image-receiving layer, by means of heat from a thermal head upon performing thermal transfer, and will be formed for the purpose of preventing deterioration of a linear polarizing layer or the like, controlling electrical charge, improving adhesivity, or improving printing sensitivity. Details of the intermediate layer may refer to JP2008-105397A, paragraphs [0085] to [0097].

The intermediate layer may be formed in two or more layers depending on the purpose. Further, the embodiment having an intermediate layer is preferably formed by simultaneously applying an image-receiving layer and at least one intermediate layer using a simultaneous multiple layer coating method and then drying the coating layer.

[Inkjet Image-Receiving Layer]

There is no particular limitation on the image-receiving layer which is capable of receiving an image by an inkjet method that can be used in the present invention (inkjet image-receiving layer). A variety of inkjet image-receiving layers may be used in various manners. For the purpose of receiving a dye in the ink ejected by an inkjet method and maintaining the formed image, the inkjet image-receiving layer is preferably formed of an easily dyeable material. In particular, an image-receiving layer formed of a composition containing inorganic fine particles and a water-soluble resin is preferable. Hereinafter, this embodiment will be described in more detail.

The image-receiving layer containing inorganic fine particles and a water-soluble resin may be formed by applying a solution containing at least inorganic fine particles and a water-soluble resin (hereinafter, referred to as an "image-receiving layer-forming liquid" in some cases) onto the surface of a member and then drying the formed coating layer. The application of the image-receiving layer-forming liquid may be performed using various methods, similar to the application of the coating composition for forming a thermal transfer image-receiving layer. For example, the application of the image-receiving layer-forming liquid may be performed according to a known coating method using an extrusion die coater, an air doctor coater, a blade coater, a rod coater, a knife coater, a squeeze coater, a reverse roll coater or a bar coater.

In this process, a basic solution having a pH of 7.1 or higher may be preferably applied onto the support, either (1) at the same time as applying the image-receiving layer-forming liquid or (2) during drying of the coating layer formed by the application of the image-receiving layer-forming liquid but before the coating layer exhibits falling-rate drying. In other words, the image-receiving layer may be formed by introducing the basic solution having a pH of 7.1 or higher, during the period in which the coating layer shows a constant-rate drying after the application of the image-receiving layer-forming liquid.

The basic solution having a pH of 7.1 or higher may contain a crosslinking agent or the like, if necessary. The basic solution having a pH of 7.1 or higher may accelerate curing of the image-receiving layer when the basic solution having a pH of 7.1 or higher is used as an alkali solution. The pH of the basic solution is preferably 7.5 or higher, and particularly preferably 7.9 or higher. When the pH is too close to being acidic, the crosslinking reaction of the water-soluble resin caused by the crosslinking agent may not proceed sufficiently, as a result of which bronzing may occur and/or defects such as cracking may occur in the image-receiving layer.

The basic solution having a pH of 7.1 or higher may be prepared, for example, by adding, to ion-exchange water, a metal compound (for example, in an amount of from 1% to 5%), a basic compound (for example, in an amount of from 1% to 5%), and, if necessary, p-toluenesulfonic acid (for example, in an amount of from 0.5% to 3%), and thoroughly stirring the resulting mixture. Here, the "%" for each composition refers to the % by mass of solid content.

Here, the expression "before the coating layer exhibits falling-rate drying" usually refers to a period of several minutes from immediately after the application of the coating liquid; during this period, the coating layer shows the phenomenon of "constant-rate drying" in which the content of a solvent (dispersion medium) in the applied coating layer decreases in proportion to the lapse of time. With regard to the time for such "constant-rate drying," descriptions in, for example, Handbook of Chemical Technology, pp 707 to 712, published by Murazen Co., Ltd., 1980 may be referenced.

As is described above, after the application of the image-receiving layer-forming liquid, the coating layer is dried until the coating layer starts to exhibit falling-rate drying. The drying is generally conducted at a temperature of 40° C. to 180° C. for 0.5 minutes to 10 minutes (preferably 0.5 minutes to 5 minutes). Although the drying time naturally varies according to the application amount of the image-receiving layer-forming liquid, the range specified above is generally appropriate.

In consideration that the image-receiving layer is desired to have an absorption capacity that allows absorption of all ink droplets, the thickness of the image-receiving layer prepared by drying the image-receiving layer-forming liquid may be determined in relation to the porosity of the layer. For example, when the amount of ink is 8 nL/mm$^2$ and the porosity is 60%, the thickness of the image-receiving layer is about 15 μm or more. From this viewpoint, the thickness of the image-receiving layer is preferably in a range of 10 μm to 50 μm.

The pore diameter of the image-receiving layer is preferably in a range of 0.005 μm to 0.030 μm in terms of median diameter, and more preferably 0.01 μm to 0.025 μm.

The porosity and the pore median diameter may be measured using a mercury porosimeter (PORESIZER 9320-PC2, manufactured by Shimadzu Corporation).

(Inorganic Fine Particles)

Examples of the inorganic fine particles include silica fine particles, colloidal silica, titanium dioxide fine particles, barium sulfate fine particles, calcium silicate fine particles, zeolite fine particles, kaolinite fine particles, halloysite fine particles, mica fine particles, talc fine particles, calcium carbonate fine particles, magnesium carbonate fine particles, calcium sulfate fine particles, boehmite fine particles, and pseudoboehmite fine particles. Among these, silica fine particles are preferable.

Silica fine particles may have high efficiency with respect to absorption and retaining of ink, as a result of their particularly high specific surface area. Further, since the silica fine particles have a low refractive index, a transparent image-receiving layer can be provided when the silica fine particles are dispersed with an appropriate microparticle diameter, and high color density and favorable coloring properties can be provided. The transparency of the image-receiving layer may be important from the viewpoint of obtaining high color density and favorable coloring properties and glossiness.

The average primary particle diameter of the inorganic fine particles is preferably 20 nm or less, more preferably 15 nm or less, and particularly preferably 10 nm or less. When the average primary particle diameter is 20 nm or less, ink absorption characteristics may be effectively improved and, at the same time, glossiness of the surface of the image-receiving layer may be enhanced.

The specific surface area of the inorganic fine particles as measured by the BET method is preferably 200 m$^2$/g or higher, more preferably 250 m$^2$/g or higher, and particularly preferably 380 m$^2$/g or higher. When the specific surface area of the inorganic fine particles is 200 m$^2$/g or higher, the image-receiving layer may have high transparency and high image density.

The BET method referred to in the present invention is a method of measuring a surface area of powder using a vapor-phase adsorption method, and is a method of determining a specific surface area, that is the total surface area per 1 g of a specimen, from an adsorption isotherm. In the BET method, nitrogen gas is usually used as a gas to be adsorbed, and the adsorption amount is most widely determined from a change in pressure or volume of the adsorbed gas. An equation proposed by Brunauer, Emmett, and Teller, which is called a BET equation, is the most recognized equation representing an isotherm of multimolecular adsorption. The BET equation is widely used for determining a surface area. An adsorption amount is determined based on the BET equation, and the resulting adsorption amount is multiplied by an area on the surface occupied by one adsorbed molecule, whereby the surface area is determined.

Silica fine particles have silanol groups on surfaces thereof. The particles easily adhere to each other through hydrogen bonding of the silanol groups, and particles are adhered to one another also via an interaction between the water-soluble resin and the silanol groups. Hence, when the average primary particle diameter of silica fine particles is 20 nm or less as described above, the image-receiving layer may have a structure having high porosity and high transparency, and the image-receiving layer may have effectively improved ink absorption characteristics.

In general, the silica fine particles are roughly classified into wet process silica particles and dry process (vapor-phase process) silica particles according to the production method thereof. In the wet process, a method is widely used of producing hydrous silica by forming active silica by acid decomposition of a silicate, polymerizing the active silica to a certain degree, and allowing the resultant polymerized product to aggregate and precipitate. In the vapor-phase process, a method is widely used of producing anhydrous silica by high-temperature vapor-phase hydrolysis of a silicon halide (flame hydrolysis) or a method in which silica sand and coke are subjected to heat reduction and evaporation by an arc in an electric furnace and the resultant product is oxidized by air (arc process). The term "vapor-phase process silica" as used herein refers to anhydrous silica fine particles obtained by the vapor-phase processes.

The vapor-phase process silica differs from the hydrous silica in terms of the density of silanol groups on the surface thereof, the presence or absence of pores, and the like, and exhibits different properties from those of the hydrous silica. The vapor-phase process silica is suitable for forming three-dimensional structures having high porosity. While the reason for this is not clearly understood, it can be supposed as follows. Namely, hydrous silica fine particles have a high density of silanol groups on the surface, at from 5 per $nm^2$ to 8 per $nm^2$, thus the silica fine particles tend to coagulate (aggregate) densely. In contrast, vapor-phase process silica particles have a lower density of silanol groups on the surface, at from 2 per $nm^2$ to 3 per $nm^2$, thus vapor-phase process silica seems to form less compact, loose coagulations (flocculations), consequently leading to a structure with a higher porosity.

In the present invention, vapor-phase process silica fine particles (anhydrous silica) which can be obtained by the dry method are preferable, and silica fine particles having a density of silanol groups on the surface at from 2 per $nm^2$ to 3 per $nm^2$ are more preferable. The inorganic fine particles most preferably used in the present invention are vapor-phase process silica having a specific surface area of 200 $m^2/g$ or more as measured by the BET method.

(Water-Soluble Resin)

Examples of the water-soluble resin include polyvinyl alcohol resins having a hydroxyl group as a hydrophilic group (for example, polyvinyl alcohol (PVA), acetoacetyl-modified polyvinyl alcohol, cation-modified polyvinyl alcohol, anion-modified polyvinyl alcohol, silanol-modified polyvinyl alcohol, and polyvinyl acetal), cellulose resins (for example, methyl cellulose (MC), ethyl cellulose (EC), hydroxyethyl cellulose (HEC), carboxymethyl cellulose (CMC), hydroxypropyl cellulose (HPC), hydroxyethyl methyl cellulose, and hydroxypropyl methyl cellulose), chitins, chitosans, starches, resins having an ether bond (for example, polyethylene oxide (PEO), polypropylene oxide (PPO), and polyvinyl ether (PVE)), and resins having a carbamoyl group (for example, polyacrylamide (PAAM), polyvinyl pyrrolidone (PVP), and polyacrylic acid hydrazide).

Examples of the water-soluble resin further include polyacrylic acid, maleic acid resins, alginic acid, and gelatins, each of which has a carboxyl group and/or a salt thereof as a dissociable group.

Among the above resins, polyvinyl alcohol resins are particularly preferable. Examples of polyvinyl alcohol resins include those described in JP1992-52786B (JP-H4-52786B), JP1993-67432B (JP-H5-67432B), JP1995-29479B (JP-H7-29479B), Japanese Patent No. 2537827, JP1995-57553B (JP-H7-57553B), Japanese Patent No. 2502998, Japanese Patent No. 3053231, JP1988-176173A (JP-S63-176173A), Japanese Patent No. 2604367, JP1995-276787A (JP-H7-276787A), JP1997-207425A (JP-H9-207425A), JP1999-58941A (JP-H11-58941A), JP2000-135858A, JP2001-205924A, JP2001-287444A, JP1987-278080A (JP-S62-278080A), JP1997-39373A (JP-H9-39373A), Japanese Patent No. 2750433, JP2000-158801A, JP2001-213045A, JP2001-328345A, JP1996-324105A (JP-H8-324105A), and JP1999-348417A (JP-H11-348417A).

Further, examples of water-soluble resins other than polyvinyl alcohol resins include the compounds described in paragraphs [0011] to [0014] of JP1999-165461A (JP-H11-165461A).

These water-soluble resins may be used may be used alone or in a combination of two or more thereof.

The content of the water-soluble resin used in the present invention is preferably in a range of 9% by mass to 40% by mass, and more preferably 12% by mass to 33% by mass, with respect to the total solid content of the image-receiving layer.

The inorganic fine particle and the water-soluble resin that mainly constitute the image-receiving layer may be composed of a single material, or may be a mixture of plural materials, respectively.

From the viewpoint of maintaining transparency and improving image density, the type of the water-soluble resin which is used in combination with the inorganic fine particles is important. A polyvinyl alcohol resin is preferable as the water-soluble resin. Among these, a polyvinyl alcohol resin with a saponification degree of 70% to 100% is more preferable, and a polyvinyl alcohol resin with a saponification degree of 80% to 99.5% is still more preferable.

Further, a water-soluble resin other than the above-described polyvinyl alcohol resin may be used in combination with the above-described polyvinyl alcohol resin. When used in combination, the content of the polyvinyl alcohol resin is preferably 50% by mass or higher, and more preferably 70% by mass or higher with respect to the total content of water-soluble resins.

The content ratio by mass (PB ratio (x/y)) of the inorganic fine particles (x) to the water-soluble resin (y) may significantly affect the film structure and the film strength of the image-receiving layer. In other words, a higher content ratio by mass (PB ratio) may provide a higher porosity, a higher pore volume, and a larger surface area (per unit mass) while density and strength tend to decrease.

The content ratio (PB ratio (x/y)) in the image-receiving layer in accordance with the present invention is preferably in a range of 1.5/1 to 10/1 from the viewpoint of preventing a decrease in film strength and the appearance of cracks during drying, which are caused by excessively high PB ratios, and avoiding a reduction in ink absorptivity by a decrease in porosity resulting from a tendency to pores being clogged by the resins, which develops when PB ratios are excessively low.

When passing through a conveyance system of an image recording apparatus, the printing paper is subjected to stress in some cases, so the image-receiving layer is required to have sufficient film strength. Moreover, the image-receiving layer is also required to have sufficient film strength from the viewpoint of avoiding cracking, exfoliating or the like of the image-receiving layer when the printing paper is cut into sheets. In view of these cases, the content mass ratio (x/y) is preferably 5/1 or less, while it is preferably 2/1 or more from the viewpoint of ensuring capability of high-speed ink absorption in inkjet printers.

For example, when a solution prepared by completely dispersing vapor-phase process silica having an average primary particle diameter of 20 nm or less (x) and a water-soluble resin (y) in an aqueous solution at a content mass ratio (x/y) of 2/1 to 5/1 is applied onto a support and the formed coating layer is dried, a three-dimensional network structure is formed having secondary particles of the silica fine particles as network chains, whereby a light-transmitting porous film having an average pore diameter of 30 nm or less, a porosity of 50% to 80%, a specific pore volume of 0.5 ml/g or more, and a specific surface area of 100 $m^2/g$ or more can be easily formed.

The image-receiving layer-forming liquid may be formed, for example, using the following methods.

When vapor-phase process silica is used as the inorganic fine particles, vapor-phase process silica and a dispersant are added into water (for example, the content of the vapor-phase process silica in water is in a range of 10% by mass to 20% by mass) and the resultant mixture is dispersed using a head-on-collision high pressure homogenizer (for example, "ULTIMIZER", manufactured by Sugino Machine Limited) under a high pressure condition of, for example, 120 MPa (preferably, 100 MPa to 200 MPa). Subsequently, a boron compound, an aqueous solution of PVA (for example, in an amount such that the mass of PVA is about one third of the mass of the vapor-phase process silica), and additional components are added thereto, and the resulting mixture is stirred, whereby an image-receiving layer-forming liquid is prepared. The resulting image-receiving layer-forming liquid is in a homogeneous sol state. When coating this image-receiving layer-forming liquid onto a support, a porous image-receiving layer having a three-dimensional network structure can be formed.

After mixing the vapor-phase process silica and the dispersant, the mixture may be dispersed using a disperser so as to decrease the particle size, as a result of which an aqueous dispersion having an average particle diameter of 50 nm to 300 nm can be obtained. Examples of the disperser to be used for obtaining the aqueous dispersion include various kinds of known dispersers such as a high-speed rotating disperser, a medium stirring disperser (for example, a ball mill or a sand mill), an ultrasonic disperser, a colloid mill disperser and a high pressure disperser. In order to efficiently disperse lump-like particles which are generated during dispersion, a stirring disperser, a colloid mill disperser or a high pressure disperser is preferable, and particularly, a head-on-collision high pressure disperser and an orifice-passing high pressure disperser is preferable.

Solvents used in the preparation may be selected from water, an organic solvent, and a mixed solvent thereof. Examples of organic solvents which can be used for the coating include alcohols such as methanol, ethanol, n-propanol, i-propanol, and methoxypropanol, ketones such as acetone and methyl ethyl ketone, tetrahydrofuran, acetonitrile, ethyl acetate, and toluene.

The dispersant may be a cationic polymer. Examples of the cationic polymer include organic mordants, polymers for coloring, and polyimines. A silane coupling agent is also preferably used as the dispersant.

The amount of the dispersant to be added is preferably in a range of 0.1% by mass to 30% by mass, and more preferably 1% by mass to 10% by mass, with respect to the total content of the fine particles.

The inkjet image-receiving layer in accordance with the present invention may further contain a variety of known additives, as necessary, such as crosslinking agents, acids, ultraviolet absorbers, antioxidants, fluorescent whitening agents, monomers, polymerization initiators, polymerization inhibitors, bleed inhibitors, antiseptics, viscosity stabilizers, defoaming agents, surfactants, antistatic agents, mat agents, curling inhibitors, and water-resistant additives.

The crosslinking agent for crosslinking the water-soluble resin, especially for crosslinking the polyvinyl alcohol is preferably a boron compound. Specific examples of the boron compound include borax, boric acid, borates (such as orthoborate, $InBO_3$, $ScBO_3$, $YBO_3$, $LaBO_3$, $Mg_3(BO_3)_2$ and $CO_3(BO_3)_2$), diborates (such as $Mg_2B_2O_5$ and $CO_2B_2O_5$), metaborates (such as $LiBO_2$, $Ca(BO_2)_2$, $NaBO_2$ and $KBO_2$), tetraborates (such as $Na_2B_4O_7 \cdot 10H_2O$), pentaborates (such as $KB_5O_8 \cdot 4H_2O$ and $CsB_5O_5$) and hexaborates (such as $Ca_2B_6O_{11} \cdot 7H_2O$). Among these, from the viewpoint of rapidness of crosslinking reaction, borax, boric acid, and borates are preferable, and boric acid is particularly preferable.

Examples of a crosslinking agent for crosslinking the water-soluble resin include, in addition to the boron compounds, those described below. Examples of the crosslinking agent for crosslinking the water-soluble resin include: aldehyde compounds, such as formaldehyde, glyoxal and glutaraldehyde; ketone compounds, such as diacetyl and cyclopentanedione; active halogen compounds, such as bis(2-chloroethylurea)-2-hydroxy-4,6-dichloro-1,3,5-triazine and sodium salts of 2,4-dichloro-6-S-triazine; active vinyl compounds, such as divinylsulfonic acid, 1,3-vinylsulfonyl-2-propanol, N,N'-ethylenebis(vinylsulfonylacetamide) and 1,3,5-triacryloyl-hexahydro-S-triazine; N-methylol compounds, such as dimethylolurea and methyloldimethylhydantoin; melamine resins, such as methylolmelamine and alkylated methylolmelamine; epoxy resins; isocyanate compounds, such as 1,6-hexamethylene diisocyanate; aziridine compounds described in U.S. Pat. No. 3,017,280B and U.S. Pat. No. 2,983,611B; carboxyimide compounds described in U.S. Pat. No. 3,100,704B; epoxy compounds, such as glycerol triglycidyl ether; ethyleneimino compounds, such as 1,6-hexamethylene-N,N'-bisethyleneurea; halogenated carboxyaldehyde compounds, such as mucochloric acid and mucophenoxychloric acid; dioxane compounds, such as 2,3-dihydroxydioxane; metal-containing compounds, such as titanium lactate, aluminum sulfate, chrome alum, potassium alum, zirconyl acetate, and chromium acetate; polyamine compounds, such as tetraethylenepentamine; hydrazide compounds, such as adipic acid dihydrazide; and low-molecular-weight compounds or polymers each having at least two oxazoline groups.

These crosslinking agent may be used alone or in a combination of two or more thereof.

The amount of the crosslinking agent to be used is preferably in the range of 1% by mass to 50% by mass, and more preferably 5% by mass to 40% by mass, with respect to the content of the water-soluble resin.

The image-receiving layer in accordance with the present invention may contain an acid. When adding an acid, the surface pH of the image-receiving layer is adjusted to be in a range of 3 to 8, and preferably 5 to 7.5. When adjusting the surface pH as described above, resistance to yellowing of the white background area is improved, which is preferable. Measurement of the surface pH is performed according to the "Method A" (coating method) in the surface pH measurement methods defined by Japan Technical Association of the Pulp and Paper Industry (J. TAPPI). For example, the measurement may be performed using a pH indicator set for surface of paper, "TYPE MPC" (manufactured by Kyoritsu Chemical-Check Lab., Corporation), which corresponds to the Method A.

Specific examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salts of salicylic acid (salts of Zn, Al, Ca, Mg, or the like), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcylic acid, β-resorcylic acid, γ-resorcylic acid, gallic acid, fluoroglycine, sulfosalicylic acid, ascorbic acid, erythorbic acid, bisphenolic acid, hydrochloric acid, nitric acid, sulfuric acid, phosphoric acid, polyphosphoric acid, boric acid, and boronic acid. The addition amount of the acid may be determined such that the surface pH of the image-receiving layer is adjusted to be in a range of 3 to 8.

The acid may be used in the form of a metal salt (for example, a salt of sodium, potassium, calcium, cesium, zinc, copper, iron, aluminum, zirconium, lanthanum, yttrium, magnesium, strontium, or cerium) or in the form of an amine salt (for example, ammonia, triethylamine, tributylamine, piperazine, 2-methylpiperazine, or polyallylamine).

The image-receiving layer in accordance with the present invention preferably contains a storability improving agent such as an ultraviolet absorber, an antioxidant, or a bleed inhibitor.

Examples of the ultraviolet absorber, antioxidant, and bleed inhibitor include an alkylated phenol compound (including a hindered phenol compound), an alkylthiomethylphenol compound, a hydroquinone compound, an alkylated hydroquinone compound, a tocopherol compound, a thiodiphenyl ether compound, a compound having two or more thioether bonds, a bisphenol compound, an O-benzyl compound, an N-benzyl compound, an S-benzyl compound, a hydroxybenzyl compound, a triazine compound, a phosphonate compound, an acylaminophenol compound, an ester compound, an amide compound, ascorbic acid, an amine antioxidant, a 2-(2-hydroxyphenyl)benzotriazole compound, a 2-hydroxybenzophenone compound, an acrylate, a water-soluble metal salt, a hydrophobic metal salt, an organometallic compound, a metal complex, a hindered amine compound (including a TEMPO compound), a 2-(2-hydroxyphenyl)-1,3,5-triazine compound, a metal deactivator, a phosphite compound, a phosphonite compound, a hydroxyamine compound, a nitroso compound, a peroxide scavenger, a polyamide stabilizer, a polyether compound, a basic auxiliary stabilizer, a nucleating agent, a benzofuranone compound, an indolinone compound, a phosphine compound, a polyamine compound, a thiourea compound, a urea compound, a hydrazide compound, an amidine compound, a sugar compound, a hydroxybenzoic acid compound, a dihydroxybenzoic acid compound, and a trihydroxybenzoic acid compound.

Among these, an alkylated phenol compound, a compound having two or more thioether bonds, a bisphenol compound, ascorbic acid, an amine antioxidant, a water-soluble metal salt, a hydrophobic metal salt, an organometallic compound, a metal complex, a hindered amine compound, a hydroxyamine compound, a polyamine compound, a thiourea compound, a hydrazide compound, a hydroxybenzoic acid compound, a dihydroxybenzoic acid compound, and a trihydroxybenzoic acid compound are preferable.

The additional components described above may be added to the image-receiving layer-forming liquid. These additional components may be used alone or in a combination of two or more thereof. The additional components may be used in the form of an aqueous solution, a dispersion, a polymer dispersion, an emulsion or oil droplets, or may be encapsulated in microcapsules. In the image-receiving layer in accordance with the present invention, the content of the additional components is preferably in a range of 0.01 g/m$^2$ to 10 g/m$^2$.

When vapor-phase process silica is used as the inorganic fine particles, the silica surface may be processed with a silane coupling agent for the purpose of improving dispersibility of the vapor-phase process silica. The silane coupling agent is preferably those having an organic functional group, in addition to a moiety that performs coupling. Examples of such an organic functional group include a vinyl group, an amino group (a primary to tertiary amino group or a quaternary ammonium salt), an epoxy group, a mercapto group, a chloro group, an alkyl group, a phenyl group, and an ester group.

The image-receiving layer may preferably contain an organic solvent having a high boiling point for preventing curling of the image-receiving layer. The organic solvent having a high boiling point is an organic compound having a boiling point of 150° C. or higher under ambient pressure and may be a water-soluble compound or a hydrophobic compound. Such a solvent compound may be liquid or solid at room temperature, and may be a low molecular-weight compound or a high molecular-weight compound.

Specific examples of the organic solvent having a high boiling point include aromatic carboxylic acid esters (for example, dibutyl phthalate, diphenyl phthalate, and phenyl benzoate), aliphatic carboxylic acid esters (for example, dioctyl adipate, dibutyl sebacate, methyl stearate, dibutyl maleate, dibutyl fumarate, and triethyl acetyl citrate), phosphoric esters (for example, trioctyl phosphate and tricresyl phosphate), epoxy compounds (for example, epoxidated soybean oil and epoxidated fatty acid methyl ester), alcohols (for example, stearyl alcohol, ethylene glycol, propylene glycol, diethylene glycol, triethylene glycol, glycerin, diethylene glycol monobutyl ether, triethylene glycol monobutyl ether, glycerin monomethyl ether, 1,2,3-butanetriol, 1,2,4-butanetriol, 1,2,4-pentanetriol, 1,2,6-hexanetriol, 1,2-hexanediol, thiodiglycol, triethanolamine, and polyethylene glycol), vegetable oils (for example, soy bean oil and sunflower oil), and higher aliphatic carboxylic acids (for example, linoleic acid and oleic acid).

Among these, diethylene glycol monobutyl ether, triethylene glycol monobutyl ether, and 1,2-hexanediol are particularly preferable from the viewpoint of improving ink absorption speed and suppressing a decrease in image density.

The image-receiving layer in accordance with the present invention may contain a polymer fine particle dispersion. The polymer fine particle dispersion is used for improving film physical properties such as stabilization of size, prevention of curling, prevention of adhesion, and prevention of film-cracking. Description of the polymer fine particle dispersions is found in JP1987-245258A (JP-S62-245258A), JP1987-1316648A (JP-S62-1316648A), and JP1987-110066A (JP-S62-110066A). When a dispersion of fine particles of a polymer having a low glass transition temperature (40° C. or lower) is contained in the image-receiving layer, cracking and curling of the layer may be prevented.

Hereinafter, a patterned linear polarizing layer that can be used in the present invention will be described.

Patterned Linear Polarizing Layer:

The printing paper in accordance with the present invention has a patterned linear polarizing layer. The patterned linear polarizing layer is not particularly limited and may be appropriately selected depending on the intended purpose, as long as it may be a layer which changes light vibrating in any direction (e.g., natural light) to a linearly polarized light. The polarizing layer preferably has a monolayer transmittance of 30% or higher, more preferably 35% or higher, and particularly preferably 40% or higher. When the monolayer transmittance of the polarizing layer is less than 30%, the use efficiency of light is considerably decreased. Also, the order parameter of the polarizing layer is preferably 0.7 or higher, more preferably 0.8 or higher, and particularly preferably 0.9 or higher. When the order parameter of the polarizing layer is lower than 0.7, the use efficiency of light is considerably decreased. The optical density of the absorption axis of the polarizing layer is preferably 1 or higher, more preferably 1.5 or higher, and particularly preferably 2 or higher. When the optical density of the absorption axis of the polarizing layer is lower than 1, the polarization degree is considerably reduced, thus resulting in appearance of crosstalk or ghost images. The wavelength band of the polarizing layer preferably covers the range of 400 nm to 800 nm from the viewpoint of converting visible light into polarized light. The thickness of the polarizing layer is not particularly limited and may be appropriately selected depending on the intended purpose. The thickness thereof is preferably in a range of 0.01 µm to 2 µm, and more preferably 0.05 µm to 2 µm, from the viewpoint of obtaining desired optical characteristics, not causing parallax, and allowing easy production.

There is no particular limitation on materials and production methods for the linear polarizing layer. Preferable examples of the polarizing layer include iodine-based polarizing plates, dye-based polarizing plates using a dichroic dye, and polyene-based polarizing plates. Among these polarizing plates, iodine-based polarizing plates and dye-based polarizing plates can be generally produced by stretching a polyvinyl alcohol film and adsorbing iodine or a dichroic dye on the film. In this case, the transmission axis of the polarizing layer is perpendicular to the stretching direction of the film.

In addition to such stretched polarizing plates, the following linear polarizing films are suitably used as the linear polarizing plate in the present invention, since they have convenience of patterning and a relatively high polarization degree. Preferable examples of the polarizing plate include linearly polarizing plates containing polymerizable cholesteric liquid crystals described in JP2000-352611A, guest-host type linearly polarizing plates containing a dichroic dye and uniaxially-aligned liquid crystals described in JP1999-101964A (JP-H11-101964A), JP2006-161051A, JP2007-199237A, JP2002-527786A, JP2006-525382A, JP2007-536415A, JP2008-547062A, and Japanese Patent No. 3335173, wire-grid polarizing plates using a grid of metal such as aluminum described in JP1980-95981A (JP-S55-95981A), polarizing plates made of a polymer compound or a liquid crystal compound containing carbon nanotubes dispersed/aligned therein described in JP2002-365427A, polarizing plates made of a polymer compound containing metal microparticles dispersed/aligned therein described in JP2006-184624A, polyvinylene-type linearly polarizing plates described in JP1999-248937A (JP-H11-248937A), JP1998-508123A (JP-H10-508123A), JP2005-522726A, JP2005-522727A and JP2006-522365A, polarizing plates made of a lyotropic liquid crystal dye represented by $(SO_3M)_n$ (chromogen) described in JP1995-261024A (JP-H7-261024A), JP1996-286029A (JP-H8-286029A), JP2002-180052A, JP2002-90526A, JP2002-357720A, JP2005-154746A, JP2006-47966A, JP2006-48078A, JP2006-98927A, JP2006-193722A, JP2006-206878A, JP2006-215396A, JP2006-225671A, JP2006-328157A, JP2007-126628A, JP2007-133184A, JP2007-145995A, JP2007-186428A, JP2007-199333A, JP2007-291246A, JP2007-302807A, JP2008-9417A, JP2002-515075A, JP2006-518871A, JP2006-508034A, JP2006-531636A, JP2006-526013A and JP2007-512236A, and polarizing plates made of a dichroic dye described in JP1996-278409A (JP-H8-278409A) and JP1999-305036A (JP-H11-305036A). In general, the cholesteric liquid crystals have the function of separating circularly polarized light. But, when used in combination with a quarter-wave layer, the cholesteric liquid crystals may be used to form a linearly polarizing plate. In this case, the quarter-wave layer is preferably made from a composition containing at least one liquid crystal compound. Also, the quarter-wave layer is preferably a layer formed as follows: a composition containing at least one liquid crystal compound having a polymerizable group is allowed to have a liquid crystal phase, followed by curing through application of heat and/or UV rays. In terms of polarization degree, particularly preferred are iodine-based polarizing plates, dye-based polarizing plates using a dichroic dye, polarizing plates made of a lyotropic liquid crystal dye, and polarizing plates made of a dichroic dye.

Among others, the linear polarizing layer used in the present invention is preferably a coating-type linear polarizing layer formed by applying a liquid crystal composition containing a dichroic dye, from the viewpoint of achieving easy patterning and film thickness reduction. Hereinafter, a linear polarizing layer will be described which is formed from a liquid crystal composition containing a dichroic dye.

[Dichroic Dye]

The term "dichroic dye" used in the formation of one embodiment of the linear polarizing layer means a dye whose absorbance varies depending on a direction. Further, "dichroism" and "dichroic ratio" are calculated as the ratio of the absorbance of polarization in an absorption axis direction with respect to the absorbance of polarization in a polarization axis direction when the dichroic dye composition is used as a dichroic dye layer. The dichroic dye used in the formation of a linear polarizing layer preferably has liquid crystallinity, and more preferably nematic liquid crystallinity. Although the liquid crystal composition containing a dichroic dye used in the formation of a linear polarizing layer (hereinafter, also referred to as "dichroic dye composition") may contain a liquid crystalline, achromatic, low-molecular weight compound, the proportion thereof is preferably 30% by mass or less, more preferably 20% by mass or less, still more preferably 10% by mass or less, and particularly preferably 5% by mass or less. That is, with regard to the liquid crystal composition used in the present invention, it is preferable that dichroic dye molecules are aligned by their alignment ability or by combination with an additional dye, and the alignment state thereof is fixed, whereby the dichroic dye molecules function as a dichroic dye layer. For example, although the liquid crystal composition may be prepared as a so-called guest-host (GH) type composition achieving a given dichroic ratio by aligning dichroic dye molecules along the molecular alignment of the liquid crystal compound, using a composition containing an achromatic liquid crystal compound as a main component, in combination with a dichroic dye, the foregoing embodiment can achieve a higher dichroic ratio than the embodiment of GH and is therefore preferable. The composition used in the present invention contains a low proportion of a liquid crystalline, achromatic, low-molecular weight compound or does not contain the same, and is therefore capable of achieving a high dye concentration, and thickness reduction of a linear polarizing layer.

A preferable embodiment is also an embodiment in which the linear polarizing layer formed from a liquid crystal composition shows diffraction peaks derived from the periodic structure in the direction perpendicular to the alignment axis in the X-ray diffraction measurement, the period exhibited by at least one of those diffraction peaks is in a range of 3.0 Å to 15.0 Å, and the intensity of the diffraction peak does not exhibit a maximum value in a range of the film-normal direction ±70° within a plane perpendicular to the alignment axis.

Herein, the term "alignment axis" means a direction in which the linear polarizing layer shows the largest absorbance against linearly polarized light, and is generally identical with the direction of the alignment treatment. For example, in the film in which horizontal alignment of the dichroic dye composition is immobilized, the alignment axis is an in-plane axis and is identical with the direction of the alignment treatment (when a rubbing-aligned film is used in the present invention, the alignment axis is identical with the rubbing direction, and when a photo-aligned film is used, the alignment axis is identical with the direction which gives rise to the largest value of a birefringence index exhibited by light irradiation to the photo-aligned film).

Generally, an azo dichroic dye that forms a dichroic dye layer is a rod-like molecule having a large aspect ratio (=molecular long axis length/molecular short axis length), and has a transition moment that absorbs visible light in the direction that approximately agrees with the long axis direction of the molecule (Dichroic Dyes for Liquid Crystal Displays). Therefore, the smaller the angle between the molecular long axis and the alignment axis of the dichroic dye is on average, and the smaller the variation is, the higher the dichroic ratio shown by the dichroic dye layer is.

The linear polarizing layer preferably exhibits diffraction peaks derived from the period in the direction perpendicular to an alignment axis. For example, the period corresponds to an intermolecular distance of a dichroic dye in the molecular short axis direction, in where the molecular long axis of the dichroic dye is aligned in compliance with the alignment axis direction. In the present invention, the period is preferably in a range of 3.0 to 15.0 Å, more preferably 3.0 to 10.0 Å, still more preferably 3.0 to 6.0 Å, and particularly preferably 3.3 to 5.5 Å.

With regard to the diffraction peak, it is preferable that the linear polarizing layer does not exhibit a maximum value, when an intensity distribution is measured in a range of ±70° with respect to the film-normal direction within a plane perpendicular to the alignment axis. When the intensity of the diffraction peak exhibited a maximum value in the measurement, such a result suggests that there is anisotropy in the packing in the direction perpendicular to the alignment axis, that is, in the molecular short axis direction. Specific examples of such an aggregation state include crystals, hexatic phases, and crystalline phases (Handbook of Liquid Crystals). If there is anisotropy in the packing, discontinuous packing causes grain boundaries with domains, which may be undesirably responsible for the occurrence of haze, alignment disturbance in each domain, and depolarization. The above-mentioned linear polarizing layer exhibits no anisotropy in the packing in the direction perpendicular to the alignment axis, and therefore forms a uniform film without the occurrence of grain boundaries with domains. Specific examples of such an aggregation state include, but are not limited to, nematic phases, smectic A phases, and a supercooled state of these phases. Further, an embodiment is also possible in which plural aggregation states are mixed to generally exhibit the above-mentioned characteristics of diffraction peaks.

Since a dichroic dye layer is generally used for light which is incident at an angle of perpendicular or approximately perpendicular to a film, it is preferred that the dichroic dye layer has a high dichroic ratio in the in-plane direction. Accordingly, the dichroic dye layer preferably has a periodic structure in the in-plane direction and exhibits diffraction peaks derived from the periodic structure.

The linear polarizing layer preferably exhibits diffraction peaks derived from the period in the direction parallel to the alignment axis. In particular, it is preferred that adjacent molecules in the direction perpendicular to the alignment axis form a layer, and the resulting layer is laminated in the direction parallel to the alignment axis. Such an aggregation state is similar to a smectic phase which is in a higher order than a nematic phase, and a high dichroic ratio can be obtained. The period includes, for example, a period corresponding to a molecular length or a period corresponding to twice as long as the molecular length, and is in a range of 3.0 Å to 50.0 Å, preferably 10.0 Å to 45.0 Å, more preferably 15.0 Å to 40.0 Å, and still more preferably 25.0 Å to 35.0 Å.

The diffraction peak exhibited by linear polarizing layer preferably has a half width of 1.0 Å or less.

As used herein, the term "half width" means a value obtained by measuring the intensity of the top of the peak using a baseline as a reference in one diffraction peak in the X-ray diffraction measurement, taking two points showing a half intensity of the intensity that are positioned on the left and right of the peak top, respectively, and calculating the difference between the values of the periods shown by the respective two points.

It is presumed that the dichroic dye layer showing a diffraction peak having a half width of 1.0 Å or less in the X-ray diffraction measurement exhibits a high dichroic ratio for the following reason.

When the variation of angles between the molecular long axes and the alignment axes of dichroic dyes is large, the variation of the intermolecular distance also becomes large. Thus, for a periodic structure existing, the values of the periods also vary, and a diffraction peak obtained by the X-ray diffraction measurement becomes broad and shows a large half width.

On the other hand, that the peaks are sharp peaks in which the half widths of the diffraction peaks are a certain value or less means that the variation of the intermolecular distance is small and that the angles between the molecular long axes and the alignment axes of the dichroic dye are small on average, i.e., highly-ordered alignment, and it is presumed that a high dichroic ratio is exhibited.

The half width of the diffraction peak in the present invention is 1.0 Å or less, preferably 0.90 Å or less, more preferably 0.70 Å or less, further preferably 0.50 Å or less, and preferably 0.1 Å or more. When the half width is more than the upper limit, it is not preferable since the distance between molecules in the dye varies widely and highly-ordered alignment is impaired. On the other hand, when the half width is lower than the lower limit, it is not preferable since the distortion of alignment occurs easily and grain boundaries are generated with domains, and the generation of haze, the disturbance of alignment in each domain, and depolarization may be caused.

The period and half width of the diffraction peak of the dichroic dye layer are obtained from an X-ray profile that is measured by an X-ray diffractometer for evaluation of thin films (trade name: "ATX-G" in-plane optical system, manufactured by Rigaku Corporation) or an equivalent apparatus.

X-ray diffraction measurement of the linear polarizing layer in accordance with the present invention is carried out, for example, according to the following procedure.

Namely, at first, in-plane measurements in all directions are performed at 15° intervals for the linear polarizing layer. The direction in the plane of the substrate at which the peak intensity is large is determined by so-called $\phi$ scanning in which a sample is measured by rotating it in the plane parallel to the substrate while the angle at which a peak has been observed is fixed. Using the peak of the in-plane measurement in the obtained direction, the period and half width can be calculated.

The formation of the linear polarizing layer preferably uses a dichroic dye composition containing at least one of azo dichroic dyes having nematic liquid crystallinity.

The dichroic dye composition in accordance with the present invention particularly preferably contains at least one of azo dyes represented by the following formula (I), (II), (III)

or (IV). The dichroic dye represented by the following formulae (I) to (IV) preferably has nematic liquid crystallinity.

[Chem. 10]

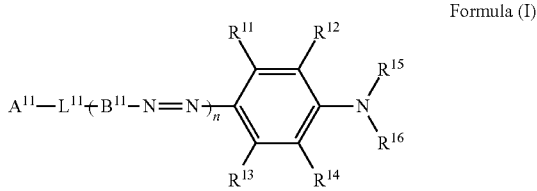

Formula (I)

In formula (I), $R^{11}$ to $R^{14}$ each independently represent a hydrogen atom or a substituent; $R^{15}$ and $R^{16}$ each independently represent a hydrogen atom or an alkyl group which may have a substituent; $L^{11}$ represents —N=N—, —CH=N—, —N=CH—, —C(=O)O—, —OC(=O)— or —CH=CH—; $A^{11}$ represents a phenyl group which may have a substituent, a naphthyl group which may have a substituent, or an aromatic heterocyclic group which may have a substituent; $B^{11}$ represents a divalent aromatic hydrocarbon group or divalent aromatic heterocyclic group which may have a substituent; n denotes an integer of 1 to 5, and when n is 2 or more, plural $B^{11}$'s may be the same as or different from each other.

Examples of the substituents represented by $R^{11}$ to $R^{14}$ in formula (I) include the following groups:

an alkyl group (preferably an alkyl group having 1 to 20 carbon atoms, more preferably 1 to 12 carbon atoms, and particularly preferably 1 to 8 carbon atoms, e.g., a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (preferably an alkenyl group having 2 to 20 carbon atoms, more preferably 2 to 12 carbon atoms, and particularly preferably 2 to 8 carbon atoms, e.g., a vinyl group, an allyl group, a 2-butenyl group, or a 3-pentenyl group), an alkynyl group (preferably an alkynyl group having 2 to 20 carbon atoms, more preferably 2 to 12 carbon atoms, and particularly preferably 2 to 8 carbon atoms, e.g., a propargyl group, or a 3-pentynyl group), an aryl group (preferably an aryl group having 6 to 30 carbon atoms, more preferably 6 to 20 carbon atoms, and particularly preferably 6 to 12 carbon atoms, e.g., a phenyl group, a 2,6-diethylphenyl group, a 3,5-ditrifluoromethylphenyl group, a naphthyl group, or a biphenyl group), a substituted or unsubstituted amino group (preferably an amino group having 0 to 20 carbon atoms, more preferably 0 to 10 carbon atoms, and particularly preferably 0 to 6 carbon atoms, e.g., an unsubstituted amino group, a methylamino group, a dimethylamino group, a diethylamino group, or an anilino group), an alkoxy group (preferably an alkoxy group having 1 to 20 carbon atoms, more preferably 1 to 10 carbon atoms, and particularly preferably 1 to 6 carbon atoms, e.g., a methoxy group, an ethoxy group, or a butoxy group), an oxycarbonyl group (preferably an oxycarbonyl group having 2 to 20 carbon atoms, more preferably 2 to 15 carbon atoms, and particularly preferably 2 to 10 carbon atoms, e.g., a methoxycarbonyl group, an ethoxycarbonyl group, or a phenoxycarbonyl group), an acyloxy group (preferably an acyloxy group having 2 to 20 carbon atoms, more preferably 2 to 10 carbon atoms, and particularly preferably 2 to 6 carbon atoms, e.g., an acetoxy group, or a benzoyloxy group), an acylamino group (preferably an acylamino group having 2 to 20 carbon atoms, more preferably 2 to 10 carbon atoms, and particularly preferably 2 to 6 carbon atoms, e.g., an acetylamino group, or a benzoylamino group), an alkoxycarbonylamino group (preferably an alkoxycarbonylamino group having 2 to 20 carbon atoms, more preferably 2 to 10 carbon atoms, and particularly preferably 2 to 6 carbon atoms, e.g., a methoxycarbonylamino group), an aryloxycarbonylamino group (preferably an aryloxycarbonylamino group having 7 to 20 carbon atoms, more preferably 7 to 16 carbon atoms, and particularly preferably 7 to 12 carbon atoms, e.g., a phenyloxycarbonylamino group), a sulfonylamino group (preferably a sulfonylamino group having 1 to 20 carbon atoms, more preferably 1 to 10 carbon atoms, and particularly preferably 1 to 6 carbon atoms, e.g., a methanesulfonylamino group, or a benzenesulfonylamino group), a sulfamoyl group (preferably a sulfamoyl group having 0 to 20 carbon atoms, more preferably 0 to 10 carbon atoms, and particularly preferably 0 to 6 carbon atoms, e.g., a sulfamoyl group, a methylsulfamoyl group, a dimethylsulfamoyl group, or a phenylsulfamoyl group), a carbamoyl group (preferably a carbamoyl group having 1 to 20 carbon atoms, more preferably 1 to 10 carbon atoms, and particularly preferably 1 to 6 carbon atoms, e.g., an unsubstituted carbamoyl group, a methylcarbamoyl group, a diethylcarbamoyl group, or a phenylcarbamoyl group), an alkylthio group (preferably an alkylthio group having 1 to 20 carbon atoms, more preferably 1 to 10 carbon atoms, and particularly preferably 1 to 6 carbon atoms, e.g., a methylthio group, or an ethylthio group), an arylthio group (preferably an arylthio group having 6 to 20 carbon atoms, more preferably 6 to 16 carbon atoms, and particularly preferably 6 to 12 carbon atoms, e.g., a phenylthio group), a sulfonyl group (preferably a sulfonyl group having 1 to 20 carbon atoms, more preferably 1 to 10 carbon atoms, and particularly preferably 1 to 6 carbon atoms, e.g., a mesyl group, or a tosyl group), a sulfinyl group (preferably a sulfinyl group having 1 to 20 carbon atoms, more preferably 1 to 10 carbon atoms, and particularly preferably 1 to 6 carbon atoms, e.g., a methanesulfinyl group, or a benzenesulfinyl group), an ureido group (preferably an ureido group having 1 to 20 carbon atoms, more preferably 1 to 10 carbon atoms, and particularly preferably 1 to 6 carbon atoms, e.g., an unsubstituted ureido group, a methylureido group, or a phenylureido group), a phosphoric acid amido group (preferably a phosphoric acid amido group having 1 to 20 carbon atoms, more preferably 1 to 10, and particularly preferably 1 to 6 carbon atoms, e.g., a diethylphosphoric acid amido group, or a phenylphosphoric acid amido group), a hydroxy group, a mercapto group, a halogen atom (e.g., a fluorine atom, a chlorine atom, a bromine atom, or an iodine atom), a cyano group, a nitro group, a hydroxamic acid group, a sulfino group, a hydrazino group, an imino group (—CH=N— or —N=CH—), an azo group, a heterocyclic group (preferably a heterocyclic group having 1 to 30 carbon atoms, more preferably 1 to 12 carbon atoms, a heterocyclic group containing a hetero atom such as a nitrogen atom, an oxygen atom or a sulfur atom, e.g., an imidazolyl group, a pyridyl group, a quinolyl group, a furyl group, a piperidyl group, a morpholino group, a benzoxazolyl group, a benzimidazolyl group, or a benzothiazolyl group), and a silyl group (preferably a silyl group having 3 to 40 carbon atoms, more preferably 3 to 30 carbon atoms, and particularly preferably 3 to 24 carbon atoms, e.g. a trimethylsilyl group, or a triphenylsilyl group).

These substituents may be further substituted by these substituents. When two or more substituents are present, the substituents may be the same as or different from each other. They may bind to each other to form a ring, if possible.

The groups represented by $R^{11}$ to $R^{14}$ each are preferably a hydrogen atom, an alkyl group, an alkoxy group or a halogen atom; more preferably a hydrogen atom, an alkyl group or an alkoxy group; and still more preferably a hydrogen atom or a methyl group.

The alkyl group represented by $R^{15}$ and $R^{16}$ which may have a substituent is preferably an alkyl group having preferably 1 to 20 carbon atoms, more preferably 1 to 12 carbon atoms and particularly preferably 1 to 8 carbon atoms, for example, a methyl group, an ethyl group, or an n-octyl group. The substituent of the alkyl group represented by $R^{15}$ and $R^{16}$ has the same meaning as the substituent represented by the above $R^{11}$ to $R^{14}$. When $R^{15}$ and $R^{16}$ represent an alkyl group, $R^{15}$ or $R^{16}$ together with $R^{12}$ or $R^{14}$ may form a ring structure. $R^{15}$ and $R^{16}$ each are preferably a hydrogen atom or an alkyl group, and more preferably a hydrogen atom, a methyl group or an ethyl group.

$A^{11}$ represents a substituted or unsubstituted phenyl group, a substituted or unsubstituted naphthyl group, or a substituted or unsubstituted aromatic heterocyclic group.

The substituent, which may be possessed by the phenyl group or the naphthyl group, is preferably a group which is introduced to enhance the solubility of an azo compound or nematic liquid crystallinity, a group having an electron donating property or an electron withdrawing property which is introduced to adjust color tone as a dye, or a group having a polymerizable group which is introduced to fix alignment. Specific examples thereof have the same meaning as the substituents represented by $R^{11}$ to $R^{14}$. Preferred examples of the substituent include a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted oxycarbonyl group, a substituted or unsubstituted acyloxy group, a substituted or unsubstituted acylamino group, a substituted or unsubstituted amino group, a substituted or unsubstituted alkoxycarbonylamino group, a substituted or unsubstituted sulfonylamino group, a substituted or unsubstituted sulfamoyl group, a substituted or unsubstituted carbamoyl group, a substituted or unsubstituted alkylthio group, a substituted or unsubstituted sulfonyl group, a substituted or unsubstituted ureido group, a nitro group, a hydroxy group, a cyano group, an imino group, an azo group and a halogen atom. Among them, particularly preferable are a substituted or unsubstituted alkyl group, a substituted or unsubstituted alkenyl group, a substituted or unsubstituted aryl group, a substituted or unsubstituted alkoxy group, a substituted or unsubstituted oxycarbonyl group, a substituted or unsubstituted acyloxy group, a nitro group, an imino group, and an azo group. With regard to the substituents having a carbon atom among these substituents, the preferable range of the number of a carbon atom is the same as that of the substituent represented by $R^{11}$ to $R^{14}$.

The number of the substituents which the phenyl group or the naphthyl group may have is 1 to 5, preferably 1. The phenyl group more preferably has one substituent at the para-position with respect to $L^1$.

The aromatic heterocyclic group is preferably a group derived from a monocyclic or bicyclic heterocycle. Examples of the atom other than a carbon atom which composes the aromatic heterocyclic group include a nitrogen atom, a sulfur atom, and an oxygen atom. When the aromatic heterocyclic group has a plurality of ring-constituting atoms other than the carbon atom, these atoms may be the same as or different from each other. Specific examples of the aromatic heterocyclic group include a pyridyl group, a quinolyl group, a thiophenyl group, a thiazolyl group, a benzothiazolyl group, a thiadiazolyl group, a quinolonyl group, a naphthalimidoyl group, and a thienothiazolyl group.

The aromatic heterocyclic group is preferably a pyridyl group, a quinolyl group, a thiazolyl group, a benzothiazolyl group, a thiadiazolyl group or a thienothiazolyl group, more preferably a pyridyl group, a benzothiazolyl group, a thiadiazolyl group or a thienothiazolyl group, and still more preferably a pyridyl group, a benzothiazolyl group or a thienothiazolyl group.

$A^{11}$ is particularly preferably a phenyl group, a pyridyl group, a benzothiazolyl group or a thienothiazolyl group, each of which may have a substituent.

$B^{11}$ represents a divalent substituted or unsubstituted aromatic hydrocarbon group or a divalent substituted or unsubstituted aromatic heterocyclic group. n denotes an integer of 1 to 4. When n is 2 or more, plural $B^{11}$'s may be the same as or different from each other.

The aromatic hydrocarbon group is preferably a phenyl group or a naphthyl group. Examples of the substituent which the aromatic hydrocarbon group may have include a substituted or unsubstituted alkyl group, a substituted or unsubstituted alkoxy group, a hydroxy group, a nitro group, a halogen atom, a substituted or unsubstituted amino group, a substituted or unsubstituted acylamino group, and a cyano group. The substituent which the aromatic hydrocarbon group may have is preferably a substituted or unsubstituted alkyl group, a substituted or unsubstituted alkoxy group, a hydroxy group or a halogen atom, more preferably a substituted or unsubstituted alkyl group, a substituted or unsubstituted alkoxy group or a halogen atom, and still more preferably a methyl group or a halogen atom.

The aromatic heterocyclic group is preferably a group derived from a monocyclic or bicyclic heterocycle. Examples of the atoms constituting the aromatic heterocyclic group other than the carbon atom include a nitrogen atom, a sulfur atom and an oxygen atom. When the aromatic heterocyclic group has the plural number of atoms constituting the ring other than the carbon atom, these atoms may be the same as or different from each other. Specific examples of the aromatic heterocyclic group include a pyridyl group, a quinolyl group, an isoquinolyl group, a benzothiadiazole group, a phthalimide group and a thienothiazole group. Among them, a thienothiazole group is particularly preferable. Examples of the substituent which may be possessed by the aromatic heterocyclic group include an alkyl group such as a methyl group or an ethyl group; an alkoxy group such as a methoxy group or an ethoxy group; an unsubstituted amino group, an alkylamino group such as a methylamino group; an acetylamino group, an acylamino group, a nitro group, a hydroxy group, a cyano group, and a halogen atom. Among these substituents, with respect to those having carbon atoms, the preferred range of the number of carbon atoms is the same as that of the substituent represented by $R^{11}$ to $R^{14}$.

Preferable examples of the azo dye represented by formula (I) include azo dyes represented by any one of formulae (Ia) and (Ib) below.

[Chem. 11]

Formula (Ia)

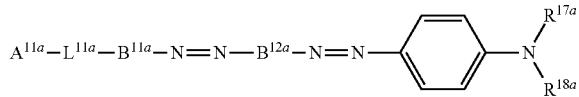

In formula (Ia), $R^{17a}$ and $R^{18a}$ each independently represent a hydrogen atom, a methyl group or an ethyl group; $L^{11a}$ represents —N=N—, —N=CH—, —O(C=O)—, or —CH=CH—; $A^{11a}$ represents a group represented by formula (Ia-II) or (Ia-III) below; and $B^{11a}$ and $B^{12a}$ each independently represent a group represented by formula (Ia-IV), (Ia-V) or (Ia-VI).

[Chem. 12]

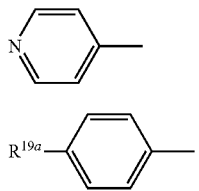

In formula (Ia-III), $R^{19a}$ represents an alkyl group which may have a substituent, an aryl group which may have a substituent, an alkoxy group which may have a substituent, an oxycarbonyl group which may have a substituent, or an acyloxy group which may have a substituent.

[Chem. 13]

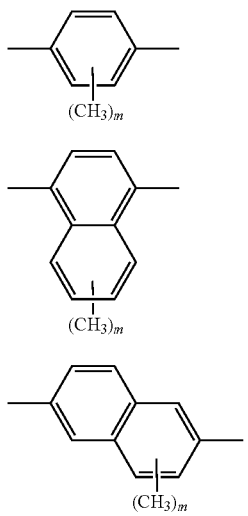

In formulae (Ia-IV), (Ia-V) and (Ia-VI), m denotes an integer of 0 to 2.

[Chem. 14]

Formula (Ib)

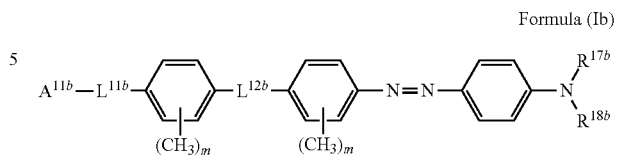

In formula (Ib), $R^{17b}$ and $R^{18b}$ each independently represent a hydrogen atom, a methyl group or an ethyl group; $L^{11b}$ represents —N=N— or —(C=O)O—; $L^{12b}$ represents —N=CH—, —(C=O)O— or —O(C=O)—; $A^{11b}$ represents a group represented by formula (Ib-II) or (Ib-III); and m denotes an integer of 0 to 2.

[Chem. 15]

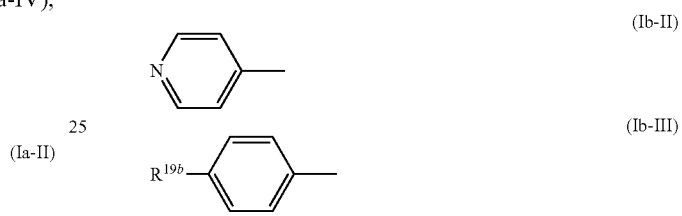

In formula (Ib-III), $R^{19b}$ represents an alkyl group which may have a substituent, an aryl group which may have a substituent, an alkoxy group which may have a substituent, an oxycarbonyl group which may have a substituent, or an acyloxy group which may have a substituent.

Examples of the substituent which each group has in formulae (Ia) and (Ib) are the same as the examples of the substituent represented by $R^{11}$ to $R^{14}$ in formula (I). Also, with regard to the groups having a carbon atom such as an alkyl group, the preferred range of the number of carbon atoms is the same as that of the substituent represented by $R^{11}$ to $R^{14}$.

The compound represented by formula (I), (Ia) or (Ib) may have a polymerizable group as the substituent. It is preferable that the polymerizable group is contained in those compounds, since the film hardening ability is improved. Examples of the polymerizable group include an unsaturated polymerizable group, an epoxy group and an aziridinyl group. The polymerizable group is preferably an unsaturated polymerizable group, and particularly preferably an ethylenically unsaturated polymerizable group. Examples of the ethylenically unsaturated polymerizable group include an acryloyl group and a methacryloyl group.

The polymerizable group is preferably positioned at the molecular terminal. That is, in formula (I), the polymerizable group is preferably present as a substituent for $R^{15}$ and/or $R^{16}$ and as a substituent for $Ar^{11}$.

Specific examples of the azo dye represented by formula (I) are shown below. However, the present invention is not limited to these specific examples.

Specific examples of the azo dye represented by formula (I) are shown below. However, the present invention is not limited to these specific examples.

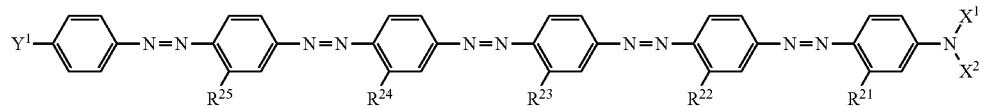

[Chem. 16]

| No. | X¹ | X² | R²¹ | R²² | R²³ | R²⁴ | R²⁵ | Y¹ |
|---|---|---|---|---|---|---|---|---|
| A-1 | —C$_2$H$_5$ | —C$_2$H$_5$ | —H | —CH$_3$ | —H | —H | —H | —C$_4$H$_9$ |
| A-2 | —C$_2$H$_5$ | —C$_2$H$_5$ | —H | —CH$_3$ | —CH$_3$ | —CH$_3$ | —H | —C$_4$H$_9$ |
| A-3 | —CH$_3$ | —CH$_3$ | —H | —CH$_3$ | —H | —H | —H | —C$_4$H$_9$ |

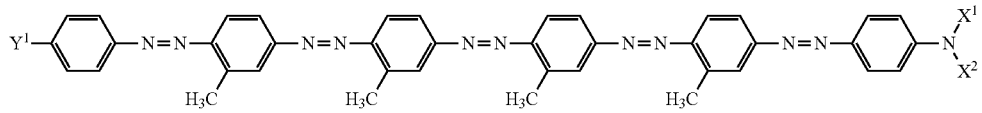

[Chem. 17]

| No. | X¹ | X² | Y¹ |
|---|---|---|---|
| A-4 | —C$_2$H$_5$ | —C$_2$H$_5$ | —O—C(=O)—C$_6$H$_4$—O(CH$_2$)$_4$OCOCH=CH$_2$ |
| A-5 | —C$_2$H$_5$ | —C$_2$H$_5$ | —O—C(=O)—C$_6$H$_4$—O(CH$_2$)$_{11}$OCOCH=CH$_2$ |

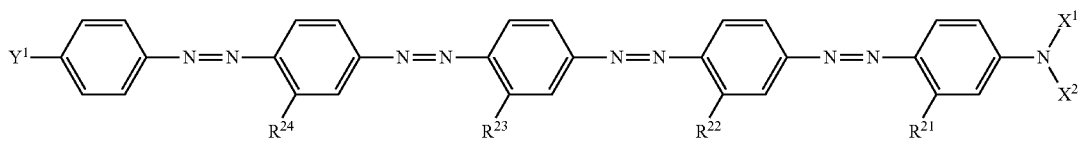

[Chem. 18]

| No. | X¹ | X² | R²¹ | R²² | R²³ | R²⁴ | Y¹ |
|---|---|---|---|---|---|---|---|
| A-9 | —C$_2$H$_5$ | —C$_2$H$_5$ | —H | —CH$_3$ | —H | —H | —C$_4$H$_9$ |
| A-10 | —C$_2$H$_5$ | —C$_2$H$_5$ | —CH$_3$ | —CH$_3$ | —H | —H | —C$_4$H$_9$ |
| A-11 | —C$_2$H$_5$ | —C$_2$H$_5$ | —H | —CH$_3$ | —CH$_3$ | —CH$_3$ | —C$_4$H$_9$ |
| A-15 | —C$_2$H$_5$ | —C$_2$H$_5$ | —H | —CH$_3$ | —CH$_3$ | —CH$_3$ | —O—C(=O)—C$_6$H$_4$—O(CH$_2$)$_4$OCOCH$_2$=CH |

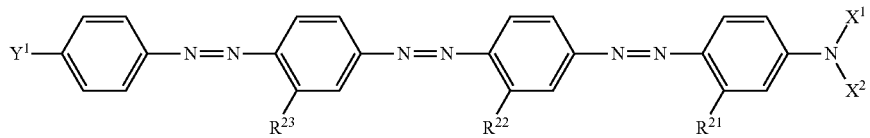

[Chem. 19]

| No. | X¹ | X² | R²¹ | R²² | R²³ | Y¹ |
|---|---|---|---|---|---|---|
| A-16 | —C$_2$H$_5$ | —C$_2$H$_5$ | —H | —CH$_3$ | —H | —C$_4$H$_9$ |
| A-17 | —C$_2$H$_5$ | —C$_2$H$_5$ | —H | —CH$_3$ | —CH$_3$ | —C$_4$H$_9$ |

-continued
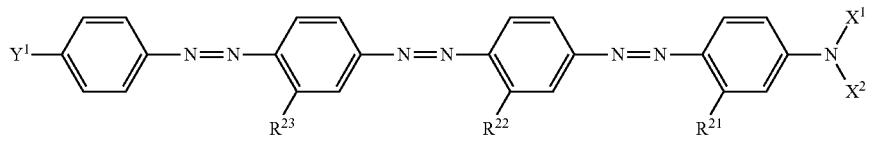
| No. | $X^1$ | $X^2$ | $R^{21}$ | $R^{22}$ | $R^{23}$ | $Y^1$ |
|---|---|---|---|---|---|---|
| A-18 | —$C_2H_5$ | —$C_2H_5$ | —H | —$CH_3$ | —H | |
| A-19 | —$C_2H_5$ | —$C_2H_5$ | —H | —$CH_3$ | —H | |
| A-24 | —$C_2H_5$ | —$C_2H_5$ | —$OCH_3$ | —$CH_3$ | —H | —$C_4H_9$ |
| A-23 | —$C_2H_5$ | —$C_2H_5$ | —H | —$CH_3$ | —$CH_3$ | |
[Chem. 20]
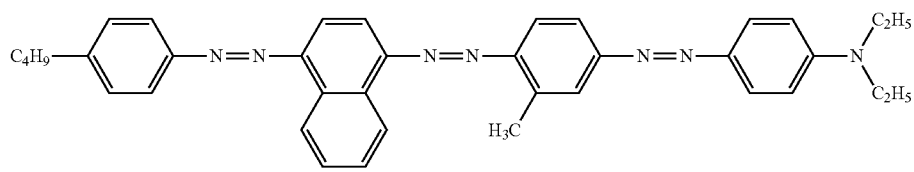
A-27
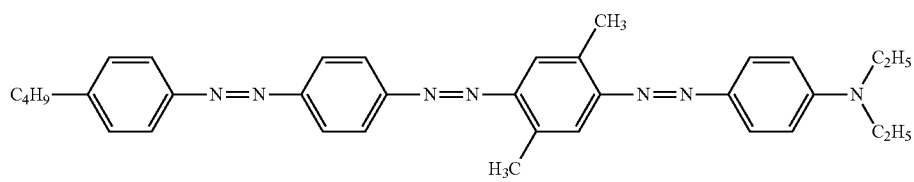
A-28
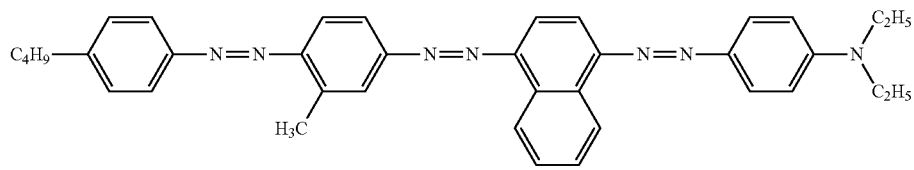
A-29
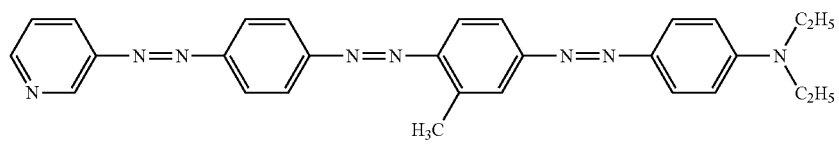
A-30
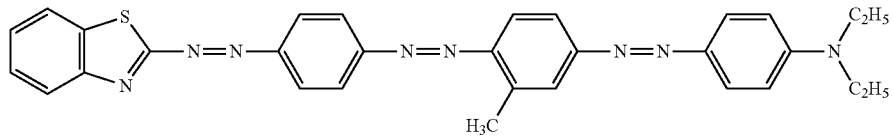
A-31

-continued
A-32
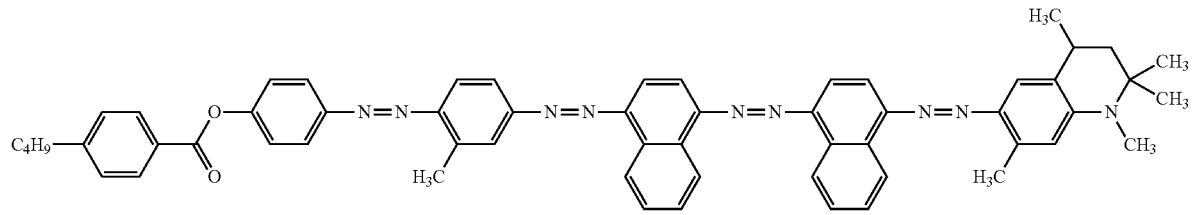
[Chem. 21]
A-33
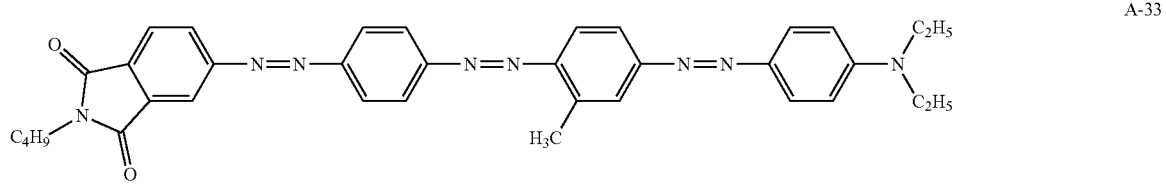
A-34
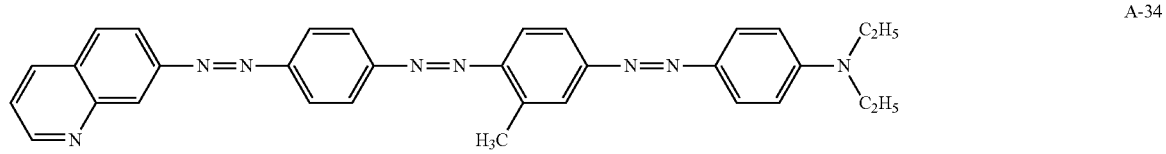
A-35
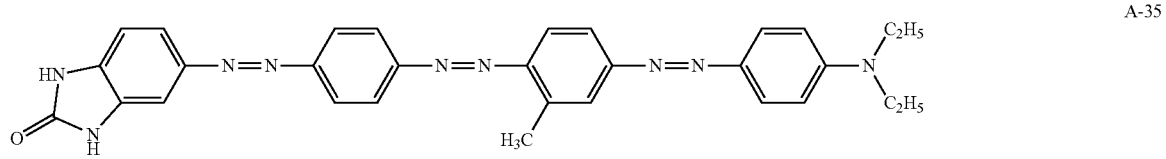
A-36
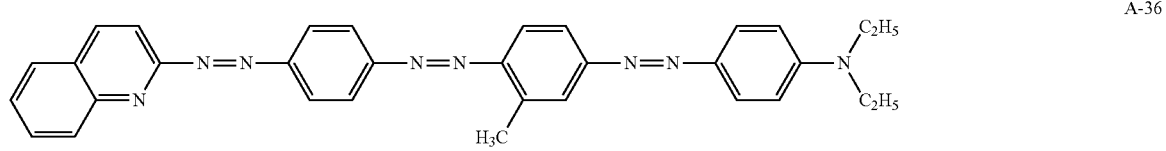
A-37
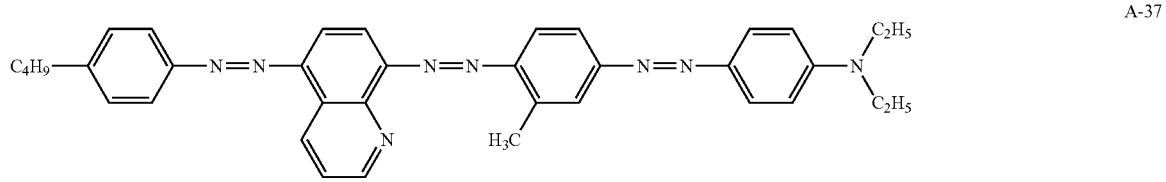
[Chem. 22]
A-38
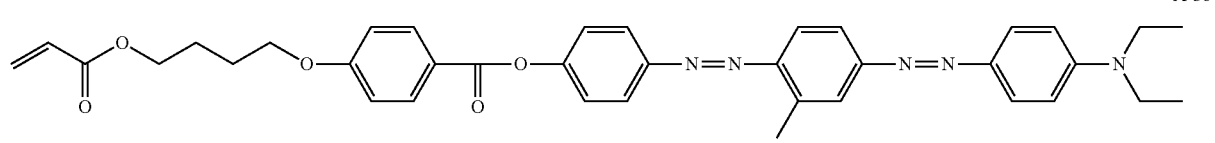
A-40
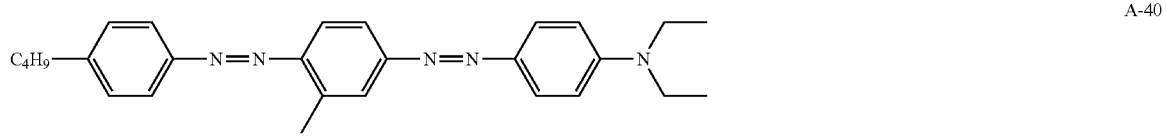
[Chem. 23]
A-41
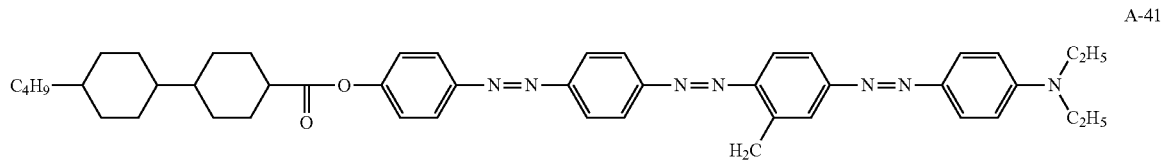

-continued
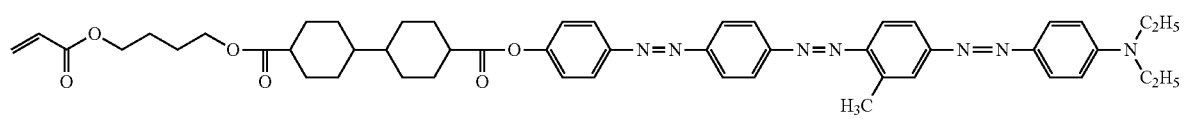
A-42
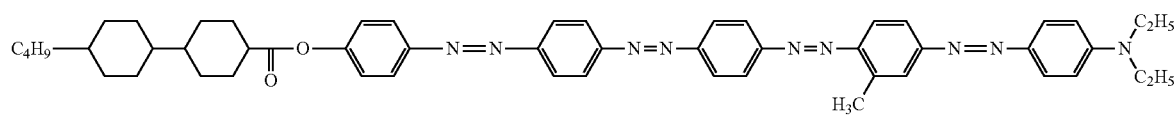
A-45
[Chem. 24]
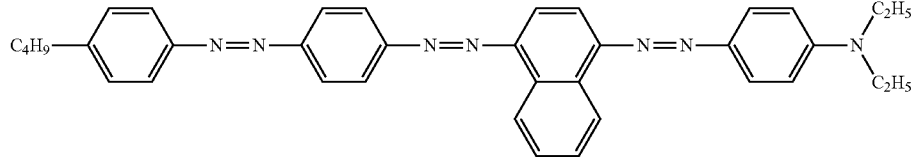
A-46
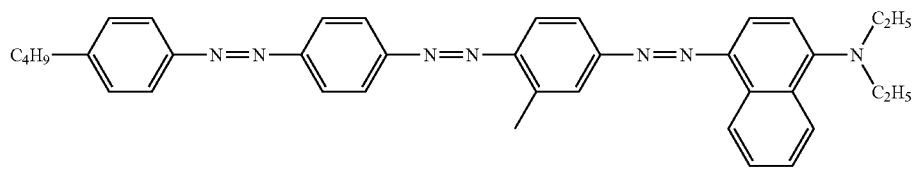
A-47
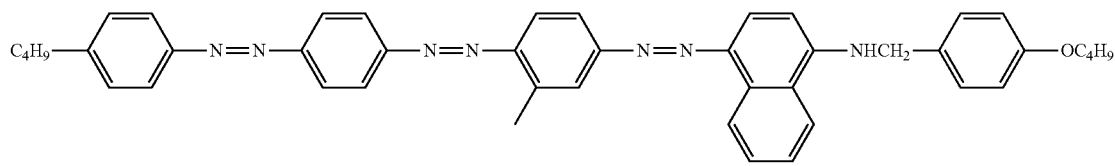
A-48
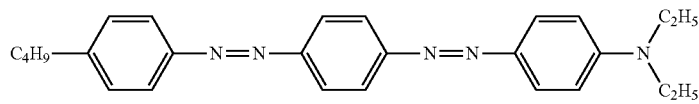
A-50
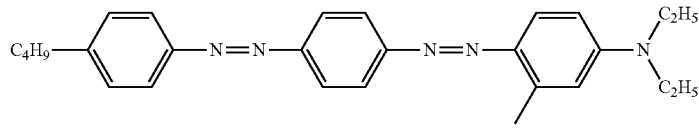
A-51
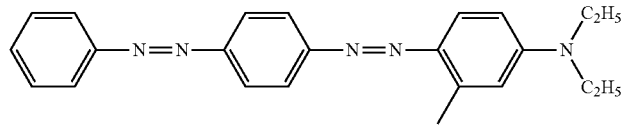
A-52
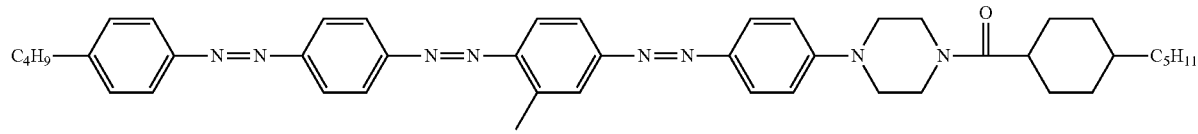
A-53
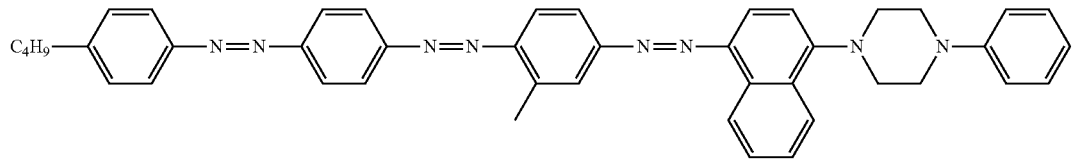
A-54

[Chem. 25]
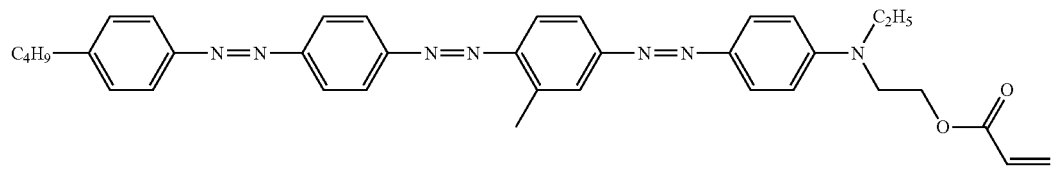
A-55
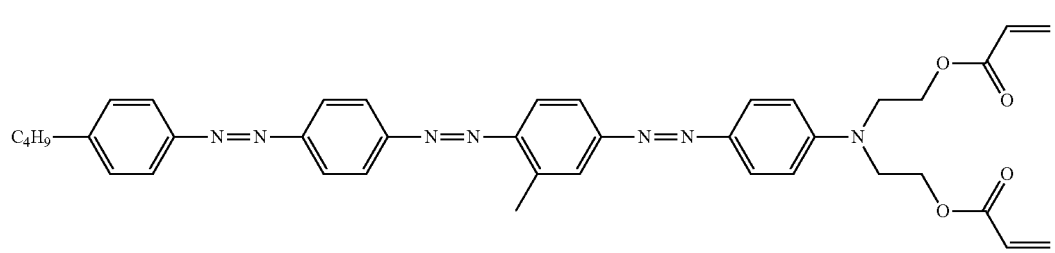
A-56
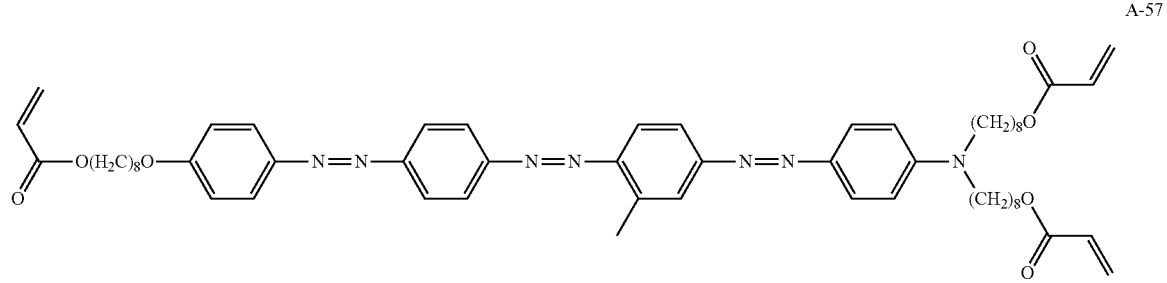
A-57
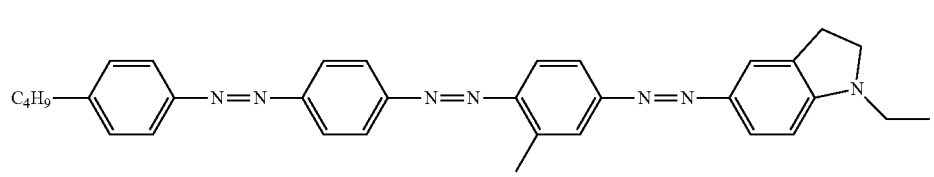
A-58
[Chem. 26]
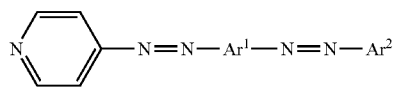
| Compound | Ar¹ | Ar² |
|---|---|---|
| B-1 |  | |
| B-2 | 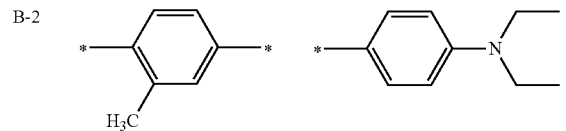 | |
| B-3 | 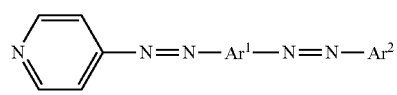 | |

[Chem. 27]

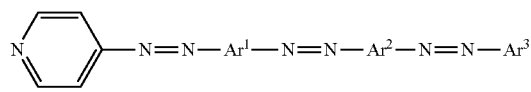

| Compound | Ar¹ | Ar² | Ar³ |
|---|---|---|---|
| B-4 | *-C₆H₄-* (para) | *-C₆H₃(CH₃)-* (2-methyl-1,4) | *-C₆H₄-N(C₂H₅)₂ |
| B-5 | *-C₆H₃(CH₃)-* (2-methyl-1,4) | *-C₆H₃(CH₃)-* (2-methyl-1,4) | *-C₆H₄-N(C₂H₅)₂ |
| B-6 | *-C₆H₄-* (para) | *-C₆H₃(CH₃)-* (2-methyl-1,4) | *-C₆H₄-N(n-C₄H₉)₂ |
| B-7 | *-C₆H₄-* (para) | *-C₆H₃(CH₃)-* (2-methyl-1,4) | *-C₆H₄-N(C₂H₅)(CH₂CH₂OH) |
| B-8 | *-C₆H₄-* (para) | *-C₆H₃(CH₃)-* (2-methyl-1,4) | *-(1-ethylindolin-5-yl) |
| B-9 | *-C₆H₄-* (para) | *-C₆H₃(CH₃)-* (2-methyl-1,4) | *-(1-(3-carboxypropyl)indolin-5-yl) |

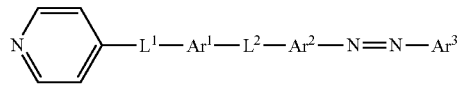

| Compound | L¹ | Ar¹ | L² | Ar² | Ar³ |
|---|---|---|---|---|---|
| B-10 | *-N=N-* | *-C₆H₃(CH₃)-* (3-methyl-1,4) | *-O-C(=O)-O-* | *-C₆H₄-* | *-C₆H₄-N(CH₃)(CH₂CH₂OMe) |
| B-11 | *-N=N-* | *-C₆H₃(CH₃)-* (3-methyl-1,4) | *-N=CH-* | *-C₆H₄-* | *-C₆H₄-N(C₂H₅)₂ |

-continued
[Chem. 27]
B-12 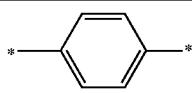  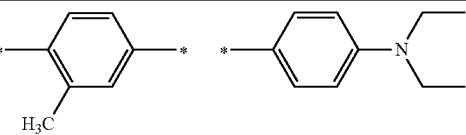
B-13 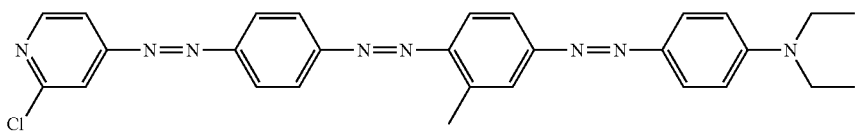 [SMILES: CCN(CC)c1ccc(N=Nc2ccc(N=Nc3ccc(N=Nc4ccnc(Cl)c4)cc3)c(C)c2)cc1]
B-14 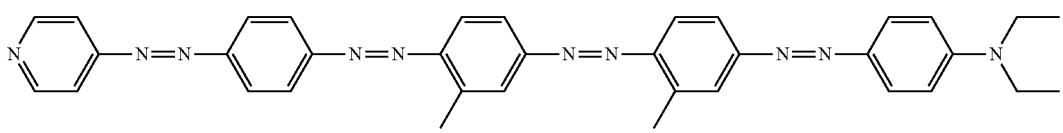
[Chem. 28]
C-1 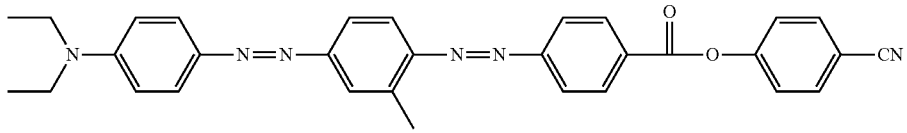
C-2 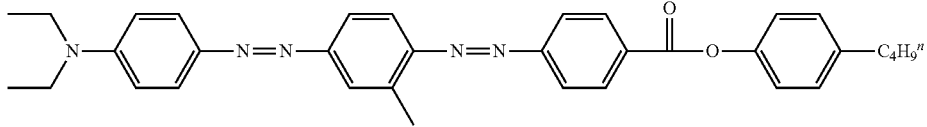
C-3 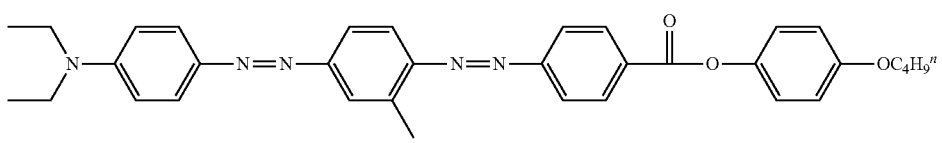
C-4 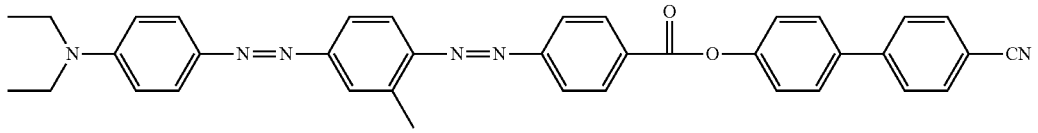
C-5 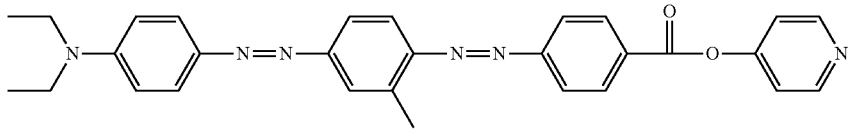
C-6 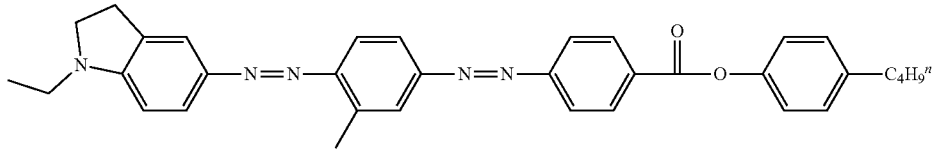
C-7 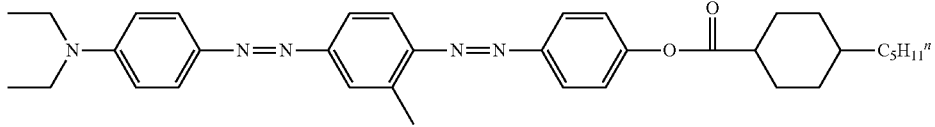

-continued
[Chem. 29]
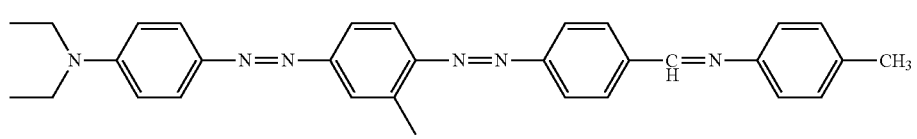 C-8
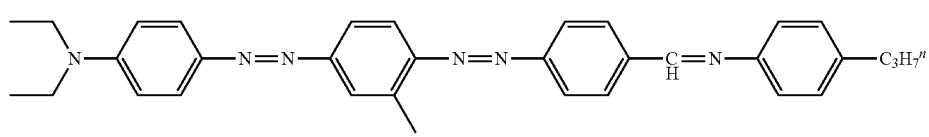 C-9
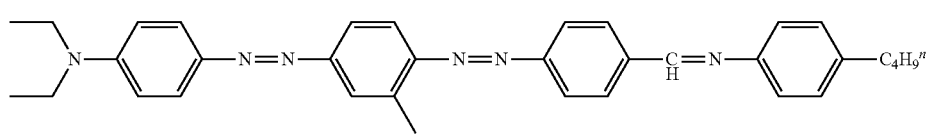 C-10
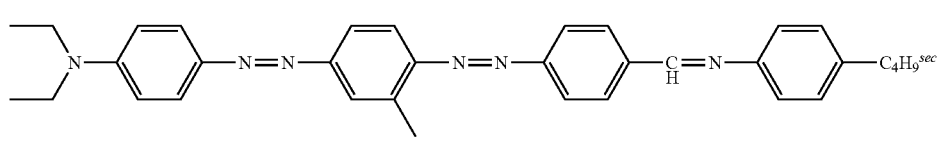 C-11
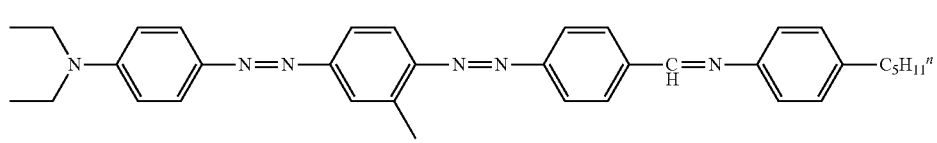 C-12
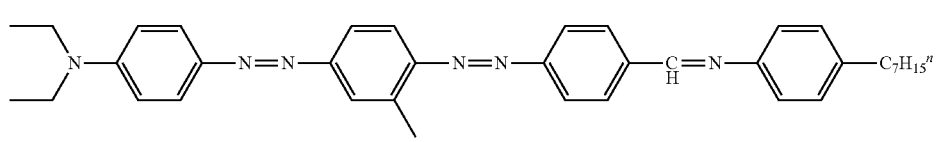 C-13
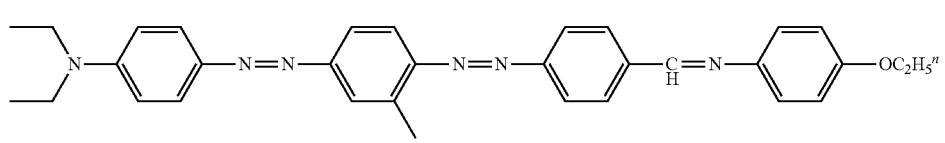 C-14
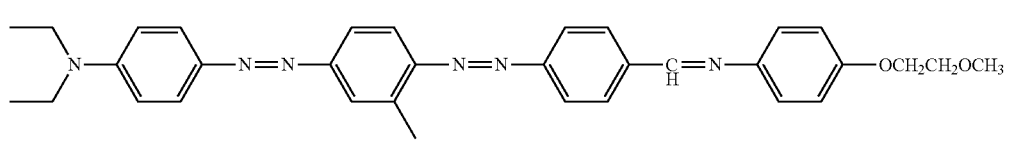 C-15
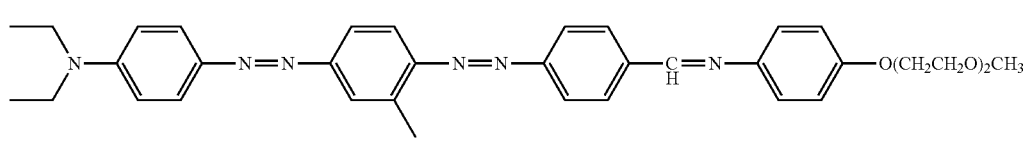 C-16
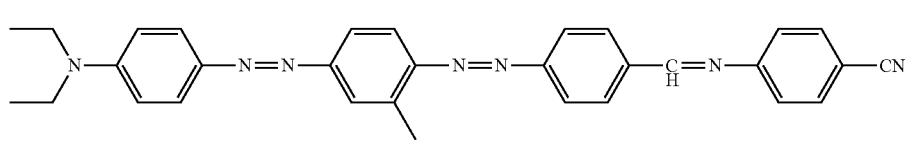 C-17
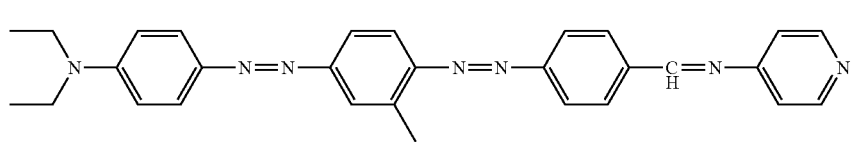 C-18

-continued
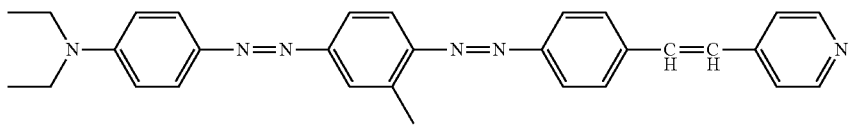
C-19
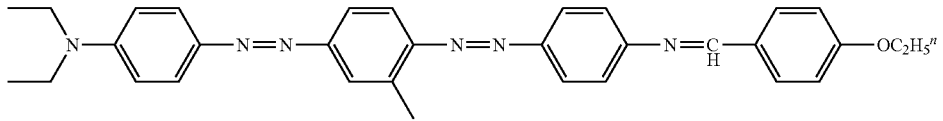
C-20
[Chem. 30]
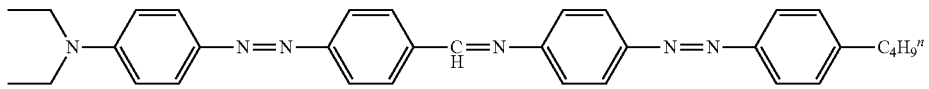
C-21
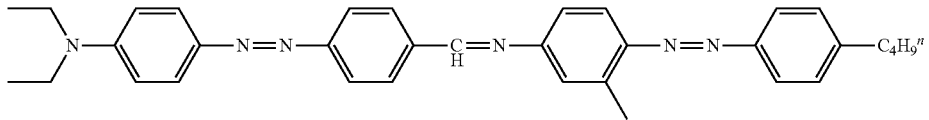
C-22
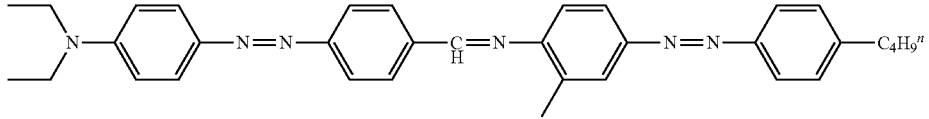
C-23
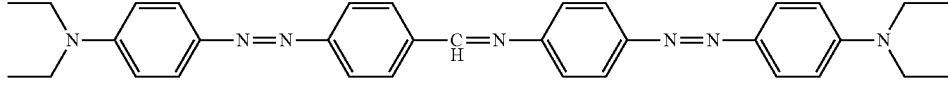
C-24
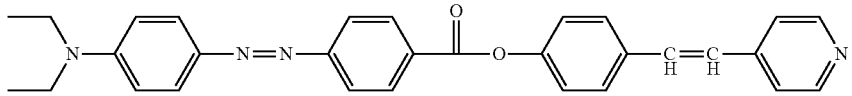
C-25
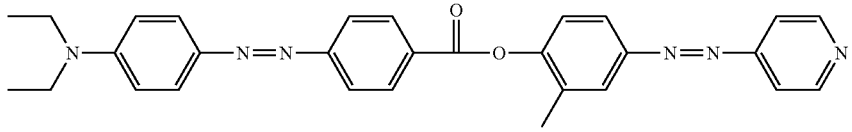
C-26
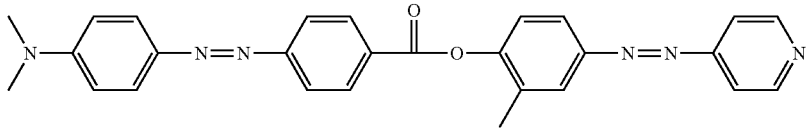
C-27
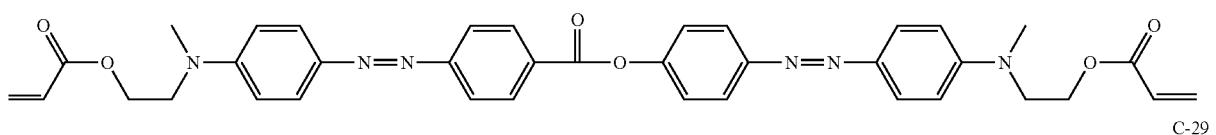
C-28
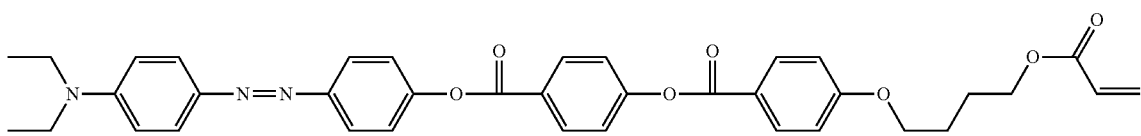
C-29

[Chem. 31]

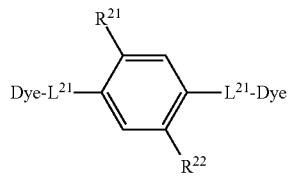

Formula (II)

In Formula (II), $R^{21}$ and $R^{22}$ each represent a hydrogen atom, an alkyl group, an alkoxy group, or a substituent represented by -$L^{22}$-Y, provided that at least one of $R^{21}$ and $R^{22}$ represents a group other than a hydrogen atom; $L^{22}$ represents an alkylene group wherein one $CH_2$ group or two or more non-adjacent $CH_2$ groups present in the alkylene group may be substituted by —O—, —COO—, —OCO—, —OCOO—, —NRCOO—, —OCONR—, —CO—, —S—, —$SO_2$—, —NR—, —$NRSO_2$—, or —$SO_2NR$— (R represents a hydrogen atom or an alkyl group having 1 to 4 carbon atoms); Y represents a hydrogen atom, a hydroxy group, an alkoxy group, a carboxyl group, a halogen atom, or a polymerizable group.

Among others, since solubility is further improved, preferably one of $R^{21}$ and $R^{22}$ is a hydrogen atom or a short-chain ($C_1$-$C_4$) substituent and the other of $R^{21}$ and $R^{22}$ is a long-chain ($C_5$-$C_{30}$) substituent. Generally, the molecular shape and anisotropy of polarizability are known to have a significant effect on the expression of liquid crystallinity, and details thereof are described in detail in Handbook of Liquid Crystals, MARUZEN Co., Ltd., 2000 or the like. A representative backbone of rod-like liquid crystal molecules is composed of a rigid mesogen and a flexible terminal chain in the molecular long axis direction, and a lateral substituent in the molecular short axis direction corresponding to $R^{21}$ and $R^{22}$ in formula (II) is generally composed of a small substituent which does not inhibit the rotation of molecules or is otherwise unsubstituted. As an example of the lateral substituent which is designed to provide features, there is known an example in which a smectic phase is stabilized by introducing a hydrophilic (for example, ionic) lateral substituent. However, an example which stabilizes a nematic phase is practically unknown. In particular, there is no known example of improving solubility without lowering the degree of alignment order through the introduction of a long-chain substituent at a specific substitution position of rod-like liquid crystal molecules expressing a nematic phase.

Examples of the alkyl group represented by each of $R^{21}$ and $R^{22}$ include $C_1$-$C_{30}$ alkyl groups. An example of the short-chain alkyl group is preferably $C_1$-$C_9$, and more preferably $C_1$-$C_4$. On the other hand, an example of the long-chain alkyl group is preferably $C_5$-$C_{30}$, more preferably $C_{10}$-$C_{30}$, and still more preferably $C_{10}$-$C_{20}$.

Examples of the alkoxy group represented by each of $R^{21}$ and $R^{22}$ include $C_1$-$C_{30}$ alkoxy groups. An example of the short-chain alkoxy group is preferably $C_1$-$C_8$, and more preferably $C_1$-$C_3$. On the other hand, an example of the long-chain alkoxy group is preferably $C_5$-$C_{30}$, more preferably $C_{10}$-$C_{30}$, and still more preferably $C_{10}$-$C_{20}$.

Among the substituents represented by -$L^{22}$-Y which is represented by each of $R^{21}$ and $R^{22}$, an alkylene group represented by $L^{22}$ is preferably $C_5$-$C_{30}$, more preferably $C_{10}$-$C_{30}$, and still more preferably $C_{10}$-$C_{20}$, and one $CH_2$ group or two or more non-adjacent $CH_2$ groups present in the alkylene group may be substituted by one or more groups selected from the divalent group consisting of —O—, —COO—, —OCO—, —OCOO—, —NRCOO—, —OCONR—, —CO—, —S—, —$SO_2$—, —NR—, —$NRSO_2$— and —$SO_2NR$— wherein R represents a hydrogen atom, or an alkyl group having 1 to 4 carbon atoms. Of course, $CH_2$ group(s) may be substituted by two or more groups selected from the group of the foregoing divalent groups. Further, with regard to the terminal of $L^{22}$, $CH_2$ bonding to Y may be substituted by any one of the foregoing divalent groups. Further, with regard to the front end of $L^{22}$, $CH_2$ bonding to a phenyl group may be substituted by any one of the foregoing divalent groups.

In particular, from the viewpoint of improving solubility, $L^{22}$ is an alkyleneoxy group or preferably contains an alkyleneoxy group, and $L^{22}$ is a polyethyleneoxy group represented by —($OCH_2CH_2$)$_p$— (provided that p denotes 3 or more, preferably 3 to 10, and more preferably 3 to 6), or more preferably contains a polyethyleneoxy group.

Examples of -$L^{22}$- are shown below, but the present invention is not limited thereto. In the following formulae, q denotes 1 or more, preferably 1 to 10, and more preferably 2 to 6. r denotes 5 to 30, preferably 10 to 30, and more preferably 10 to 20.

—($OCH_2CH_2$)$_p$—
—($OCH_2CH_2$)$_p$—O—($CH_2$)$_q$—
—($OCH_2CH_2$)$_p$—OC(=O)—($CH_2$)$_q$—
—($OCH_2CH_2$)$_p$—OC(=O)NH—($CH_2$)$_q$—
—O($CH_2$)$_r$—
—($CH_2$)$_r$—

Among the substituents represented by -$L^{22}$-Y which is represented by each of $R^{21}$ and $R^{22}$, Y represents a hydrogen atom, a hydroxy group, an alkoxy group (preferably a $C_1$-$C_{10}$ alkoxy group, and more preferably a $C_1$-$C_5$ alkoxy group), a carboxyl group, a halogen atom, or a polymerizable group.

Through combination of $L^{22}$ and Y, the terminal of -$L^{22}$-Y may become a substituent which renders a strong intermolecular interaction, such as a carboxyl group, an amino group or an ammonium group, and may also become a leaving group such as a sulfonyloxy group or a halogen atom.

Further, the terminal of -$L^{22}$-Y may be a substituent which forms a covalent bond with other molecules, such as a crosslinkable group or a polymerizable group. For example, the terminal of -$L^{22}$-Y may be a polymerizable group such as 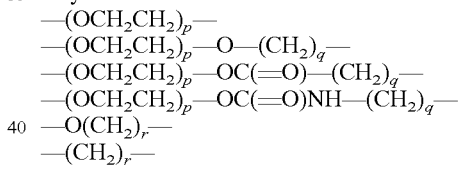

When it is used as a material for cured films, Y is preferably a polymerizable group (even when the compound of formula (II) does not have a polymerizable group, if a compound used in combination with the compound of formula (II) is polymerizable, alignment of the compound of formula (II) can be immobilized by allowing a polymerization reaction of the other compound to proceed).

The polymerization reaction is preferably addition polymerization (including ring-opening polymerization) or condensation polymerization. In other words, the polymerizable group is preferably a functional group capable of addition polymerization reaction or condensation polymerization reaction. Examples of the polymerizable group represented by the above formula include an acrylate group represented by formula (M-1) below, and a methacrylate group represented by formula (M-2) below.

[Chem. 32]

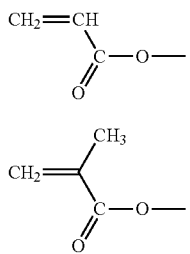

Further, a ring-opening polymerizable group is also preferable, for example, preferably a cyclic ether group, more preferably an epoxy group or an oxetanyl group, and particularly preferably an epoxy group.

In formula (II), each of $L^{21}$ represents a linking group selected from the group consisting of an azo group (—N=N—), a carbonyloxy group (—C(=O)O—), an oxycarbonyl group (—O—C(=O)—), an imino group (—N=CH—), and a vinylene group (—C=C—). Among these, a vinylene group is preferable.

In formula (II), each of Dye represents an azo dye residue represented by formula (IIa) below.

[Chem. 33]

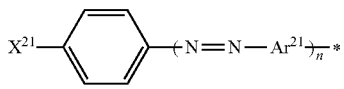

In formula (IIa), * represents a binding site to $L^{21}$; $X^{21}$ represents a hydroxy group, a substituted or unsubstituted alkyl group, a substituted or unsubstituted alkoxy group, an unsubstituted amino group, or a mono or dialkylamino group; each of $Ar^{21}$ represents an aromatic hydrocarbon ring or aromatic heterocyclic ring which may have a substituent; and n denotes an integer of 1 to 3, and when n is 2 or more, plural $Ar^{21}$'s may be the same as or different from each other.

The alkyl group represented by $X^{21}$ is preferably a $C_1$-$C_{12}$ alkyl group, and more preferably a $C_1$-$C_6$ alkyl group. Specific examples thereof include a methyl group, an ethyl group, a propyl group and a butyl group. The alkyl group may have a substituent, and examples of the substituent include a hydroxy group, a carboxyl group and a polymerizable group. Preferable examples of the polymerizable group are the same as those of the polymerizable group represented by Y.

The alkoxy represented by $X^{21}$ is preferably a $C_1$-$C_{20}$ alkoxy group, more preferably a $C_1$-$C_{10}$ alkoxy group, and still more preferably a $C_1$-$C_6$ alkoxy group. Specific examples thereof include a methoxy group, an ethoxy group, a propoxy group, a butoxy group, a pentaoxy group, a hexaoxy group, a heptaoxy group, and an octaoxy group. The alkoxy group may have a substituent, and examples of the substituent include a hydroxy group, a carboxyl group, and a polymerizable group. Preferable examples of the polymerizable group are the same as those of the polymerizable group represented by Y.

The substituted or unsubstituted amino group represented by $X^{21}$ is preferably a $C_0$-$C_{20}$ amino group, more preferably a $C_0$-$C_{10}$ amino group, and still more preferably a $C_0$-$C_6$ amino group. Specific examples thereof include an unsubstituted amino group, a methylamino group, a dimethylamino group, a diethylamino group, a methylhexylamino group, and an anilino group.

Among them, $X^{21}$ is preferably an alkoxy group.

In formula (II), $Ar^{21}$ represents an aromatic hydrocarbon ring group or aromatic heterocyclic group which may have a substituent. Examples of the aromatic hydrocarbon ring group and the aromatic heterocyclic group include a 1,4-phenylene group, a 1,4-naphthalene group, a pyridine ring group, a pyrimidine ring group, a pyrazine ring group, a quinoline ring group, a thiophene ring group, a thiazole ring group, a thiadiazole ring group, and a thienothiazole ring group. Among these, a 1,4-phenylene group, a 1,4-naphthalene group or a thienothiazole ring group is preferable, and a 1,4-phenylene group is most preferable.

The substituent which $Ar^{21}$ may have is preferably an alkyl group having 1 to 10 carbon atoms, a hydroxy group, an alkoxy group having 1 to 10 carbon atoms, or a cyano group, and more preferably an alkyl group having 1 to 2 carbon atoms, or an alkoxy group having 1 to 2 carbon atoms.

n is preferably 1 or 2, and more preferably 1.

Examples of the compound represented by formula (II) include a compound represented by formula (IIb) below. Symbols in formula (IIb) have the same definitions as those in formula (II), respectively, and a preferred range thereof is the same.

[Chem. 34]

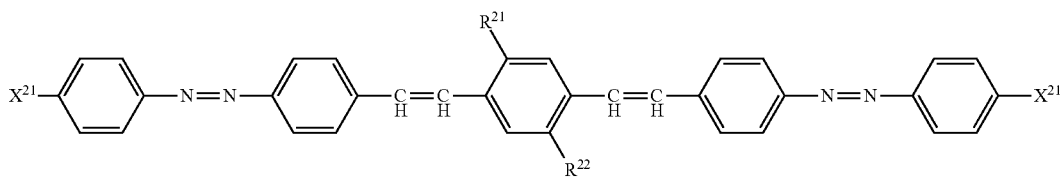

In formula (IIb), plural $X^{21}$'s may be the same as or different from each other, and preferably represent a $C_{1\text{-}12}$ alkoxy group; $R^{21}$ and $R^{22}$ are preferably different from each other. Preferably, one $R^{21}$ and $R^{22}$ is a hydrogen atom or a $C_1$-$C_4$ short-chain substituent (for example, an alkyl group, an alkoxy group, or a substituent represented by -$L^{22}$-Y), and the other one of $R^{21}$ and $R^{22}$ is a $C_5$-$C_{30}$ long-chain substituent (for example, an alkyl group, an alkoxy group, or a substituent represented by -$L^{22}$-Y). Alternatively, each of $R^{21}$ and $R^{22}$ is a substituent represented by -$L^{22}$-Y, and $L^{22}$ is an alkyleneoxy group or preferably contains an alkyleneoxy group.

Hereinafter, specific examples of the compound represented by formula (II) are shown, but the present invention is not limited thereto.

[Chem. 35]

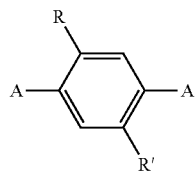

| | A | R | R' |
|---|---|---|---|
| A2-1 | n-C$_2$H$_5$O—⟨Ph⟩—N=N—⟨Ph⟩—CH=CH— | MeO | —(OCH$_2$CH$_2$)$_3$—OMe |
| A2-2 | n-C$_4$H$_9$O—⟨Ph⟩—N=N—⟨Ph⟩—CH=CH— | MeO | —(OCH$_2$CH$_2$)$_3$—OMe |
| A2-3 | n-C$_6$H$_{13}$O—⟨Ph⟩—N=N—⟨Ph⟩—CH=CH— | MeO | —(OCH$_2$CH$_2$)$_3$—OMe |
| A2-4 | n-C$_6$H$_{13}$O—⟨Ph⟩—N=N—⟨Ph⟩—CH=CH— | MeO | —(OCH$_2$CH$_2$)$_3$—OH |
| A2-5 | n-C$_6$H$_{13}$O—⟨Ph⟩—N=N—⟨Ph⟩—CH=CH— | MeO | —(OCH$_2$CH$_2$)$_6$—OH |
| A2-6 | n-C$_6$H$_{13}$O—⟨Ph⟩—N=N—⟨Ph⟩—CH=CH— | MeO | —(OCH$_2$CH$_2$)$_3$—O—C(=O)—CH=CH$_2$ |
| A2-7 | n-C$_6$H$_{13}$O—⟨Ph⟩—N=N—⟨Ph⟩—CH=CH— | MeO | —(OCH$_2$CH$_3$)$_3$—O—C(=O)—CH$_2$CH$_2$—CO$_2$H |
| A2-8 | n-C$_6$H$_{13}$O—⟨Ph⟩—N=N—⟨Ph⟩—CH=CH— | MeO | —(OCH$_2$CH$_2$)$_3$—O—C(=O)—NH—CH$_2$CH$_2$—O—C(=O)—C(CH$_3$)=CH$_2$ |
| A2-9 | n-C$_6$H$_{13}$O—⟨Ph⟩—N=N—⟨Ph⟩—CH=CH— | MeO | —OC$_{18}$H$_{37}$-n |
| A2-10 | n-C$_6$H$_{13}$O—⟨Ph⟩—N=N—⟨Ph⟩—CH=CH— | —(OCH$_2$CH$_2$)$_3$—OMe | —(OCH$_2$CH$_2$)$_3$—OMe |
| A2-11 | n-C$_{12}$H$_{25}$O—⟨Ph⟩—N=N—⟨Ph⟩—CH=CH— | MeO | —(OCH$_2$CH$_2$)$_3$—OMe |
| A2-12 | HO—(CH$_2$)$_3$—⟨Ph⟩—N=N—⟨Ph⟩—CH=CH— | MeO | —(OCH$_2$CH$_2$)$_3$—OH |

-continued

[Chem. 35]

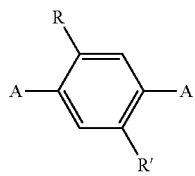

| | A | R | R' |
|---|---|---|---|
| A2-13 | ![acrylate-(CH2)3-C6H4-N=N-C6H4-CH=CH-] | MeO | —(OCH₂CH₂)₃—O-acrylate |
| A2-14 | ![acrylate-(CH2)3-C6H4-N=N-C6H4-CH=CH-] | MeO | —(OCH₂CH₂)₃—OMe |

[Chem. 36]

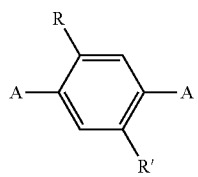

| | A | R | R' |
|---|---|---|---|
| A2-15 | Et₂N-C₆H₄-N=N-C₆H₄-CH=CH— | MeO | —(OCH₂CH₂)₃—OH |
| A2-16 | Et₂N-C₆H₄-N=N-C₆H₄-CH=CH— | MeO | —OC₁₈H₃₇-n |
| A2-17 | (Me)(n-C₆H₁₃)N-C₆H₄-N=N-C₆H₄-CH=CH— | MeO | —(OCH₂CH₂)₃—OH |
| A2-18 | Et₂N-C₆H₄-N=N-naphthyl-CH=CH— | MeO | —(OCH₂CH₂)₃—OH |
| A2-19 | Et₂N-C₆H₄-N=N-(4-methylthiazol-2-yl)-CH=CH— | MeO | —(OCH₂CH₂)₃—OH |
| A2-20 | Et₂N-C₆H₄-N=N-(thieno[3,2-b]thiazol-2-yl)-CH=CH— | MeO | —(OCH₂CH₂)₃—OH |

-continued
[Chem. 36]
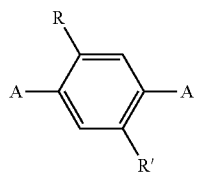
| | A | R | R' |
|---|---|---|---|
| A2-21 | 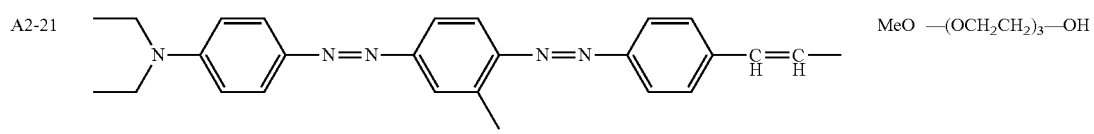 | MeO | —(OCH₂CH₂)₃—OH |
| A2-22 | 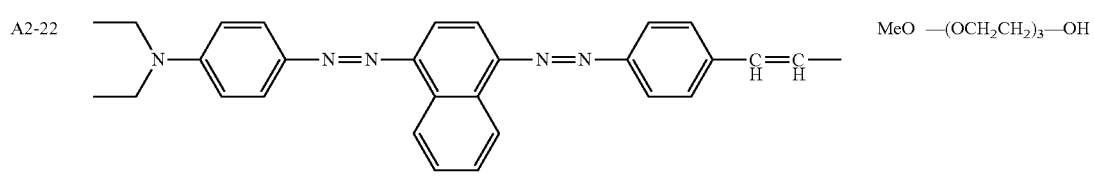 | MeO | —(OCH₂CH₂)₃—OH |
| A2-23 | 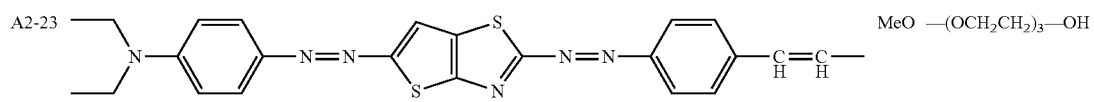 | MeO | —(OCH₂CH₂)₃—OH |
[Chem. 37]
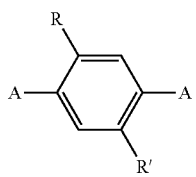
| | A | R | R' |
|---|---|---|---|
| A2-24 |  | MeO | *—(OCH₂CH₂)₃—OH |
| A2-25 | 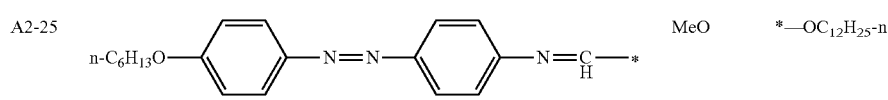 | MeO | *—OC₁₂H₂₅-n |
| A2-26 | 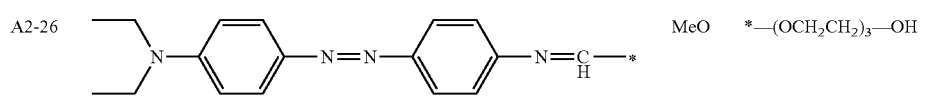 | MeO | *—(OCH₂CH₂)₃—OH |
| A2-27 | 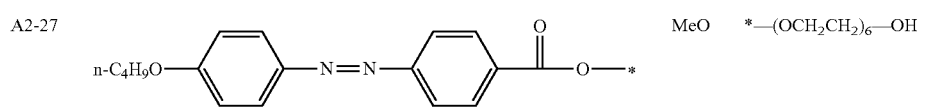 | MeO | *—(OCH₂CH₂)₆—OH |
| A2-28 | 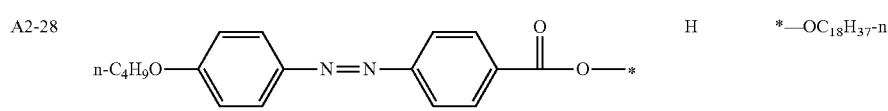 | H | *—OC₁₈H₃₇-n |

[Chem. 37]

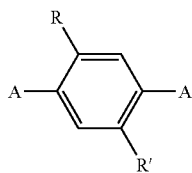

| | A | R | R' |
|---|---|---|---|
| A2-29 | [structure with n-C₆H₁₃, N=N, benzoate] | MeO | *—(OCH₂CH₂)₃—OMe |
| A2-30 | [structure with diethylamino-phenyl-N=N-thienothiazole-carboxylate] | MeO | *—(OCH₂CH₂)₃—OH |
| A2-31 | n-C₆H₁₃O—[phenyl]—N=N—[phenyl]—N=N—* | MeO | *—(OCH₂CH₂)₃—OH |
| A2-32 | n-C₆H₁₃O—[phenyl]—N=N—[phenyl]—N=N—* | MeO | *—(OCH₂CH₂CH₂)₃—OH |
| A2-33 | [diethylamino-phenyl]—N=N—[phenyl]—N=N—* | MeO | *—(OCH₂CH₂)₃—OMe |
| A2-34 | n-C₆H₁₃O—[phenyl]—N=N—[phenyl]—CH=CH—* | MeO | MeO |

[Chem. 38]

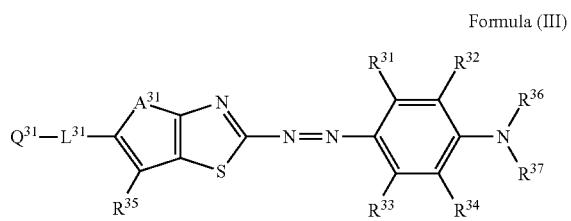

Formula (III)

In Formula (III), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, aromatic heterocyclic group or cyclohexane ring group which may have a substituent; $L^{31}$ represents a divalent linking group; and $A^{31}$ represents an oxygen atom or a sulfur atom.

Examples of the substituent represented by $R^{31}$ to $R^{35}$ are the same as those of the substituent represented by $R^{11}$ to $R^{14}$ in formula (I), respectively. The substituent represented by $R^{31}$ to $R^{35}$ is preferably a hydrogen atom, an alkyl group, an alkoxy group or a halogen atom, particularly preferably a hydrogen atom, an alkyl group or an alkoxy group, and most preferably a hydrogen atom or a methyl group.

In formula (III), the alkyl group represented by $R^{36}$ or $R^{37}$ which may have a substituent is preferably an alkyl group having preferably 1 to 20 carbon atoms, more preferably 1 to 12 carbon atoms and particularly preferably 1 to 8 carbon atoms, for example, a methyl group, an ethyl group, or an n-octyl group. The substituent of the alkyl group represented by $R^{36}$ or $R^{37}$ has the same meaning as the substituent represented by $R^{31}$ to $R^{35}$. When $R^{36}$ and $R^{37}$ represent an alkyl group, $R^{36}$ and $R^{37}$ taken together may form a ring structure. When $R^{36}$ or $R^{37}$ represents an alkyl group, $R^{36}$ or $R^{37}$ together with $R^{32}$ or $R^{34}$ may form a ring structure. The group represented by $R^{36}$ and $R^{37}$ are particularly preferably a hydrogen atom or an alkyl group, and more preferably a hydrogen atom, a methyl group or an ethyl group.

In formula (III), $Q^{31}$ represents an aromatic hydrocarbon group which may have a substituent (preferably a substituent having 1 to 20 carbon atoms, more preferably 1 to 10 carbon atoms, for example, a phenyl group or a naphthyl group), an aromatic heterocyclic group which may have a substituent or a cyclohexane ring group which may have a substituent.

The substituent, which may be possessed by the group represented by $Q^{31}$, is preferably a group which is introduced to enhance the solubility of an azo compound or nematic liquid crystallinity, a group having an electron donating property or an electron withdrawing property which is introduced to adjust color tone as a dye, or a group having a polymerizable group which is introduced to fix alignment. Specific examples thereof have the same meaning as the substituents represented by $R^{31}$ to $R^{35}$. Preferred examples of the substituent include a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted oxycarbonyl group, a substituted or unsubstituted acyloxy group, a substituted or unsubstituted acylamino group, a substituted or unsubstituted amino group, a substituted or unsubstituted alkoxycarbonylamino group, a substituted or unsubstituted sulfonylamino group, a substituted or unsubstituted sulfamoyl group, a substituted or unsubstituted carbamoyl group, a substituted or unsubstituted alkylthio group, a substituted or unsubstituted sulfonyl group, a substituted or unsubstituted ureido group, a nitro group, a hydroxy group, a cyano group, an imino group, an azo group and a halogen atom. Among them, particularly preferable are a substituted or unsubstituted alkyl group, a substituted or unsubstituted alkenyl group, a substituted or unsubstituted aryl group, a substituted or unsubstituted alkoxy group, a substituted or unsubstituted oxycarbonyl group, a substituted or unsubstituted acyloxy group, a nitro group, an imino group, and an azo group. With regard to the substituents having a carbon atom among these substituents, the preferred range of the number of carbon atoms is the same as that of the substituent represented by $R^{31}$ to $R^{35}$.

The number of the substituents which the aromatic hydrocarbon group, the aromatic heterocyclic group or the cyclohexane ring group may have is 1 to 5, preferably 1. When $Q^{31}$ is a phenyl group, the phenyl group more preferably has one substituent at the para-position with respect to $L^{31}$. When $Q^{31}$ is a cyclohexane ring group, the cyclohexane ring group preferably has one substituent in trans-configuration at the 4-position with respect to $L^{31}$.

The aromatic heterocyclic group represented by $Q^{31}$ is preferably a group derived from a monocyclic or bicyclic heterocycle. Examples of the atom other than a carbon atom which composes the aromatic heterocyclic group include a nitrogen atom, a sulfur atom, and an oxygen atom. When the aromatic heterocyclic group has a plurality of ring-constituting atoms other than the carbon atom, these atoms may be the same as or different from each other. Specific examples of the aromatic heterocyclic group include a pyridyl group, a quinolyl group, a thiophenyl group, a thiazolyl group, a benzothiazolyl group, a thiadiazolyl group, a quinolonyl group, a naphthalimidoyl group, and a thienothiazolyl group.

The aromatic heterocyclic group is preferably a pyridyl group, a quinolyl group, a thiazolyl group, a benzothiazolyl group, a thiadiazolyl group or a thienothiazolyl group, particularly preferably a pyridyl group, a benzothiazolyl group, a thiadiazolyl group or a thienothiazolyl group, and most preferably a pyridyl group, a benzothiazolyl group or a thienothiazolyl group.

The group represented by $Q^{31}$ is particularly preferably a phenyl group, a naphthyl group, a pyridyl group, a benzothiazolyl group, a thienothiazolyl group or a cyclohexane ring group, each of which may have a substituent, and more preferably a phenyl group, a pyridyl group, a benzothiazolyl group or a cyclohexane ring group.

In formula (III), the linking group represented by $L^{31}$ may be a single bond, an alkylene group (preferably an alkyl group having 1 to 20 carbon atoms, more preferably 1 to 10 carbon atoms, and particularly preferably 1 to 6 carbon atoms, e.g., a methylene group, an ethylene group, a propylene group, a butylene group, a pentylene group, or cyclohexane-1,4-diyl group), an alkenylene group (preferably an alkenylene group having 2 to 20 carbon atoms, more preferably 2 to 10 carbon atoms, and particularly preferably 2 to 6 carbon atoms, e.g., an ethenylene group), an alkynylene group (preferably an alkynylene group having 2 to 20 carbon atoms, more preferably 2 to 10 carbon atoms, and particularly preferably 2 to 6 carbon atoms, e.g., an ethynylene group), an alkyleneoxy group (preferably an alkyleneoxy group having 1 to 20 carbon atoms, more preferably 1 to 10 carbon atoms, and particularly preferably 1 to 6 carbon atoms, e.g., a methyleneoxy group), an amide group, an ether group, an acyloxy group (—C(=O) O—), an oxycarbonyl group (—OC(=O)—), an imino group (—CH=N— or —N=CH—), a sulfoamido group, a sulfonic acid ester group, an ureido group, a sulfonyl group, a sulfinyl group, a thioether group, a carbonyl group, a —NR— group wherein R represents a hydrogen atom, an alkyl group or an aryl group, an azo group, an azoxy group, or a divalent linking group formed by combination of two or more thereof and having 0 to 60 carbon atoms.

The group represented by $L^{31}$ is particularly preferably a single bond, an amide group, an acyloxy group, an oxycarbonyl group, an imino group, an azo group or an azoxy group, and further preferably an azo group, an acyloxy group, an oxycarbonyl group, or an imino group.

In formula (III), $A^{31}$ represents an oxygen atom or a sulfur atom, and preferably a sulfur atom.

The compound represented by formula (III) may have a polymerizable group as the substituent. It is preferable that the polymerizable group is contained in those compounds, since the film hardening ability is improved. Examples of the polymerizable group include an unsaturated polymerizable group, an epoxy group and an aziridinyl group. The polymerizable group is preferably an unsaturated polymerizable group, and particularly preferably an ethylenically unsaturated polymerizable group. Examples of the ethylenically unsaturated polymerizable group include an acryloyl group and a methacryloyl group.

The polymerizable group is preferably positioned at the molecular terminal. That is, in formula (III), the polymerizable group is preferably present as a substituent for $R^{36}$ and/or $R^{37}$ and as a substituent for $Q^1$.

Among the compounds represented by formula (III), particularly preferred is a compound represented by formula (IIIa) below.

[Chem. 39]

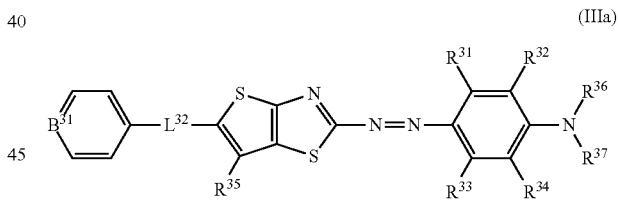

(IIIa)

In formula (IIIa), $R^{31}$ to $R^{35}$ have the same definitions as $R^{31}$ to $R^{35}$ in formula (III), respectively, and a preferred range thereof is the same. $B^{31}$ represents a nitrogen atom or a carbon atom which may have a substituent; $L^{32}$ represents an azo group, an acyloxy group (—C(=O)O—), an oxycarbonyl group (—OC(=O)—), or an imino group.

In formula (IIIa), $R^{35}$ preferably represents a hydrogen atom or a methyl group, and more preferably a hydrogen atom.

In formula (IIIa), when $B^{31}$ is a carbon atom, the substituent which may be possessed by the carbon atom has the same meaning as the substituent which may be possessed by $Q^{31}$ in formula (III), and a preferred range thereof is the same.

In formula (IIIa), $L^{32}$ represents an azo group, an acyloxy group, an oxycarbonyl group or an imino group, preferably an azo group, an acyloxy group or an oxycarbonyl group, and more preferably an azo group.

Specific examples of the compound represented by formula (III) are shown below. However, the present invention is not limited to these specific examples.

[Chem. 40]

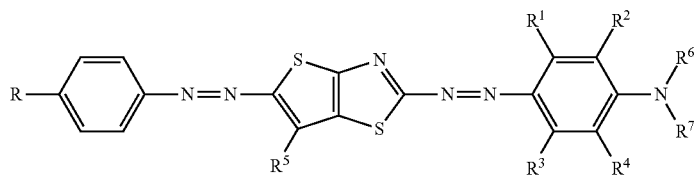

| No. | R¹ | R² | R³ | R⁴ | R⁵ | R⁶ | R⁷ | R |
|---|---|---|---|---|---|---|---|---|
| A3-1 | —H | —H | —H | —H | —H | —C$_2$H$_5$ | —C$_2$H$_5$ | —C$_4$H$_9$ |
| A3-2 | —H | —H | —H | —H | —H | —C$_2$H$_5$ | —C$_2$H$_5$ | —C$_6$H$_{13}$ |
| A3-3 | —H | —H | —H | —H | —H | —C$_2$H$_5$ | —C$_2$H$_5$ | —C$_7$H$_{15}$ |
| A3-4 | —H | —H | —H | —H | —H | —C$_2$H$_5$ | —C$_2$H$_5$ | —OC$_4$H$_9$ |
| A3-5 | —H | —H | —H | —H | —H | —C$_2$H$_5$ | —C$_2$H$_5$ | —CF$_3$ |
| A3-6 | —H | —H | —H | —H | —H | —C$_2$H$_5$ | —C$_2$H$_5$ | —OH |
| A3-7 | —H | —H | —H | —H | —H | —C$_2$H$_5$ | —C$_2$H$_5$ | —CN |
| A3-8 | —H | —H | —H | —H | —H | —C$_2$H$_5$ | —C$_2$H$_5$ | —NO$_2$ |
| A3-9 | —H | —H | —H | —H | —H | —C$_2$H$_5$ | —C$_2$H$_5$ | —F |
| A3-10 | —H | —H | —H | —H | —H | —C$_2$H$_5$ | —C$_2$H$_5$ | —Br |
| A3-11 | —H | —H | —H | —H | —H | —C$_2$H$_5$ | —C$_2$H$_5$ | —I |
| A3-12 | —H | —H | —H | —H | —H | —CH$_3$ | —H | —C$_4$H$_9$ |
| A3-13 | —H | —H | —H | —H | —H | —CH$_3$ | —CH$_3$ | —C$_4$H$_9$ |
| A3-14 | —H | —H | —H | —H | —H | —CH$_3$ | —C$_6$H$_{13}$ | —C$_4$H$_9$ |
| A3-15 | —H | —H | —H | —H | —H | —CH$_3$ | —CH$_2$CH$_2$OH | —C$_4$H$_9$ |
| A3-16 | —H | —H | —H | —H | —H | —CH$_3$ | —CH$_2$CH$_2$OCH$_3$ | —C$_4$H$_9$ |
| A3-17 | —H | —H | —H | —H | —H | —CH$_3$ | —CH$_2$CH$_2$OCOCH=CH$_2$ | —C$_4$H$_9$ |
| A3-18 | —H | —H | —H | —H | —H | —CH$_3$ | —CH$_2$CH$_2$CN | —C$_4$H$_9$ |
| A3-19 | —H | —H | —H | —H | —H | —CH$_2$CH$_2$OCOCH=CH$_2$ | —CH$_2$CH$_2$OCOCH=CH$_2$ | —C$_4$H$_9$ |
| A3-20 | —CH$_3$ | —H | —H | —H | —H | —C$_2$H$_5$ | —C$_2$H$_5$ | —C$_4$H$_9$ |
| A3-21 | —F | —H | —H | —H | —H | —C$_2$H$_5$ | —C$_2$H$_5$ | —C$_4$H$_9$ |
| A3-22 | —Cl | —H | —H | —H | —H | —C$_2$H$_5$ | —C$_2$H$_5$ | —C$_4$H$_9$ |
| A3-23 | —OH | —H | —H | —H | —H | —C$_2$H$_5$ | —C$_2$H$_5$ | —C$_4$H$_9$ |
| A3-24 | —OCH$_3$ | —H | —H | —H | —H | —C$_2$H$_5$ | —C$_2$H$_5$ | —C$_4$H$_9$ |
| A3-25 | —H | —OCH$_3$ | —OCH$_3$ | —H | —H | —C$_2$H$_5$ | —C$_2$H$_5$ | —C$_4$H$_9$ |
| A3-26 | —H | —H | —H | —H | —CH$_3$ | —C$_2$H$_5$ | —C$_2$H$_5$ | —C$_4$H$_9$ |

[Chem. 41]

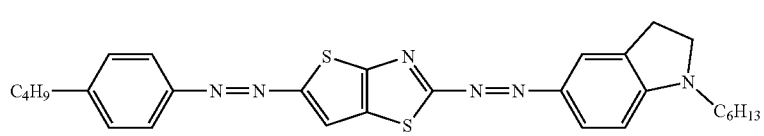

(A3-27)

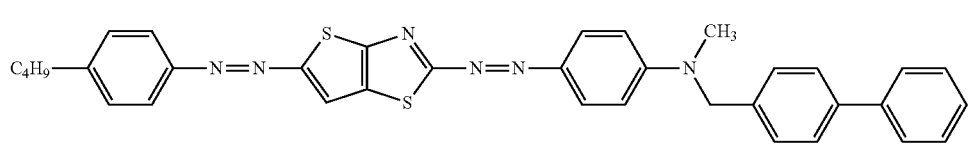

(A3-28)

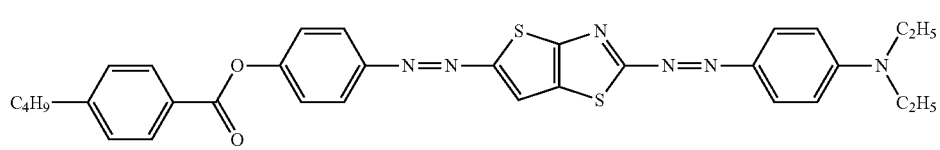

(A3-29)

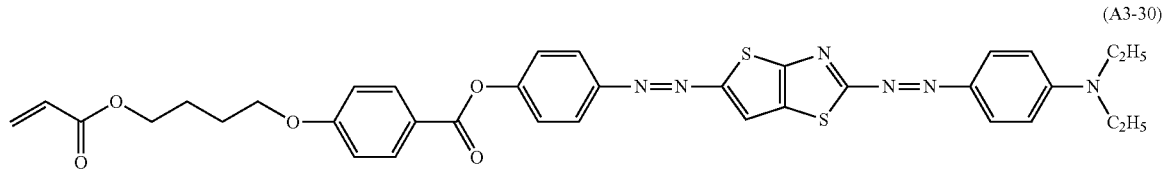

(A3-30)

-continued
[Chem. 42]
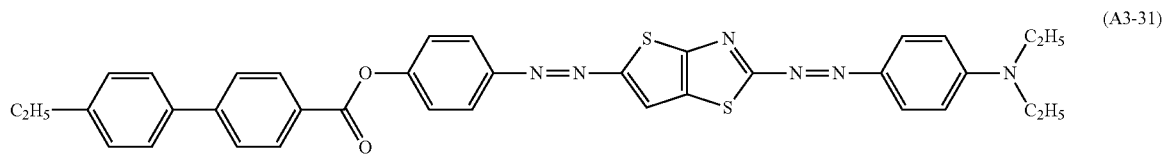
(A3-31)
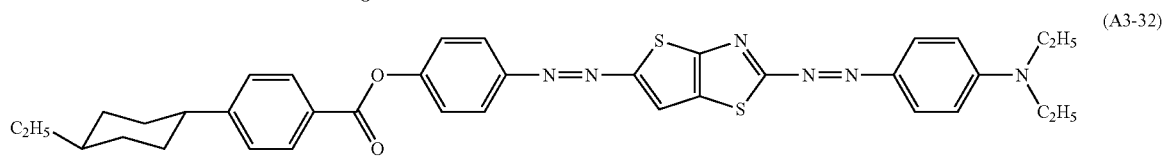
(A3-32)
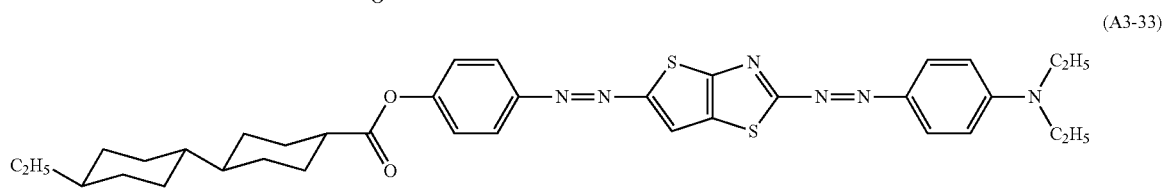
(A3-33)
[Chem. 43]
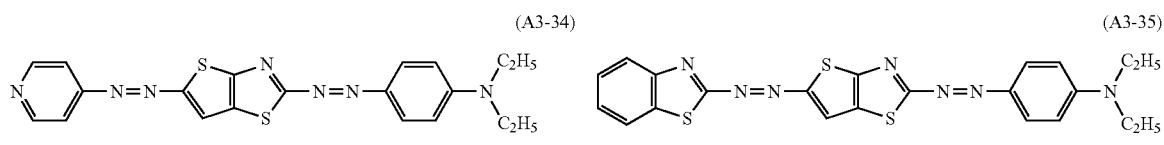
(A3-34) (A3-35)
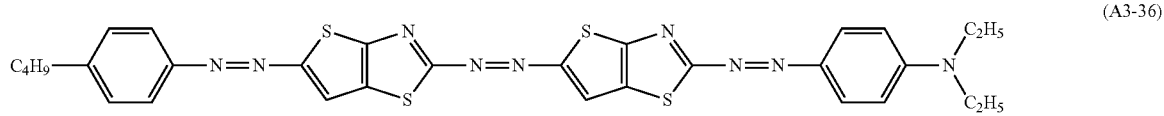
(A3-36)
[Chem. 44]
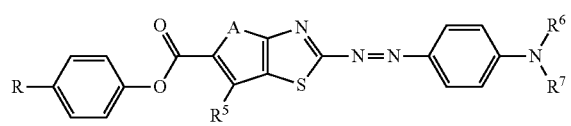
| No. | A | R⁵ | R₆ | R₇ | R |
|---|---|---|---|---|---|
| A3-37 | S | —H | —C₂H₅ | —C₂H₅ | —C₄H₉ |
| A3-38 | S | —H | —C₂H₅ | —C₂H₅ | —C₇H₁₅ |
| A3-39 | S | —H | —C₂H₅ | —C₂H₅ | —CN |
| A3-40 | S | —H | —C₂H₅ | —C₂H₅ | —Br |
-continued
[Chem. 44]
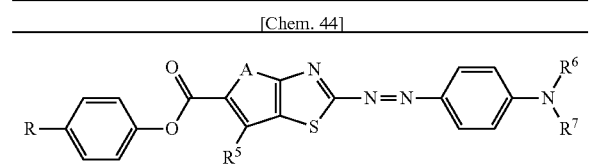
| No. | A | R⁵ | R₆ | R₇ | R |
|---|---|---|---|---|---|
| A3-41 | S | —CH₃ | —C₂H₅ | —C₂H₅ | —C₄H₉ |
| A3-42 | S | —H | —CH₃ | —CH₃ | —C₄H₉ |
| A3-43 | O | —H | —C₂H₅ | —C₂H₅ | —C₄H₉ |
[Chem. 45]
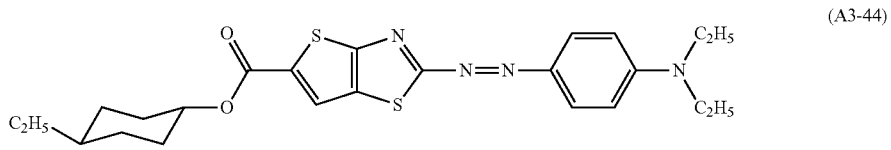
(A3-44)
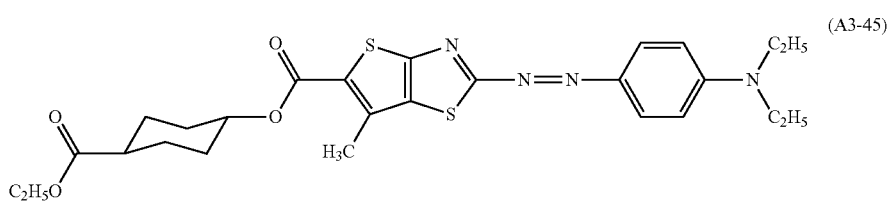
(A3-45)

[Chem. 46]

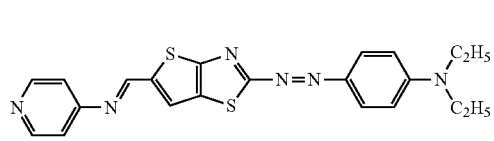

| No. | $R^6$ | $R^7$ | R |
|---|---|---|---|
| A3-46 | $-C_2H_5$ | $-C_2H_5$ | $-C_4H_9$ |
| A3-47 | $-C_2H_5$ | $-C_2H_5$ | $-OC_4H_9$ |
| A3-48 | $-C_2H_5$ | $-C_2H_5$ | $-CF_3$ |
| A3-49 | $-C_2H_5$ | $-C_2H_5$ | $-F$ |
| A3-50 | $-CH_3$ | $-CH_3$ | $-C_4H_9$ | different from each other. Specific examples of the aromatic heterocyclic group include a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, and a thienothiazole ring.

The cyclic group which is formed by $R^{41}$ and $R^{42}$ taken together is preferably a benzene ring, a naphthalene ring, a pyridine ring, a pyrazine ring, a pyrimidine ring or a pyridazine ring, more preferably a benzene ring or a pyridine ring, and most preferably a pyridine ring.

The cyclic group which is formed by $R^{41}$ and $R^{42}$ taken together may have a substituent, and the range thereof is the same as that of the group represented by $R^1$ and $R^2$ and a preferred range thereof is the same.

[Chem. 47]

(A3-51)

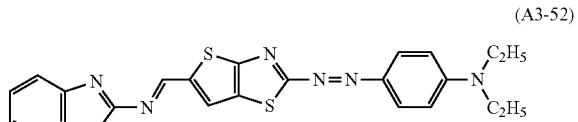

(A3-52)

(A3-53)

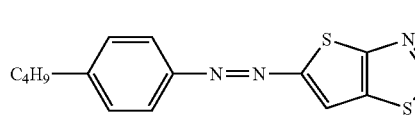

[Chem. 48]

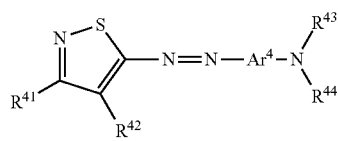

Formula (IV)

Formula (IV), $R^{41}$ and $R^{42}$ each represent a hydrogen atom or a substituent, or alternatively $R^{41}$ and $R^{42}$ taken together may form a ring; $Ar^4$ represents a substituted or unsubstituted divalent aromatic hydrocarbon group or aromatic heterocyclic group; and $R^{43}$ and $R^{44}$ each represent a hydrogen atom, or a substituted or unsubstituted alkyl group, or alternatively $R^{43}$ and $R^{44}$ taken together may form a heterocyclic ring.

In formula (IV), examples of the substituent represented by each of $R^{41}$ and $R^{42}$, are the same as those of the substituent represented by each of $R^{11}$ to $R^{14}$ in formula (I). $R^{41}$ and $R^{42}$ are preferably a hydrogen atom, an alkyl group, an alkoxy group, a halogen atom, cyano group, a nitro group or a sulfo group, more preferably a hydrogen atom, an alkyl group, a halogen atom, a cyano group or a nitro group, still more preferably a hydrogen atom, an alkyl group or a cyano group, and further preferably a hydrogen atom, a methyl group or a cyano group.

$R^{41}$ and $R^{42}$ taken together may preferably form a ring. $R^{41}$ and $R^{42}$ taken together may particularly preferably form an aromatic hydrocarbon group or an aromatic heterocyclic group. The aromatic heterocyclic group is preferably a group derived from a monocyclic or bicyclic heterocycle. Examples of the atoms constituting the aromatic heterocyclic group other than the carbon atom include a nitrogen atom, a sulfur atom and an oxygen atom. When the aromatic heterocyclic group has the plural number of atoms constituting the ring other than the carbon atom, these atoms may be the same as or Examples of the compound represented by formula (IV) include compounds represented by formula (IV') below.

[Chem. 49]

Formula (IV')

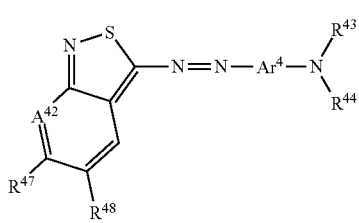

In Formula (IV'), identical symbols as in formula (IV) have the same definitions as those in formula (IV), respectively, and a preferred range thereof is the same. $A^{42}$ represents N or CH, $R^{47}$ and $R^{48}$ each represent a hydrogen atom or a substituent. One of $R^{47}$ and $R^{48}$ is preferably a substituent. It is also preferable that both of $R^{47}$ and $R^{48}$ are a substituent. Preferable examples of the substituent are the same as those of the substituent represented by $R^{41}$ and $R^{42}$. That is, the substituent is preferably an alkyl group, an alkoxy group, a halogen atom, a cyano group, a nitro group or a sulfo group, more preferably an alkyl group, a halogen atom, a cyano group or a nitro group, still more preferably an alkyl group or a cyano group, and most preferably a methyl group or a cyano group. For example, examples of compound in which one of $R^{47}$ and $R^{48}$ is an alkyl group having 1 to 4 carbon atoms and the other one of $R^{47}$ and $R^{48}$ is a cyano group are also preferable.

In formula (IV'), the aromatic heterocyclic group represented by $Ar^4$ is preferably a group derived from a monocyclic or bicyclic heterocycle. Examples of the atoms constituting the aromatic heterocyclic group other than the carbon atom include a nitrogen atom, a sulfur atom and an oxygen atom. When the aromatic heterocyclic group has the plural number of atoms constituting the ring other than the carbon atom, these atoms may be the same as or different from each other. Specific examples of the aromatic heterocyclic group include a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, and a thienothiazole ring.

The group represented by $Ar^4$ is preferably a benzene ring, a naphthalene ring, a pyridine ring, a pyrazine ring, a pyrimidine ring, a pyridazine ring, a quinoline ring or a thiophene ring, more preferably a benzene ring, a naphthalene ring, a pyridine ring or a thiophene ring, and most preferably a benzene ring.

$Ar^4$ may have a substituent, and the range thereof is the same as that of the group represented by $R^{41}$ and $R^{42}$.

The substituent which may be possessed by $Ar^4$ is preferably an alkyl group, an alkoxy group or a halogen atom, more preferably a hydrogen atom, an alkyl group or an alkoxy group, and still more preferably a methyl group. $Ar^4$ may also be preferably unsubstituted.

Bonding of $Ar^4$ with an amino group is preferably parallel to bonding of $Ar^4$ with an azo group, from the viewpoint of enhancing molecular linearity to obtain a larger molecular length and a higher aspect ratio. For example, where $Ar^4$ includes a 6-membered ring which is bonded to an azo group and an amino group, the amino group is preferably bonded to the 4-position with respect to the azo group, and where $Ar^4$ includes a 5-membered ring which is bonded to an azo group and an amino group, the amino group is preferably bonded to the 3-position or 4-position with respect to the azo group.

In formula (IV'), the range of the alkyl groups represented by $R^{43}$ and $R^{44}$ is the same as that of the alkyl group represented by $R^{41}$ and $R^{42}$. The alkyl group may have a substituent, and examples of the substituent are the same as those of the substituent represented by $R^{41}$ and $R^{42}$. Where $R^{43}$ and $R^{44}$ represent a substituted or unsubstituted alkyl group, $R^{43}$ and $R^{44}$ taken together may form a heterocyclic ring. Further, if possible, $R^{43}$ and $R^{44}$ together with the substituent possessed by $Ar^4$ may form a ring.

$R^{43}$ and $R^{44}$ taken together preferably form a ring. The ring is preferably a 6-membered ring or a 5-membered ring, and more preferably a 6-membered ring. The cyclic group, together with a carbon atom, may have atom(s) other than the carbon atom, as constituent atoms. Examples of the constituent atom other than the carbon atom include a nitrogen atom, a sulfur atom and an oxygen atom. When the cyclic group has the plural number of ring-constituting atoms other than the carbon atom, these atoms may be the same as or different from each other.

Specific examples of the cyclic group consisting of $R^{43}$ and $R^{44}$ include a 3-pyrroline ring, a pyrrolidine ring, a 3-imidazoline ring, an imidazolidine ring, a 4-oxazoline ring, an oxazolidine ring, a 4-thiazoline ring, a thiazolidine ring, a piperidine ring, a piperazine ring, a morpholine ring, a thiomorpholine ring, an azepane ring, and an azocane ring.

The cyclic group consisting of $R^{43}$ and $R^{44}$ is preferably a pyrrolidine ring, a piperidine ring, a piperazine ring or a morpholine ring, more preferably a piperidine ring or a piperazine ring, and most preferably a piperazine ring.

The cyclic group consisting of $R^{43}$ and $R^{44}$ may have a substituent, and the range thereof is the same as that of the group represented by $R^{41}$ and $R^{42}$. It is preferable when the cyclic group has one rigid linear substituent, and bonding of the cyclic group with the substituent is parallel to bonding of the cyclic group with $Ar^4$, from the viewpoint of enhancing molecular linearity to obtain a larger molecular length and a higher aspect ratio.

Among the dichroic dyes represented by formula (IV), particular preferred is a dichroic dye represented by formula (IVa) below.

[Chem. 50]

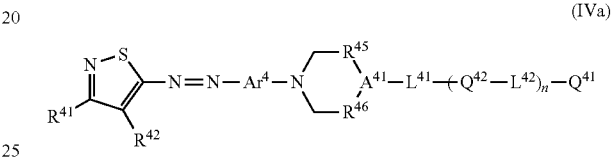

(IVa)

In formula (IVa), $R^{41}$ and $R^{42}$ each represent a hydrogen atom or a substituent, or alternatively $R^{41}$ and $R^{42}$ taken together may form a ring; $Ar^4$ represents a substituted or unsubstituted divalent aromatic hydrocarbon group or aromatic heterocyclic group; $A^{41}$ represents a carbon atom or a nitrogen atom; $L^{41}$, $L^{42}$, $R^{45}$, and $R^{46}$ represent a single bond or a divalent linking group; $Q^{41}$ represents a substituted or unsubstituted cyclic hydrocarbon group or heterocyclic group; $Q^{42}$ represents a substituted or unsubstituted divalent cyclic hydrocarbon group or heterocyclic group; and n denotes an integer of 0 to 3, and when n is 2 or more, plural $L^{42}$ and $Q^{42}$ may be the same as or different from each other.

In formula (IVa), the range of the groups represented by $R^{41}$ and $R^{42}$ is the same as that of the group represented by $R^{41}$ and $R^{42}$ in formula (IVa) and a preferred range thereof is the same.

In formula (IVa), the range of the divalent aromatic hydrocarbon groups or aromatic heterocyclic groups represented by $Ar^4$ is the same as that of the group represented by $Ar^4$ in formula (IV) and a preferred range thereof is the same.

In formula (IVa), $A^{41}$ is preferably a nitrogen atom.

In formula (IVa), the linking group represented by $L^{41}$, $L^{42}$, $R^{45}$ and $R^{46}$ may be an alkylene group (preferably an alkyl group having 1 to 20 carbon atoms, more preferably 1 to 10 carbon atoms, and particularly preferably 1 to 6 carbon atoms, e.g., a methylene group, an ethylene group, a propylene group, a butylene group, a pentylene group, or cyclohexane-1,4-diyl group), an alkenylene group (preferably an alkenylene group having 2 to 20 carbon atoms, more preferably 2 to 10 carbon atoms, and particularly preferably 2 to 6 carbon atoms, e.g., an ethenylene group), an alkynylene group (preferably an alkynylene group having 2 to 20 carbon atoms, more preferably 2 to 10 carbon atoms, and particularly preferably 2 to 6 carbon atoms, e.g., an ethynylene group), an alkyleneoxy group (preferably an alkyleneoxy group having 1 to 20 carbon atoms, more preferably 1 to 10 carbon atoms, and particularly preferably 1 to 6 carbon atoms, e.g., a methyleneoxy group), an amide group, an ether group, an acyloxy group (—C(=O)O—), an oxycarbonyl group (—OC(=O)—), an imino group (—CH=N— or —N=CH—), a sulfoamido group, a sulfonic acid ester group, an ureido group, a sulfonyl group, a sulfinyl group, a thioether group, a carbonyl group, a —NR— group wherein R represents a hydrogen atom, an alkyl group or an aryl group, an azo group, an azoxy group, or a divalent linking group consisting of a combination of two or more thereof and having 0 to 60 carbon atoms.

The linking group represented by $L^{41}$ is preferably a single bond, an alkylene group, an alkenylene group, an alkyleneoxy group, an oxycarbonyl group, an acyl group or a carbamoyl group, more preferably a single bond or alkylene group, and still more preferably a single bond or an ethylene group.

The linking group represented by $L^{42}$ is preferably a single bond, an alkylene group, an alkenylene group, an oxycarbonyl group, an acyl group, an acyloxy group, a carbamoyl group, an imino group, an azo group or an azoxy group, more preferably a single bond, an oxycarbonyl group, an acyloxy group, an imino group, an azo group or an azoxy group, and still more preferably a single bond, an oxycarbonyl group or an acyloxy group.

The linking group represented by $R^{45}$ and $R^{46}$ is preferably a single bond, an alkylene group, an alkenylene group, an alkyleneoxy group or an acyl group, more preferably a single bond or an alkylene group, and still more preferably a single bond or a methylene group.

In formula (IVa), the number of constituent atoms of the ring formed by a nitrogen atom, a methylene group, $R^{45}$, $R^{46}$ and $A^{41}$ is determined by $R^{45}$ and $R^{46}$. For example, where both of $R^{45}$ and $R^{46}$ are a single bond, the ring formed may become a 4-membered ring; where one of $R^{45}$ and $R^{46}$ is a single bond and the other one of $R^{45}$ and $R^{46}$ is a methylene group, the ring formed becomes a 5-membered ring; and both of $R^{45}$ and $R^{46}$ are a methylene group, the ring formed becomes a 6-membered ring.

In formula (IVa), the ring formed by a nitrogen atom, a methylene group, $R^{45}$, $R^{46}$ and $A^{41}$ is preferably a 6-membered ring or a 5-membered ring, and more preferably a 6-membered ring.

In formula (IVa), the group represented by $Q^{41}$ is preferably an aromatic hydrocarbon group (preferably an aromatic hydrocarbon group having 1 to 20 carbon atoms and more preferably 1 to 10 carbon atoms, for example, a phenyl group or a naphthyl group), an aromatic heterocyclic group or a cyclohexane ring group.

The aromatic heterocyclic group represented by $Q^{41}$ is preferably a group derived from a monocyclic or bicyclic heterocycle. Examples of the atoms constituting the aromatic heterocyclic group other than the carbon atom include a nitrogen atom, a sulfur atom and an oxygen atom. When the aromatic heterocyclic group has the plural number of atoms constituting the ring other than the carbon atom, these atoms may be the same as or different from each other. Specific examples of the aromatic heterocyclic group include a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, and a thienothiazole ring.

The group represented by $Q^{41}$ is preferably a benzene ring, a naphthalene ring, a pyridine ring, a pyrazine ring, a pyrimidine ring, a pyridazine ring, a thiazole ring, a benzothiazole ring, a thiadiazole ring, a quinoline ring, a thienothiazole ring or a cyclohexane ring, more preferably a benzene ring, a naphthalene ring, a pyridine ring, a thiazole ring, a benzothiazole ring, a thiadiazole ring or a cyclohexane ring, and most preferably a benzene ring, a pyridine ring or a cyclohexane ring.

$Q^{41}$ may have a substituent, and the range thereof is the same as that of the group represented by $R^{41}$ and $R^{42}$.

The substituent which may be possessed by $Q^{41}$ is preferably an alkyl group which may have a substituent, an alkenyl group which may have a substituent, an alkynyl group which may have a substituent, an aryl group which may have a substituent, an alkoxy group which may have a substituent, an oxycarbonyl group which may have a substituent, an acyloxy group which may have a substituent, an acylamino group which may have a substituent, an amino group which may have a substituent, an alkoxycarbonylamino group which may have a substituent, a sulfonylamino group which may have a substituent, a sulfamoyl group which may have a substituent, a carbamoyl group which may have a substituent, an alkylthio group which may have a substituent, a sulfonyl group which may have a substituent, an ureido group which may have a substituent, a nitro group, a hydroxy group, a cyano group, an imino group, an azo group or a halogen atom, and more preferably an alkyl group which may have a substituent, an alkenyl group which may have a substituent, an aryl group which may have a substituent, an alkoxy group which may have a substituent, an oxycarbonyl group which may have a substituent, an acyloxy group which may have a substituent, a nitro group, an imino group or an azo group. Among these substituents, with respect to those having carbon atoms, the preferred range of the number of carbon atoms is the same as that of the group represented by $R^{41}$ and $R^{42}$.

It is preferable when $Q^{41}$ has one substituent, and bonding of $Q^{41}$ with the substituent is parallel to bonding of $Q^{41}$ with $L^{41}$ or $L^{42}$, from the viewpoint of enhancing molecular linearity to obtain a larger molecular length and a higher aspect ratio. In particular, when n=0, $Q^{41}$ preferably has a substituent at the above-mentioned position.

In formula (IVa), $Q^{42}$ represents a substituted or unsubstituted divalent cyclic hydrocarbon group or heterocyclic group.

The divalent cyclic hydrocarbon group represented by $Q^{42}$ may be aromatic or non-aromatic. Preferable examples of the divalent cyclic hydrocarbon group include an aromatic hydrocarbon group (preferably an aromatic hydrocarbon group having 1 to 20 carbon atoms, and more preferably 1 to 10 carbon atoms, e.g., a phenyl group or a naphthyl group), and a cyclohexane ring group.

The divalent cyclic heterocyclic group represented by $Q^{42}$ may also be aromatic or non-aromatic. The heterocyclic group is preferably a group derived from a monocyclic or bicyclic heterocycle. Examples of the atoms constituting the heterocyclic group other than the carbon atom include a nitrogen atom, a sulfur atom and an oxygen atom. When the heterocyclic group has the plural number of atoms constituting the ring other than the carbon atom, these atoms may be the same as or different from each other. Specific examples of the heterocyclic group include a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring, a 3-pyrroline ring, a pyrrolidine ring, a 3-imidazoline ring, an imidazolidine ring, a 4-oxazoline ring, an oxazolidine ring, a 4-thiazoline ring, a thiazolidine ring, a piperidine ring, a piperazine ring, a morpholine ring, a thiomorpholine ring, an azepane ring, and an azocane ring.

The group represented by $Q^{42}$ is preferably a benzene ring, a naphthalene ring, a pyridine ring, a pyrazine ring, a pyrimidine ring, a pyridazine ring, a piperidine ring, a piperazine ring, a quinoline ring, a thiophene ring, a thiazole ring, a benzothiazole ring, a thiadiazole ring, a quinolone ring, a naphthalimide ring, a thienothiazole ring or a cyclohexane ring, more preferably a benzene ring, a naphthalene ring, a pyridine ring, a piperidine ring, a piperazine ring, a thiazole ring, a thiadiazole ring or a cyclohexane ring, and still more preferably a benzene ring, a cyclohexane ring or a piperazine ring.

$Q^{42}$ may have a substituent, and the range thereof is the same as that of the group represented by $R^{41}$ and $R^{42}$.

The range of the substituents which may be possessed by $Q^{42}$ is the same as that of the substituent represented by $Ar^4$ and a preferred range thereof is the same.

It is preferable when bonding of $Q^{42}$ with $L^{41}$ and $L^{42}$ or with two $L^{42}$ is parallel, from the viewpoint of enhancing molecular linearity to obtain a larger molecular length and a higher aspect ratio.

In formula (IVa), n denotes an integer of 0 to 3, preferably 0 to 2, more preferably 0 or 1, and most preferably 1.

Among the dichroic dyes represented by formula (IVa), particularly preferred is a dichroic dye represented by formula (IVb).

[Chem. 51]

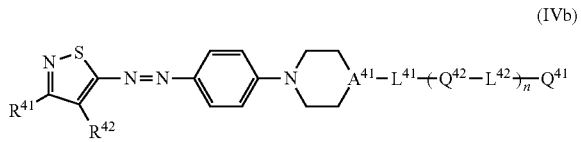

(IVb)

In formula (IVb), $R^{41}$ and $R^{42}$ each represent a hydrogen atom or a substituent; $A^{41}$ represents a carbon atom or a nitrogen atom; $L^{41}$ and $L^{42}$ each represent a single bond or a divalent linking group; $Q^{41}$ represents a substituted or unsubstituted cyclic hydrocarbon group or heterocyclic group; $Q^{42}$ represents a substituted or unsubstituted divalent cyclic hydrocarbon group or heterocyclic group; and n denotes an integer of 0 to 3, and when n is 2 or more, plural $L^{42}$ and $Q^{42}$ may be the same as or different from each other.

In formula (IVb), the range of the groups represented by $R^{41}, R^{42}, L^{41}, L^{42}, Q^{41}$ and $Q^{42}$ is the same as that of the group represented by $R^{41}, R^{42}, L^{41}, L^{42}, Q^{41}$ and $Q^{42}$ in formula (IV) and a preferred range thereof is the same.

In formula (IVb), $A^{41}$ is preferably a nitrogen atom.

Specific examples of the compound represented by formula (IV) are shown below. However, the present invention is not limited to these specific examples.

[Chem. 52]

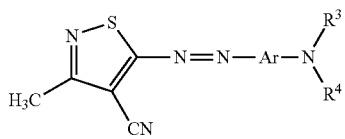

| No. | Ar | R3 | R4 |
|---|---|---|---|
| A4-1 | *—⟨benzene⟩—* | —CH3 | —CH2Ph |
| A4-2 | *—⟨benzene⟩—* | —CH3 | —C12H25 |
| A4-3 | *—⟨benzene⟩—* | —CH3 | —(CH2CH2O)3CH3 |
| A4-4 | *—⟨benzene⟩—* | —CH3 | —CH2CH2OCH2Ph |
| A4-5 | *—⟨benzene⟩—* | —H | —CH2Ph |
| A4-6 | *—⟨benzene⟩—* | —C2H5 | —CH2Ph |
| A4-7 | *—⟨benzene⟩—* | | *—N⟨pyrrolidine⟩ |
| A4-8 | *—⟨benzene⟩—* | | *—N⟨morpholine⟩O |
| A4-9 | *—⟨3-methylbenzene⟩—* | —CH$_3$ | —CH$_2$Ph |
| A4-10 | *—⟨3-chlorobenzene⟩—* | —CH$_3$ | —CH$_2$Ph |
| A4-11 | *—⟨2-OCH3, 5-AcHN benzene⟩—* | —CH$_3$ | —CH$_2$Ph |
| A4-12 | *—⟨naphthalene⟩—* | —CH$_3$ | —CH$_2$Ph |
| A4-13 | *—⟨indoline, N-R4⟩ | | —CH$_2$Ph |

[Chem. 53]

| No. | Ar | R3 | R4 |
|---|---|---|---|
| A4-14 | 2,5-pyridyl | —CH$_3$ | —CH$_2$Ph |
| A4-15 | 2,5-thienyl | —CH$_3$ | —CH$_2$CH$_2$OCH$_2$Ph |
| A4-16 | 2,5-thienyl | | *—N(pyrrolidinyl) (R3 and R4 joined) |
| A4-17 | 2,5-thienyl (3-CN substituted) | | *—N(pyrrolidinyl) |

[Chem. 54]

Structure: isothiazolo[5,4-b]pyridine with 6-CH$_3$, 5-CN, 3-position connected via —N=N—Ar—N(R$^3$)(R$^4$)

| No. | Ar | R$^3$ | R$^4$ |
|---|---|---|---|
| A4-18 | 1,4-phenylene | —CH$_3$ | —CH$_2$Ph |
| A4-19 | 1,4-phenylene | | *—N(pyrrolidinyl) |
| A4-20 | 1,4-phenylene | | *—N(morpholinyl) |
| A4-21 | 2-methyl-1,4-phenylene | —C$_2$H$_5$ | —C$_2$H$_5$ |
| A4-22 | 1,4-naphthylene | —C$_2$H$_5$ | —C$_2$H$_5$ |
| A4-23 | 5-indolinyl (N-R$^4$) | | —CH$_2$Ph |

[Chem. 54] (continued)

Structure: isothiazole with 3-CH$_3$, 4-CN, 5-position connected via —N=N—Ar—N(R$^3$)(R$^4$) — actually isothiazolo[5,4-b]pyridine with 6-CH$_3$, 5-CN

| No. | Ar | R$^3$ | R$^4$ |
|---|---|---|---|
| A4-24 | 2,5-pyridyl | —CH$_3$ | —CH$_2$Ph |
| A4-25 | 2,5-thienyl | | *—N(pyrrolidinyl) |

[Chem. 55]

Structure: isothiazole (3-CH$_3$, 4-CN) —N=N— 1,4-phenylene —N(piperazinyl)—R$^9$

| No. | R$^9$ |
|---|---|
| A4-26 | —C$_5$H$_{11}$ |
| A4-27 | —C$_{12}$H$_{25}$ |
| A4-28 | —CH$_2$CH(C$_2$H$_5$)C$_4$H$_9$ |
| A4-29 | —(CH$_2$CH$_2$O)$_3$CH$_3$ |
| A4-30 | —COOC$_8$H$_{17}$ |
| A4-31 | —C(=O)C$_{11}$H$_{23}$ |
| A4-32 | CONHC$_8$H$_{17}$ |

[Chem. 56]

Structure: isothiazolo[5,4-b]pyridine (6-CH$_3$, 5-CN) —N=N— 1,4-phenylene —N(piperazinyl)—R$^9$

| No. | R$^9$ |
|---|---|
| A4-33 | —C$_5$H$_{11}$ |
| A4-34 | —C$_{12}$H$_{25}$ |
| A4-35 | —CH$_2$CH(C$_2$H$_5$)C$_4$H$_9$ |
| A4-36 | —(CH$_2$CH$_2$O)$_3$CH$_3$ |
| A4-37 | —COOC$_8$H$_{17}$ |
| A4-38 | —C(=O)C$_{12}$H$_{25}$ |
| A4-39 | CONHC$_8$H$_{17}$ |

[Chem. 57]

Structure: isothiazole (with H₃C and CN) —N=N—phenyl—N(piperidine with A¹)—L¹—Q¹

| No. | A¹ | L¹ | Q¹ |
|---|---|---|---|
| A4-40 | CH | — | —Ph |
| A4-41 | N | — | —Ph |
| A4-42 | N | — | *-C₆H₄-C₄H₉ |
| A4-43 | N | — | *-C₆H₄-OH |
| A4-44 | N | — | *-cyclohexyl-C₂H₅ |
| A4-45 | N | —COO— | *-C₆H₄-C₁₂H₂₅ |
| A4-46 | N | —COOCH₂— | —Ph |
| A4-47 | N | —CONH— | *-(4-methylthiazol-2-yl) |
| A4-48 | N | —CONH— | *-benzothiazol-2-yl |
| A4-49 | N | —CO— | *-(4-pyridyl) |
| A4-50 | N | —CO— | *-(2-pyridyl) |
| A4-51 | N | —CH₂CH₂— | —Ph |
| A4-52 | N | —CH₂CH₂O— | *-C₆H₄-C₁₂H₂₅ |
| A4-53 | N | —CH₂CH₂OCO— | *-(4-pyridyl) |
| A4-54 | N | —CH₂CH₂OCO— | *-(1-naphthyl) |
| A4-55 | N | —CH₂CH₂OCO— | *-cyclohexyl-OC₅H₁₁ |

[Chem. 58]

Structure: isothiazolopyridine (with H₃C and CN) —N=N—phenyl—N(piperidine with A¹)—L¹—Q¹

| No. | A¹ | L¹ | Q¹ |
|---|---|---|---|
| A4-56 | CH | — | —Ph |
| A4-57 | N | — | —Ph |
| A4-58 | N | — | *-C₆H₄-C₄H₉ |
| A4-59 | N | — | *-C₆H₄-OH |
| A4-60 | N | — | *-cyclohexyl-C₂H₅ |
| A4-61 | N | —COO— | *-C₆H₄-C₁₂H₂₅ |

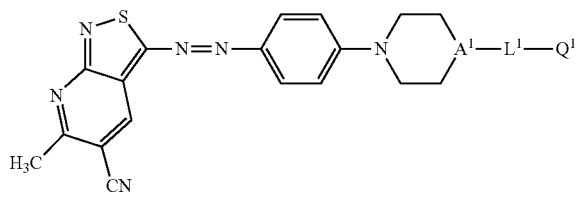

| No. | A¹ | L¹ | Q¹ |
|---|---|---|---|
| A4-62 | N(CH₂)₂ | —COOCH₂— | —Ph |
| A4-63 | N(CH₂)₂ | —CONH— | *—C₆H₄—OC₂H₅ |
| A4-64 | N(CH₂)₂ | —CONH— | *-(4-methylthiazol-2-yl) |
| A4-65 | N(CH₂)₂ | —CONH— | *-(benzothiazol-2-yl) |
| A4-66 | N(CH₂)₂ | —CO— | *-(pyridin-4-yl) |
| A4-67 | N(CH₂)₂ | —CO— | *-(pyridin-2-yl) |

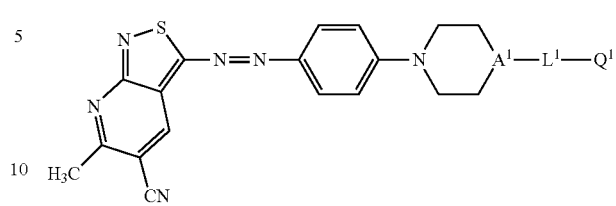

| No. | A¹ | L¹ | Q¹ |
|---|---|---|---|
| A4-68 | N(CH₂)₂ | —CH₂CH₂— | —Ph |
| A4-69 | N(CH₂)₂ | —CH₂CH₂O— | *—C₆H₄—C₁₂H₂₅ |
| A4-70 | N(CH₂)₂ | —CH₂CH₂OCO— | *-(pyridin-4-yl) |
| A4-71 | N(CH₂)₂ | —CH₂CH₂OCO— | *-(naphthalen-1-yl) |
| A4-72 | N(CH₂)₂ | —CH₂CH₂OCO— | *-(cyclohexyl-OC₅H₁₁) |

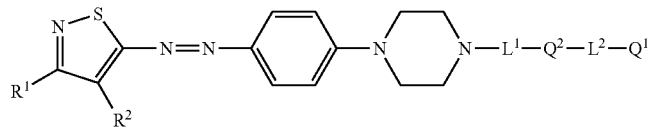

| No. | R¹ | R² | L¹ | Q² | L² | Q¹ |
|---|---|---|---|---|---|---|
| A4-73 | —CH₃ | —CN | — | *—C₆H₄—* | — | —Ph |
| A4-74 | —CH₃ | —CN | — | *—C₆H₄—* | — | *—C₆H₄—OC₄H₉ |
| A4-75 | —CH₃ | —CN | — | *—C₆H₄—* | —COO— | *—C₆H₄—CH₃ |
| A4-76 | —CH₃ | —CN | — | *—C₆H₄—* | —COO— | *—C₆H₄—C₁₂H₂₅ |

-continued
[Chem. 59]
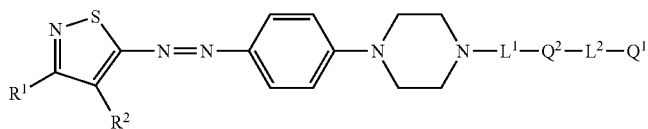
| No. | R¹ | R² | L¹ | Q² | L² | Q¹ |
|---|---|---|---|---|---|---|
| A4-77 | —CH₃ | —CN | — | *—C₆H₄—* | —COO— | *—C₆H₄—OCH₃ |
| A4-78 | —CH₃ | —CN | — | *—C₆H₄—* | —COOCH₂— | —Ph |
| A4-79 | —CH₃ | —CN | — | *—C₆H₄—* | —CONH— | *—C₆H₄—OC₂H₅ |
| A4-80 | —CH₃ | —CN | — | *—C₆H₄—* | —CONH— | *—C₆H₄—NO₂ |
| A4-81 | —CH₃ | —CN | — | *—C₆H₄—* | —CONH— | *—C₆H₄—SO₃H |
| A4-82 | —CH₃ | —CN | — | *—C₆H₄—* | —OCO— | *—C₆H₄—C₄H₉ |
| A4-83 | —CH₃ | —CN | — | *—C₆H₄—* | —OCO— | *-(4-pyridyl) |
| A4-84 | —CH₃ | —CN | — | *—C₆H₄—* | —NHCO— | *—C₆H₄—C₄H₉ |
| A4-85 | —CH₃ | —CN | — | *—C₆H₁₀—* | —OCO— | *—C₆H₄—C₄H₉ |
[Chem. 60]
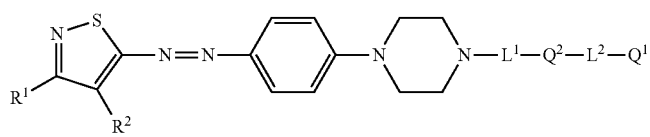
| No. | R¹ | R² | L¹ | Q² | L² | Q¹ |
|---|---|---|---|---|---|---|
| A4-86 | —CH₃ | —CN | —COO— | *—C₆H₁₀—* | —OCO— | *—C₆H₄—CH₃ |
| A4-87 | —CH₃ | —CN | —COO— | *—C₆H₁₀—* | —COO— | *—C₆H₄—C₁₂H₂₅ |

-continued

[Chem. 60]

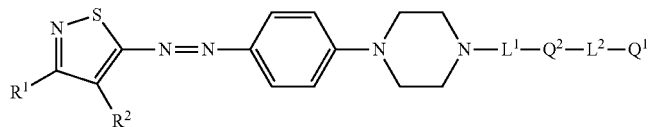

| No. | R¹ | R² | L¹ | Q² | L² | Q¹ |
|---|---|---|---|---|---|---|
| A4-88 | —CH₃ | —CN | —CO— | *—⟨C₆H₄⟩—* | — | —Ph |
| A4-89 | —CH₃ | —CN | —CO— | *—N(piperazine)N—* | —COO— | *—⟨C₆H₄⟩—C₁₂H₂₅ |
| A4-90 | —CH₃ | —CN | —CH₂CH₂— | *—⟨C₆H₄⟩—* | —OCO— | *—⟨C₆H₄⟩—C₄H₉ |
| A4-91 | —CH₃ | —CN | —CH₂CH₂— | *—N(piperazine)N—* | — | —Ph |
| A4-92 | —CH₃ | —CN | —CH₂CH₂— | *—N(piperazine)N—* | —COO— | *—⟨C₆H₄⟩—C₁₂H₂₅ |
| A4-93 | —CH₃ | —CN | —CH₂CH₂— | *—N(piperazine)N—* | —CO— | *—⟨C₆H₄⟩—C₄H₉ |
| A4-94 | —CH₃ | —CN | —CH₂CH₂— | *—N(piperidine)—* | — | —Ph |
| A4-95 | —CH₃ | —CN | —CH₂CH₂O— | *—⟨cyclohexyl⟩—* | —OCO— | *—⟨C₆H₄⟩—CH₃ |
| A4-96 | —CH₃ | —CN | —CH₂CH₂OCO— | *—N(piperazine)N—* | —COO— | *—⟨C₆H₄⟩—C₁₂H₂₅ |
| A4-97 | —CH₃ | —H | —CH₂CH₂OCO— | *—N(piperazine)N—* | — | —Ph |
| A4-98 | —H | —H | —CH₂CH₂OCO— | *—N(piperazine)N—* | — | —Ph |
| A4-99 | —H | —Cl | —CH₂CH₂OCO— | *—N(piperazine)N—* | — | —Ph |
| A4-100 | —H | —SO₃H | —CH₂CH₂OCO— | *—N(piperazine)N—* | — | —Ph |
| A4-101 | —H | —NO₂ | —CH₂CH₂OCO— | *—N(piperazine)N—* | — | —Ph |

[Chem. 61]

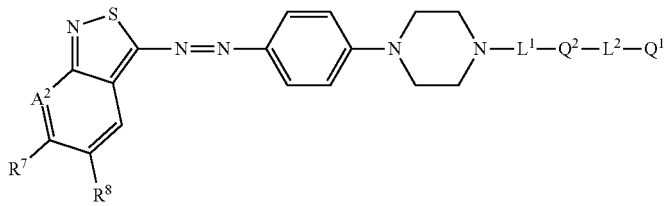

| No. | $A^2$ | $R^7$ | $R^8$ | $L^1$ | $Q^2$ | $L^2$ | $Q^1$ |
|---|---|---|---|---|---|---|---|
| A4-102 | —N= | —CH$_3$ | —CN | — | *—C$_6$H$_4$—* | — | —Ph |
| A4-103 | —N= | —CH$_3$ | —CN | — | *—C$_6$H$_4$—* | — | *—C$_6$H$_4$—OC$_4$H$_9$ |
| A4-104 | —N= | —CH$_3$ | —CN | — | *—C$_6$H$_4$—* | —COO— | *—C$_6$H$_4$—CH$_3$ |
| A4-105 | —N= | —CH$_3$ | —CN | — | *—C$_6$H$_4$—* | —COO— | *—C$_6$H$_4$—C$_{12}$H$_{25}$ |
| A4-106 | —N= | —CH$_3$ | —CN | — | *—C$_6$H$_4$—* | —COO— | *—C$_6$H$_4$—OCH$_3$ |
| A4-107 | —N= | —CH$_3$ | —CN | — | *—C$_6$H$_4$—* | —COOCH$_2$— | —Ph |
| A4-108 | —N= | —CH$_3$ | —CN | — | *—C$_6$H$_4$—* | —CONH— | *—C$_6$H$_4$—OC$_2$H$_5$ |
| A4-109 | —N= | —CH$_3$ | —CN | — | *—C$_6$H$_4$—* | —CONH— | *—C$_6$H$_4$—NO$_2$ |
| A4-110 | —N= | —CH$_3$ | —CN | — | *—C$_6$H$_4$—* | —CONH— | *—C$_6$H$_4$—SO$_3$H |
| A4-111 | —N= | —CH$_3$ | —CN | — | *—C$_6$H$_4$—* | —OCO— | *—C$_6$H$_4$—C$_4$H$_9$ |
| A4-112 | —N= | —CH$_3$ | —CN | — | *—C$_6$H$_4$—* | —OCO— | *—(4-pyridyl) |
| A4-113 | —N= | —CH$_3$ | —CN | — | *—C$_6$H$_4$—* | —NHCO— | *—C$_6$H$_4$—C$_4$H$_9$ |
| A4-114 | —N= | —CH$_3$ | —CN | — | *—C$_6$H$_{10}$—* | —OCO— | *—C$_6$H$_4$—C$_4$H$_9$ |

-continued

[Chem. 61]

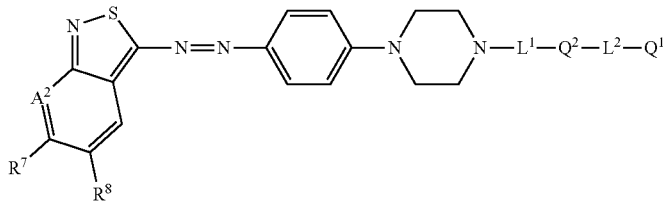

| No. | A² | R⁷ | R⁸ | L¹ | Q² | L² | Q¹ |
|---|---|---|---|---|---|---|---|
| A4-115 | —N= | —CH₃ | —CN | —COO— | *-cyclohexyl-* | —OCO— | *-C₆H₄-CH₃ |
| A4-116 | —N= | —CH₃ | —CN | —COO— | *-cyclohexyl-* | —COO— | *-C₆H₄-C₁₂H₂₅ |
| A4-117 | —N= | —CH₃ | —CN | —CO— | *-C₆H₄-* | —COO— | —Ph |
| A4-118 | —N= | —CH₃ | —CN | —CO— | *-piperazine-* | —COO— | *-C₆H₄-C₁₂H₂₅ |
| A4-119 | —N= | —CH₃ | —CN | —CH₂CH₂— | *-C₆H₄-* | —OCO— | *-C₆H₄-C₄H₉ |
| A4-120 | —N= | —CH₃ | —CN | —CH₂CH₂— | *-piperazine-* | —OCO— | —Ph |

[Chem. 62]

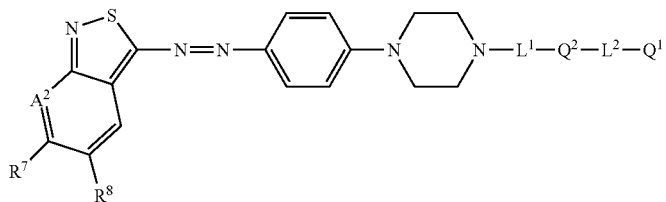

| No. | A² | R⁷ | R⁸ | L¹ | Q² | L² | Q¹ |
|---|---|---|---|---|---|---|---|
| A4-121 | —N= | —CH₃ | —CN | —CH₂CH₂— | *-piperazine-* | —COO— | *-C₆H₄-C₁₂H₂₅ |
| A4-122 | —N= | —CH₃ | —CN | —CH₂CH₂— | *-piperazine-* | —CO— | *-C₆H₄-C₄H₉ |
| A4-123 | —N= | —CH₃ | —CN | —CH₂CH₂— | *-piperidine-* | — | —Ph |

-continued

[Chem. 62]

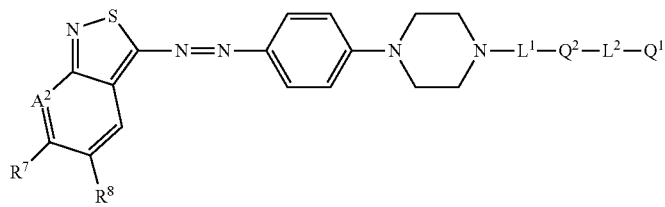

| No. | A² | R⁷ | R⁸ | L¹ | Q² | L² | Q¹ |
|---|---|---|---|---|---|---|---|
| A4-124 | —N= | —CH₃ | —CN | —CH₂CH₂O— | *-cyclohexyl-* | —OCO— | *-C₆H₄-CH₃ |
| A4-125 | —N= | —CH₃ | —CN | —CH₂CH₂OCO— | *-piperazine-* | —COO— | *-C₆H₄-C₁₂H₂₅ |
| A4-126 | —N= | —CH₃ | —H | —CH₂CH₂— | *-piperazine-* | — | —Ph |
| A4-127 | —N= | —H | —H | —CH₂CH₂— | *-piperazine-* | — | —Ph |
| A4-128 | —N= | —H | —Cl | —CH₂CH₂— | *-piperazine-* | — | —Ph |
| A4-129 | —N= | —H | —SO₃H | —CH₂CH₂— | *-piperazine-* | — | —Ph |
| A4-130 | —N= | —H | —NO₂ | —CH₂CH₂— | *-piperazine-* | — | —Ph |
| A4-131 | —CH= | —CH₃ | —CN | —CH₂CH₂— | *-piperazine-* | — | —Ph |
| A4-132 | —CH= | —CH₃ | —H | —CH₂CH₂— | *-piperazine-* | — | —Ph |
| A4-133 | —CH= | —H | —H | —CH₂CH₂— | *-piperazine-* | — | —Ph |
| A4-134 | —CH= | —H | —Cl | —CH₂CH₂— | *-piperazine-* | — | —Ph |
| A4-135 | —CH= | —H | —SO₃H | —CH₂CH₂— | *-piperazine-* | — | —Ph |
| A4-136 | —CH= | —H | —NO₂ | —CH₂CH₂— | *-piperazine-* | — | —Ph |

[Chem. 63]
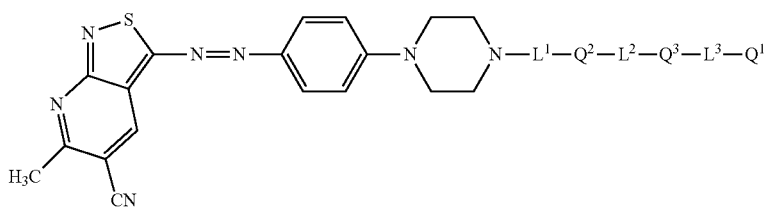
| No. | L¹ | Q² | L² | Q³ | L³ | Q¹ |
|---|---|---|---|---|---|---|
| A4-137 | — | *—⟨phenylene⟩—* | — | *—⟨phenylene⟩—* | —COO— | *—⟨phenyl⟩—C₁₂H₂₅ |
| A4-138 | — | *—⟨phenylene⟩—* | —COO— | *—⟨cyclohexylene⟩—* | —OCO— | *—⟨naphthyl⟩ |
| A4-139 | — | *—⟨phenylene⟩—* | —OCO— | *—⟨phenylene⟩—* | —CONH— | *—⟨4-methylthiazol-2-yl⟩ |
| A4-140 | —CH₂CH₂— | *—⟨piperazine⟩—* | —COO— | *—⟨cyclohexylene⟩—* | —OCO— | *—⟨phenyl⟩—CH₃ |
| A4-141 | —CH₂CH₂— | *—⟨piperazine⟩—* | — | *—⟨phenylene⟩—* | —N=N— | *—⟨isothiazolopyridine-CH₃,CN⟩ |
| A4-142 | —COO— | *—⟨cyclohexylene⟩—* | —OCO— | *—⟨phenylene⟩—* | — | —Ph |
[Chem. 64]
(A4-143)
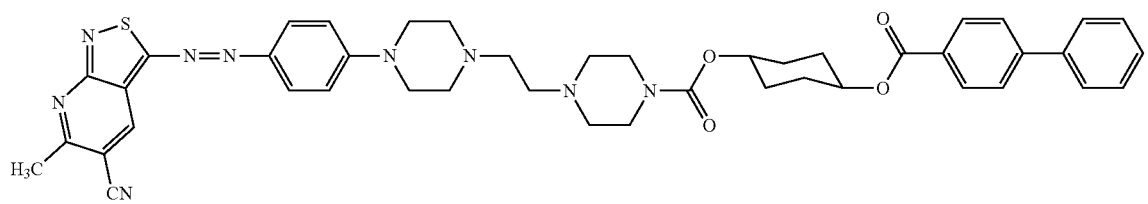

(A4-144)

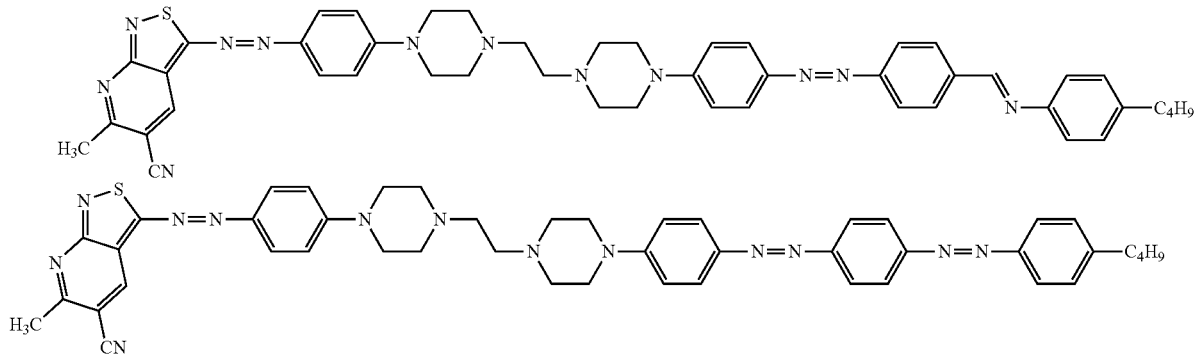

The compound (azo dye) represented by formula (I), (II), (III) or (IV) can be synthesized according to the methods described in "Dichroic Dyes for Liquid Crystal Display" (A. V. Ivashchenko, published by CRC, 1994), "Sohsetsu Gohsei Senryou (Review of Synthesized Dyes)" (written by Hiroshi Horiguchi, published by Sankyo Publishing Co., Ltd., 1968) and literature cited therein.

The azo dye represented by formula (I), (II), (III) or (IV) in accordance with the present invention can be easily synthesized according to the method described in, for example, Journal of Materials Chemistry (1999), 9(11), pp. 2755-2763.

As apparent from its molecular structure, the azo dye represented by formula (I), (II), (III) or (IV) has a planar molecular shape and a favorable linearity, and has a rigid and solid core part and a flexible side-chain part, and also has a polar amino group at the terminal of the molecular long axis of the azo dye. Thus, the azo dye represented by formula (I), (II), (III) or (IV) itself has a characteristic easily exhibiting liquid crystallinity, especially nematic liquid crystallinity.

As in the above, in the present invention, the dichroic dye composition containing at least one dichroic dye represented by formula (I), (II), (III) or (IV) preferably has liquid crystallinity.

Further, since the azo dye represented by formula (I), (II), (III) or (IV) is high in terms of molecular flatness, a strong intermolecular interaction can act. Thus, the azo dye represented by formula (I), (II), (III) or (IV) also has a property of easily forming an association state of the molecules with each other.

The dichroic dye composition containing the azo dye represented by formula (I), (II), (III) or (IV) not only exhibits the high absorbance in a wide visible wavelength region caused by association formation, but also specifically has a nematic liquid crystallinity. Accordingly, for example, a high level of molecular alignment state is realizable through undergoing a lamination process such as coating over the surface of a polyvinyl alcohol alignment film after rubbing treatment. Therefore, the linear polarizing layer formed from the dichroic dye composition containing the azo dye represented by formula (I), (II), (III) or (IV) exhibits a high polarizing property, and a printing paper having the same is capable of providing a clear stereoscopic image without crosstalk or ghost images.

The preferred dichroic ratio (D) of the dichroic dye composition is 18 or more.

With respect to liquid crystallinity, the azo dye represented by formula (I), (II), (III) or (IV) exhibits a nematic liquid crystal phase preferably at 10 to 300° C. and more preferably 100 to 250° C.

The dichroic dye composition preferably contains one or more kinds of the azo dyes represented by formula (I), (II), (III) or (IV). In order to obtain a linear polarizing layer with a high dichroic ratio, the polarizing layer is preferably formed from a black dichroic dye composition. In addition, the azo dye represented by formula (Ia) is a magenta azo dye, the azo dye represented by formula (Ib) and (II) is a yellow or magenta azo dye, and the azo dye represented by formula (III) and (IV) is a cyan azo dye.

The black composition may be prepared by mixing these dyes.

Further, the dichroic dye may be a dye other than the azo dye represented by (I), (II), (III) or (IV). The dye other than the azo dye represented by formula (I), (II), (III) or (IV) is also preferably selected from compounds exhibiting liquid crystallinity. Examples of such a dye include a cyanine dye, an azo metal complex, a phthalocyanine dye, a pyrylium dye, a thiopyrylium dye, an azulenium dye, a squarylium dye, a quinone dye, a triphenylmethane dye, and a triallylmethane dye. Among them, a squarylium dye is preferable. In particular, those described in "Dichroic Dyes for Liquid Crystal Display" (A. V. Ivashchenko, CRC, 1994) may also be used.

The squarylium dye that can be used in the present invention is particularly preferably represented by formula (VI) below.

[Chem. 65]

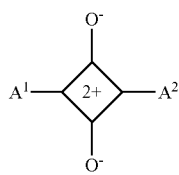

Formula (VI)

In Formula (VI), $A^1$ and $A^2$ each independently represent a substituted or unsubstituted hydrocarbon ring group or heterocyclic group.

The hydrocarbon ring group is preferably a 5 to 20-membered monocyclic or condensed ring group. The hydrocarbon ring group may be an aromatic ring or a non-aromatic ring. Carbon atoms constituting the hydrocarbon ring may be substituted by atoms other than hydrogen atoms. For example, one or more carbon atoms constituting the hydrocarbon ring may be C=O, C=S or C=NR wherein R represents a hydrogen atom or a $C_{1-10}$ alkyl group). Further, one or more carbon atoms constituting the hydrocarbon ring may have substituents, and specific examples of the substituents may be selected from the substituent group G which will be described hereinafter. Examples of the hydrocarbon ring group include, but are not limited to, the following groups.

[Chem. 66]

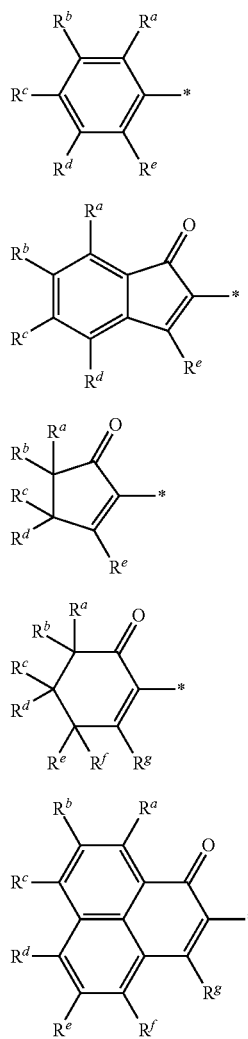

In formula A-5, $R^g$ represents a hydroxy group, that is, a group represented by formula A-5a below.

[Chem. 67]

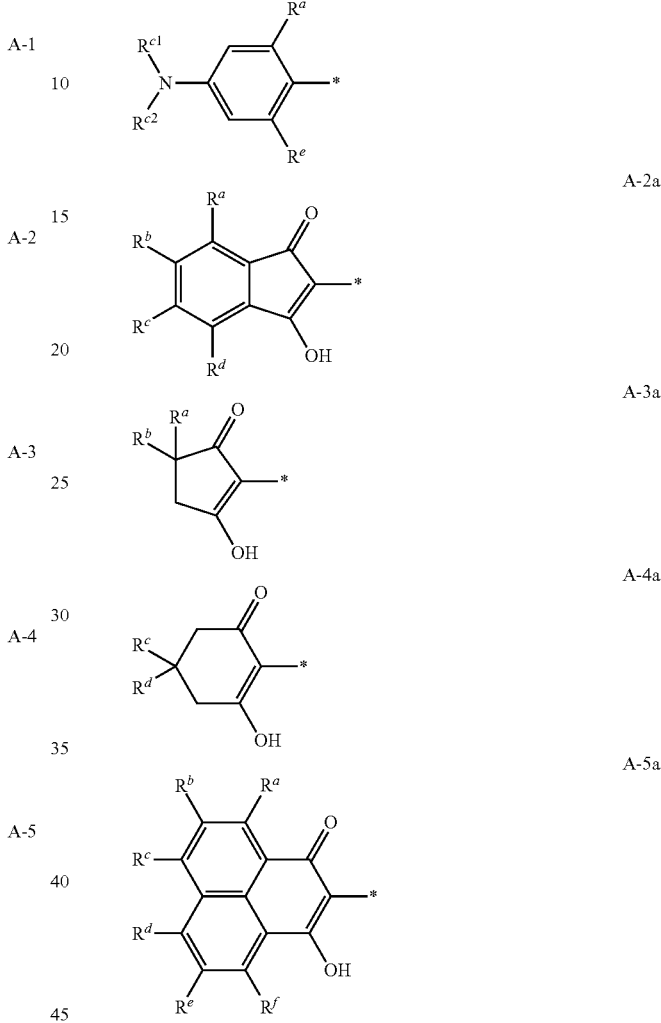

In formulae A-1 to A-5, * represents a binding site to the squarylium backbone, $R^a$ to $R^g$ each represent a hydrogen atom or a substituent, and if possible, $R^a$ to $R^g$ taken together may form a ring structure. The substituent may be selected from the substituent group G which will be described hereinafter.

In particular, the following examples are preferable.

In formula A-1, $R^c$ represents —N($R^{c1}$)($R^{c2}$), $R^{c1}$ and $R^{c2}$ each represent a hydrogen atom, or a substituted or unsubstituted alkyl group having 1 to 10 carbon atoms, and $R^b$ and $R^d$ represent a hydrogen atom, that is, a group represented by formula A-1a below.

In formula A-2, $R^e$ represents a hydroxy group, that is, a group represented by formula A-2a below.

In formula A-3, $R^e$ represents a hydroxy group, and $R^c$ and $R^d$ represent a hydrogen atom, that is, a group represented by formula A-3a below.

In formula A-4, $R^g$ represents a hydroxy group, and $R^a$, $R^b$, $R^e$ and $R^f$ represent a hydrogen atom, that is, a group represented by formula A-4a below.

In formula A-1a, $R^{c1}$ and $R^{c2}$ each independently represent a hydrogen atom or a substituted or unsubstituted alkyl group having 1 to 10 carbon atoms; other symbols in formulae A-1a to A-5a have the same definitions as those in formulae A-1 to A-5, respectively. Examples of the substituent for an alkyl group include the substituent group G which will be described hereinafter, and a preferred range thereof is the same. Where $R^{c1}$ and $R^{c2}$ represent a substituted or unsubstituted alkyl group, $R^{c1}$ and $R^{c2}$ taken together may form a nitrogen-containing heterocyclic group. Further, at least one of $R^{c1}$ and $R^{c2}$ together with a carbon atom of the benzene ring in formula A-1a may form a condensed ring. For example, the formed ring structure may be formulae A-1b and A-1c below.

[Chem. 68]

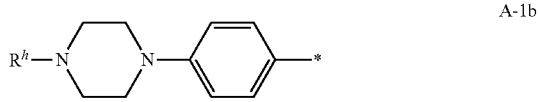

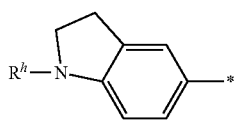
A-1c

In formula A-1a and A-1c, * represents a binding site to the squarylium backbone, and $R^h$ represents a hydrogen atom or a substituent. Examples of the substituent include the substituent group G which will be described hereinafter. $R^h$ is preferably a substituent containing one or more benzene rings.

The heterocyclic group is preferably a 5 to 20-membered monocyclic or condensed ring group. The heterocyclic group contains at least one of a nitrogen atom, a sulfur atom and an oxygen atom as a ring-constituting atom. Further, the heterocyclic group may contain one or more carbon atoms as a ring-constituting atoms, and hetero atoms or carbon atoms constituting the heterocyclic ring may be substituted by atoms other than a hydrogen atom.

For example, one or more sulfur atoms constituting the heterocyclic ring may be, for example, S=O or S(O)$_2$, and one or more carbon atoms constituting the heterocyclic ring may be C=O, C=S or C=NR wherein R represents a hydrogen atom or a C$_{1-10}$ alkyl group). Further, the heterocyclic group may be an aromatic ring or a non-aromatic ring. One or more hetero atoms and/or carbon atoms constituting the heterocyclic group may have substituents, and specific examples of the substituents may be selected from the substituent group G which will be described hereinafter. Examples of the heterocyclic group include, but are not limited to, the following groups.

[Chem. 69]

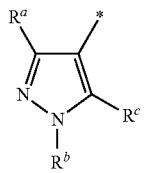
A-6

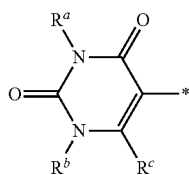
A-7

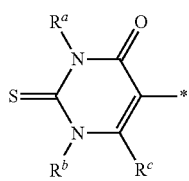
A-8

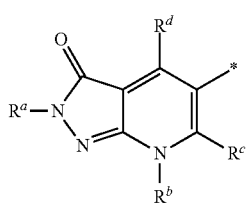
A-9

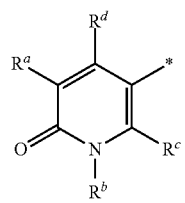
A-10

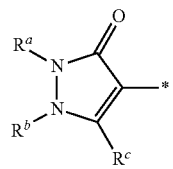
A-11

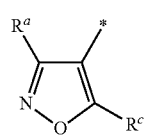
A-12

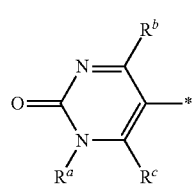
A-13

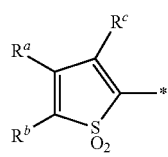
A-14

A-15

A-16

A-17

A-18

-continued
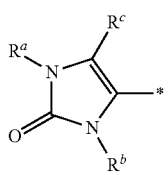 A-19
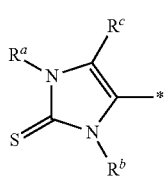 A-20
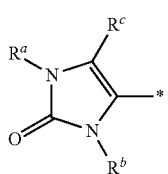 A-21
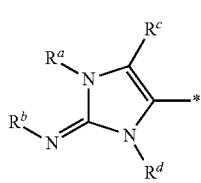 A-22
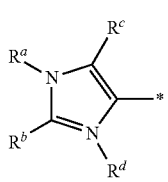 A-23
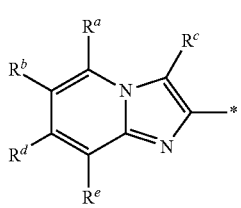 A-24
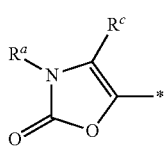 A-25
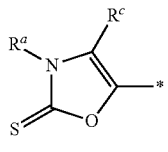 A-26
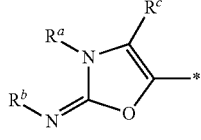 A-27
-continued
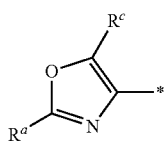 A-28
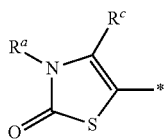 A-29
[Chem. 70]
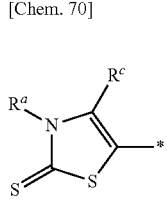 A-30
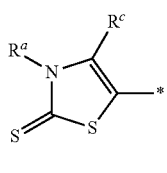 A-31
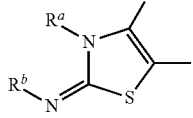 A-32
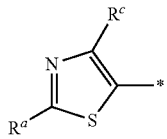 A-33
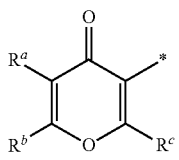 A-34
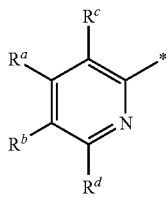 A-35
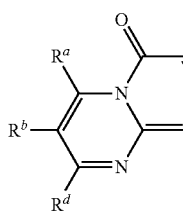 A-36

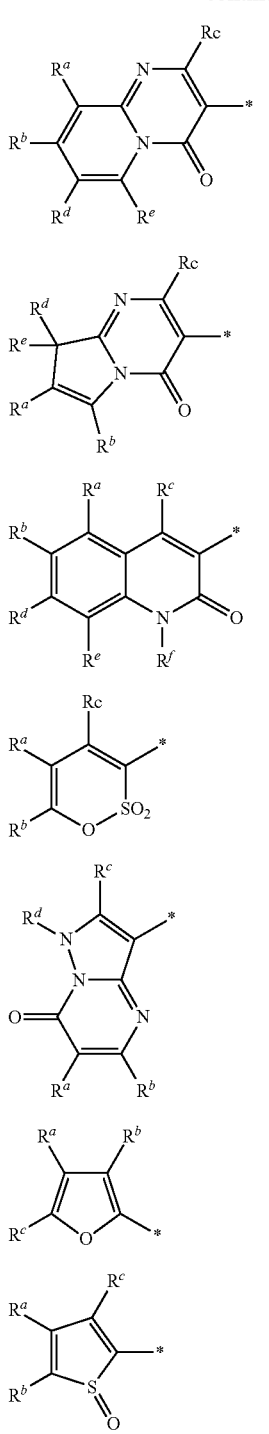

In the above formulae, * represents a binding site to the squarylium backbone, $R^a$ to $R^f$ each represent a hydrogen atom or a substituent, and if possible, $R^a$ to $R^f$ taken together may form a ring structure. The substituent may be selected from the substituent group G which will be described hereinafter.

In formulae A-6 to A-43, Rc preferably represents a hydroxy group (OH) or a hydrothioxy group (SH).

The hydrocarbon ring group is preferably a hydrocarbon ring group represented by A-1, A-2 or A-4, and more preferably A-1a, A-2a or A-4a. Particularly preferably, the hydrocarbon ring group is a hydrocarbon ring group represented by A-1 or A-2, more preferably A-1a or A-2a, and still more preferably A-1a. Among them, preferred is a hydrocarbon ring group represented by A-1a in which $R^a$ and $R^e$ represent a hydrogen atom or a hydroxyl group.

The preferable heterocyclic group is a heterocyclic ring represented by A-6, A-7, A-8, A-9, A-10, A-11, A-14, A-24, A-34, A-37 or A-39. Particularly preferably, the heterocyclic group is a heterocyclic ring represented by A-6, A-7, A-8, A-9, A-11, A-14, A-34 or A-39. In these formulae, Rc is more preferably a hydroxy group (OH) or a hydrothioxy group (SH).

In formula (VI), at least one of $A^1$ and $A^2$ is particularly preferably A-1 (more preferably A-1a).

The hydrocarbon ring group and the heterocyclic group may have one or more substituents, and examples of the substituents include the following substituent group G.

Substituent Group G:

a substituted or unsubstituted linear, branched or cyclic alkyl group having 1 to 18 carbon atoms (preferably 1 to 8 carbon atoms) (for example, methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl or trifluoromethyl); a substituted or unsubstituted aralkyl group having 7 to 18 carbon atoms (preferably 7 to 12 carbon atoms) (for example, benzyl or carboxybenzyl); a substituted or unsubstituted alkenyl group having 2 to 18 carbon atoms (preferably 2 to 8 carbon atoms) (for example, vinyl); a substituted or unsubstituted alkynyl group having 2 to 18 carbon atoms (preferably 2 to 8 carbon atoms) (for example, ethynyl); a substituted or unsubstituted aryl group having 6 to 18 carbon atoms (preferably 6 to 10 carbon atoms) (for example, phenyl, 4-methylphenyl, 4-methoxyphenyl, 4-carboxyphenyl or 3,5-dicarboxyphenyl);

a substituted or unsubstituted acyl group having 2 to 18 carbon atoms (preferably 2 to 8 carbon atoms) (for example, acetyl, propionyl, butanoyl or chloroacetyl); a substituted or unsubstituted alkyl or arylsulfonyl group having 1 to 18 carbon atoms (preferably 1 to 8 carbon atoms) (for example, methanesulfonyl or p-toluenesulfonyl); an alkylsulfinyl group having 1 to 18 carbon atoms (preferably 1 to 8 carbon atoms) (for example, methanesulfinyl, ethanesulfinyl or octanesulfinyl); an alkoxycarbonyl group having 2 to 18 carbon atoms (preferably 2 to 8 carbon atoms) (for example, methoxycarbonyl or ethoxycarbonyl); an aryloxycarbonyl group having 7 to 18 carbon atoms (preferably 7 to 12 carbon atoms) (for example, phenoxycarbonyl, 4-methylphenoxycarbonyl or 4-methoxyphenylcarbonyl); a substituted or unsubstituted alkoxy group having 1 to 18 carbon atoms (preferably 1 to 8 carbon atoms) (for example, methoxy, ethoxy, n-butoxy or methoxyethoxy); a substituted or unsubstituted aryloxy group having 6 to 18 carbon atoms (preferably 6 to 10 carbon atoms) (for example, phenoxy or 4-methoxyphenoxy); an alkylthio group having 1 to 18 carbon atoms (preferably 1 to 8 carbon atoms) (for example, methylthio or ethylthio); an arylthio group having 6 to 10 carbon atoms (for example, phenylthio);

a substituted or unsubstituted acyloxy group having 2 to 18 carbon atoms (preferably 2 to 8 carbon atoms) (for example, acetoxy, ethylcarbonyloxy, cyclohexylcarbonyloxy, benzoyloxy or chloroacetyloxy); a substituted or unsubstituted sulfonyloxy group having 1 to 18 carbon atoms (preferably 1 to 8 carbon atoms) (for example, methanesulfonyloxy); a substituted or unsubstituted carbamoyloxy group having 2 to 18 carbon atoms (preferably 2 to 8 carbon atoms) (for example, methylcarbamoyloxy or diethylcarbamoyloxy); an unsubstituted amino group or a substituted amino group having 1 to 18 carbon atoms (preferably 1 to 8 carbon atoms) (for example, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsulfamoylamino, phenylsulfamoylamino, acetylamino, ethylcarbonylamino, ethylthiocarbonylamino, cyclohexylcarbonylamino, benzoylamino, chloroacetylamino, methanesulfonylamino or benzenesulfonylamino);

a substituted or unsubstituted carbamoyl group having 1 to 18 carbon atoms (preferably 1 to 8 carbon atoms) (for example, unsubstituted carbamoyl, methylcarbamoyl, ethylcarbamoyl, n-butylcarbamoyl, t-butylcarbamoyl, dimethylcarbamoyl, morpholinocarbamoyl or pyrrolidinocarbamoyl); an unsubstituted sulfamoyl group, or a substituted sulfamoyl group having 1 to 18 carbon atoms (preferably 1 to 8 carbon atoms) (for example, methylsulfamoyl or phenylsulfamoyl); a halogen atom (for example, fluorine, chlorine or bromine); a hydroxyl group; a nitro group; a cyano group; a carboxyl group; a heterocyclic group (for example, oxazole, benzoxazole, thiazole, benzothiazole, imidazole, benzimidazole, indolenine, pyridine, sulfolane, furan, thiophene, pyrazole, pyrrole, chromane or coumarin).

Examples of the dichroic squarylium dye represented by formula (VI) include, but are not limited to, the following exemplified compounds.

[Chem. 71]

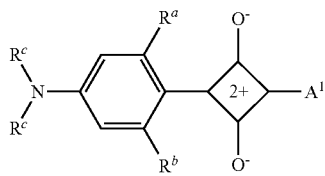

| No. | $R^a$ | $R^b$ | $R^c$ | $R^d$ |
|---|---|---|---|---|
| VI-1 | H | H | CH$_3$ | CH$_3$ |
| VI-2 | H | H | C$_2$H$_5$ | C$_2$H$_5$ |
| VI-3 | H | H | CH$_3$ | C$_2$H$_5$ |
| VI-4 | OH | H | CH$_3$ | CH$_3$ |
| VI-5 | OH | H | C$_2$H$_5$ | C$_2$H$_5$ |
| VI-6 | OH | H | CH$_3$ | C$_2$H5 |
| VI-7 | OH | OH | CH$_3$ | CH$_3$ |
| VI-8 | OH | OH | C$_2$H$_5$ | C$_2$H$_5$ |
| VI-9 | OH | OH | CH$_3$ | C$_2$H$_5$ |
| VI-10 | OH | CH3 | CH$_3$ | CH$_3$ |

[Chem. 72]

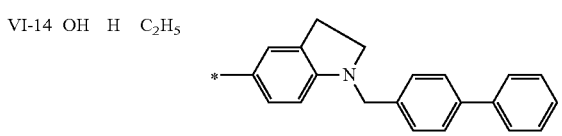

| No. | $R^a$ | $R^b$ | $R^c$ | A |
|---|---|---|---|---|
| VI-11 | H | H | CH$_3$ | *—⟨⟩—N(piperazine)N—⟨⟩—C$_5$H$_{11}$ |
| VI-12 | H | H | C$_2$H$_5$ | *—⟨⟩—N(piperazine)N—⟨⟩—C$_5$H$_{11}$ |

-continued

[Chem. 72]

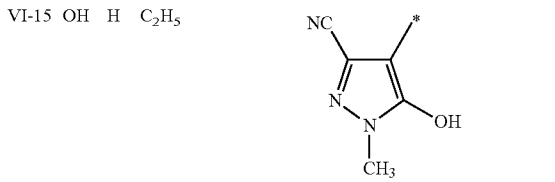

| No. | $R^a$ | $R^b$ | $R^c$ | A |
|---|---|---|---|---|
| VI-13 | OH | H | C$_2$H$_5$ | *—⟨⟩—N(piperazine)N—⟨⟩—C$_5$H$_{11}$ |
| VI-14 | OH | H | C$_2$H$_5$ | (indoline-biphenylmethyl) |
| VI-15 | OH | H | C$_2$H$_5$ | (pyrazole with NC, OH, CH$_3$) |
| VI-16 | OH | H | C$_2$H$_5$ | (dimethyl uracil) |
| VI-17 | OH | H | C$_2$H$_5$ | (pyrazolopyridine) |

[Chem. 73]

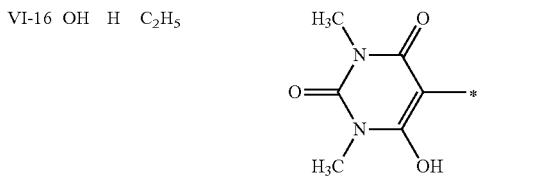

| VI-18 | OH | H | C$_2$H$_5$ | (pyridone with NC, CH$_3$, OH) |
| VI-19 | OH | H | C$_2$H$_5$ | (dimethylpyrazolone) |

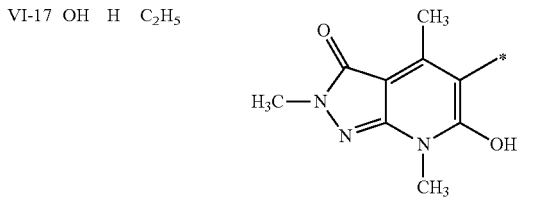

[Chem. 73]

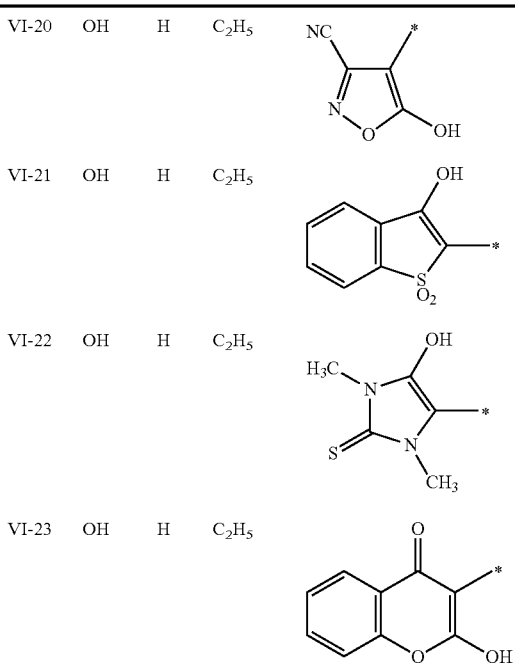

[Chem. 74]

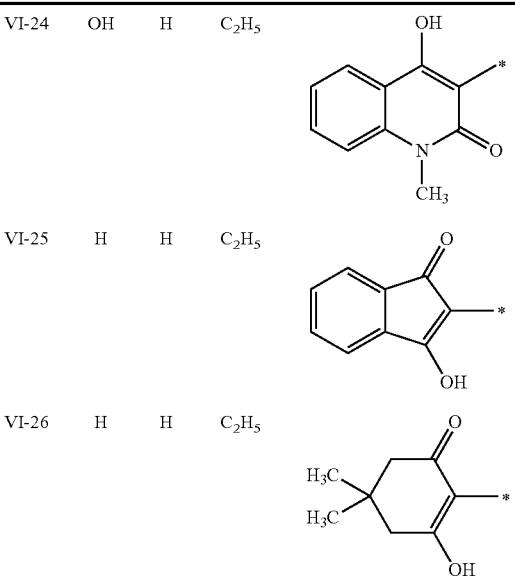

The dichroic squarylium dye represented by formula (VI) can be easily synthesized according to the method described in, for example, Journal of the Chemical Society, Perkin Trans. 1 (2000), 599-603, Synthesis (2002), No. 3, 413-417.

With regard to the dichroic dye that can be used in the present invention, an angle between a transition moment and a molecular long axis is preferably from 0° to 20°, more preferably from 0° to 15°, still more preferably from 0° to 10°, and particularly preferably from 0° to 5°. As used herein, the term "molecular long axis" refers to an axis that links two atoms such that an interatomic distance in a compound is the maximum. The direction of the transition moment can be determined by molecular orbital calculation, and an angle made by the molecular long axis can also be calculated based thereon.

The dichroic dye that can be used in the present invention is preferably a rigid linear structure. Specifically, the molecular length is preferably 17 Å or longer, more preferably 20 Å or longer, and still more preferably 25 Å or longer. The aspect ratio is preferably 1.7 or more, more preferably 2 or more, and still more preferably 2.5 or more. Accordingly, favorable uniaxial alignment is achieved, and then a dichroic dye layer and a stereoscopic image printed matter with high polarization performance can be obtained.

As used herein, the term "molecular length" refers to a value obtained by adding van der Waals radii of two atoms at opposite ends to the maximum interatomic distance in a compound. The term "aspect ratio" refers to molecular length/molecular width, and the term "molecular width" refers to a value obtained by adding van der Waals radii of two atoms at opposite ends to the maximum interatomic distance when each atom is projected to a plane perpendicular to the molecular long axis.

The dichroic dye composition contains one or more kinds of the dyes represented by formula (I), (II), (III), (IV) or (VI) as a main component. Specifically, the content of the dye represented by formula (I), (II), (III), (IV) or (VI) is preferably 80% by mass or more, and particularly preferably 90% by mass or more, based on the total content of all dyes to be contained. The upper limit of the content of the dye is 100% by mass, and namely, all the dyes to be contained may be, of course, the dyes represented by formula (I), (II), (III), (IV) or (VI).

The content of one or more kinds of the dichroic dyes represented by formula (I), (II), (III), (IV) or (VI) is preferably 20% by mass or more and particularly preferably 30% by mass or more, based on the total solid matter contained in the dichroic dye composition with the exclusion of a solvent. Although the upper limit of the dichroic dye content is not particularly limited, in an embodiment containing other additives such as the surfactant mentioned below, the content of one or more kinds of the dichroic dyes represented by formula (I), (II), (III), (IV) or (VI) based on the total solid matter excluding a solvent contained in the dichroic dye composition is preferably 95% by mass or less, and more preferably 90% by mass or less, so as to obtain the effect thereof.

The dichroic dye composition preferably exhibits thermotropic liquid crystallinity, that is, it is thermally transferred into a liquid crystal phase to exhibit liquid crystallinity. The dichroic dye composition exhibits a nematic liquid crystal phase at a temperature of preferably 10 to 300° C., and more preferably 100 to 250° C. In particular, the dichroic dye composition preferably exhibits a smectic A liquid crystal phase at a lower temperature region than a nematic liquid crystal phase, and the preferred temperature is in a range of 10 to 200° C., and more preferably 50 to 200° C.

When a coating liquid composed of the dichroic dye composition is applied to an alignment film, the dichroic dye is aligned at the tilt angle of the alignment film at the dichroic dye-alignment film interface and at the tilt angle of the air interface at the dichroic dye-air interface. After the coating liquid composed of the dichroic dye composition of the present invention is applied to the surface of the alignment film, the dichroic dye can be uniformly aligned (monodomain alignment) thereby to attain horizontal alignment.

The dichroic dye layer formed by aligning the dichroic dye horizontally and fixing the dye in that aligned state may be utilized as a stereoscopic image printed matter.

As used herein, the term "tilt angle" refers to an angle between the long axis direction of a dichroic dye molecule and an interface (an alignment film interface or an air interface). Narrowing the tilt angle at the alignment film side to an extent and horizontally aligning preferably provide a linear polarizing layer with a high dichroic ratio. The tilt angle at the alignment film side is preferably in a range of 0° to 10°, more preferably 0° to 5°, particularly preferably 0° to 2°, and most preferably 0° to 1°. In addition, a preferable tilt angle at the air interface side is in a range of 0° to 10°, more preferably 0° to 5°, and particularly preferably 0° to 2°.

Generally, the tilt angle of the dichroic dye at the air interface side can be adjusted by selecting another compound which is optionally added (for example, horizontally aligning agents described in JP2005-99248A, JP2005-134884A, JP2006-126768A and JP2006-267183A), and the preferable horizontal alignment state can be realized.

In addition, the tilt angle of the dichroic dye at the alignment film side may be controlled by using an agent for controlling a tilt angle at an alignment film.

The dichroic dye composition may contain one or more additives, in addition to the dichroic dye. The dichroic dye composition may contain a non-liquid crystalline multifunctional monomer having a radical polymerizable group, a polymerization initiator, an anti-weathering agent, an anti-cissing agent, saccharides, and agents having at least any function of an antifungal function, an antibacterial function and a sterilization function.

[Alignment Film]

In an embodiment in which the patterned linear polarizing layer is formed from a liquid crystal composition containing a dichroic dye, an alignment film is preferably used in the preparation of the linear polarizing layer. The utilizable alignment film may be any layer as long as it can provide a desired alignment state to a dichroic dye molecule on the alignment film.

There can be provided the alignment film formed of various materials by various methods such as subjecting the surface of a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, or methyl stearate) by a Langmuir-Blodgett method (LB film). Alignment films having an alignment effect under an electric or magnetic field or light irradiation are also known. Among them, according to the present invention, rubbing-aligned films prepared by a rubbing treatment are preferable from the viewpoint of convenient controllability of a pretilt angle at an alignment film. From the viewpoint of uniform alignment and easy patterning, a photo-aligned film prepared by light irradiation is preferable. The material for a rubbing-aligned film is generally, for example, polyvinyl alcohol and polyimide. Hereinafter, the photo-aligned film will be described in detail.

There are many descriptions as to photo-alignment materials used for a photo-aligned film to be formed by light irradiation. Preferable examples of the materials include azo compounds described in JP2006-285197A, JP2007-76839A, JP2007-138138A, JP2007-94071A, JP2007-121721A, JP2007-140465A, JP2007-156439A, JP2007-133184A, JP2009-109831A, Japanese Patent No. 3883848 and Japanese Patent No. 4151746; aromatic ester compounds described in JP2002-229039A; maleimide- and/or alkenyl-substituted nadimide compound having a photo-alignment unit as described in JP2002-265541A and JP2002-317013A; photo-crosslinkable silane derivatives described in Japanese Patent No. 4205195 and Japanese Patent No. 4205198; and photo-crosslinkable polyimides, polyamides or esters described in JP2003-520878A, JP2004-529220A and Japanese Patent No. 4162850. Particularly preferable examples include azo compounds; and photo-crosslinkable polyimide, polyamides and esters.

The photo-aligned film formed from the foregoing material is irradiated with a linearly polarized light or non-polarized light to produce a photo-aligned film.

In the present specification, the irradiation of linearly polarized light is performed to cause light reaction in the photo-aligning material. The wavelength of light used depends on the type of the photo-aligning material used, and is not particularly limited as long as the wavelength is sufficient to cause the light reaction. Preferably, the light used for light irradiation has a peak wavelength of 200 nm to 700 nm. More preferably, the light is ultraviolet light having a peak wavelength of 400 nm or lower.

Examples of the light source used for light irradiation include commonly used light sources such as lamps (e.g., tungsten lamps, halogen lamps, xenon lamps, xenon flash lamps, mercury lamps, mercury xenon lamps and carbon arc lamps), various lasers (e.g., semiconductor lasers, helium-neon lasers, argon ion lasers, helium cadmium lasers and YAG lasers), light-emitting diodes and cathode-ray tubes.

Examples of the method usable for obtaining a linearly polarized light include a method of using a polarizing plate (for example, an iodine polarizing plate, a dichroic dye polarizing plate or a wire grid polarizing plate), a method of using a prism device (for example, a Glan-Thomson prism) or a reflection-type polarizer utilizing the Brewster angle, and a method of using a light emitted from a laser light source and having polarization. Further, the photo-aligned film may be selectively irradiated with only a light having a necessary wavelength using a filter or a wavelength-converting element.

The irradiation time is preferably in a range of 1 minute to 60 minutes, and more preferably 1 minute to 10 minutes.

In order to obtain a patterned photo-alignment layer, as described above, a film made of a photo-aligning material is subjected to pattern exposure. The pattern exposure is preferably carried out using a photomask having a light shielding section and a light-transmitting section. For example, the exposure may be carried out using photomasks A and B shown in FIG. 5. Further, using a laser, an electron beam or the like, a predetermined site may be focused and directly delineated without a mask.

Transparent Support:

The printing paper of the present invention may have a transparent support for supporting the patterned linear polarizing layer. As the transparent support, a light-transmitting polymer film may be used. As described hereinbefore, since an optical property of the transparent support has an effect on the polarization state of a polarizing image being incident to a viewer's eyes, the transparent support is preferably low in terms of phase difference, and is preferably a film having a phase difference of 0 or substantially close to 0, Specifically, Re is preferably in a range of 0 to 10 nm. Further, since the retardation Rth in the thickness direction has also an effect on the polarization state of a polarizing image, Rth is also preferably low in terms of phase difference. An absolute value of Rth is preferably 20 nm or less.

There is no particular limitation on the material for a polymer film used as the transparent support. The material for the polymer film is preferably a polymer having high optical transparency, mechanical strength, thermal stability, watershieldability and isotropy, and any material may be used as long as it can form a film satisfying the above-mentioned optical properties. For example, usable are a polycarbonate polymer, a polyester polymer such as polyethylene terephthalate or polyethylene naphthalate, an acrylic polymer such as polymethyl methacrylate, and a styrenic polymer such as polystyrene or acrylonitrile/styrene copolymer (AS resin). Other examples of the polymer for use herein are polyolefins such as polyethylene or polypropylene; a polyolefinic polymer such as ethylene/propylene copolymer; a vinyl chloride polymer; an amide polymer such as nylon or aromatic polyamide; an imide polymer; a sulfone polymer; a polyether sulfone polymer; a polyether-ether ketone polymer; a polyphenylene sulfide polymer; a vinylidene chloride polymer; a vinyl alcohol polymer; a vinylbutyral polymer; an allylate polymer; a polyoxymethylene polymer; an epoxy polymer; and a mixture of any of the above-mentioned polymers. The polymer film of the present invention may be formed as a cured layer of a UV-curable or thermosetting resin such as acrylic, urethane, acrylurethane, epoxy or silicone resin.

Additionally, a thermoplastic norbornene resin may preferably be used as the material for the transparent support. Examples of the thermoplastic norbornene resins include Zeonex and Zeonor manufactured by Zeon Corporation, and Arton manufactured by JSR Corporation.

For the material for forming a film used as the transparent support, preferred is a cellulose polymer (hereinafter referred to as cellulose acylate) such as typically triacetyl cellulose that has conventionally been used for a transparent protective film for polarizing plates. Hereinafter, the cellulose acylate film that can be used as the transparent support is described in detail, but technical details thereof are also applicable to other polymer films.

The cellulose acylate material used for fabrication of the cellulose acylate film includes cotton linter and wood pulp (hardwood pulp, softwood pulp), and any cellulose acylate obtained from any cellulose material may be used herein. As the case may be, different types of cellulose acylates may be mixed for use herein. The cellulose material is described in detail, for example, in Plastic Material Lecture (17), Cellulose Resin (by Maruzawa & Uda, Nikkan Kogyo Shinbun (The Business & Technology Daily News), 1970), or Journal of Technical Disclosure (KOUKAI GIHOU) from Japan Institute of Invention and Innovation, (Technical Disclosure No. 2001-1745, pp. 7-8). However, the present invention is not limited thereto.

Cellulose acylate is produced by acylating the hydroxyl group in cellulose, in which the substituent acyl group may have from 2 carbon atoms (acetyl group) to 22 carbon atoms. In cellulose acylate in accordance with the present invention, the degree of substitution of the hydroxyl group in cellulose is not specifically defined. Specifically, the degree of substitution may be calculated by measuring the bonding degree of acetic acid and/or fatty acid having from 3 to 22 carbon atoms substituted for the hydroxyl group in cellulose. It may be measured according to the method of ASTM D-817-91.

As so mentioned hereinabove, the degree of substitution of the hydroxyl group in cellulose to give cellulose acylate is not specifically defined. The degree of acyl substitution of the hydroxyl group in cellulose is preferably in a range of 2.50 to 3.00, more preferably 2.75 to 3.00, and even more preferably 2.85 to 3.00.

Of acetic acid and/or fatty acids having 3 to 22 carbon atoms to be introduced in the place of a hydrogen atom of the hydroxyl group in cellulose, the acyl group having 2 to 22 carbon atoms may be an aliphatic group or an aromatic group and is not specifically defined. One or more different types of such acids may be used for the substitution either singly or by being combined. The cellulose acylate includes, for example, alkylcarbonyl esters, alkenylcarbonyl esters, aromatic carbonyl esters and aromatic alkylcarbonyl esters of cellulose, which may be further substituted. Preferred examples of the acyl group are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Of those, more preferred are acetyl, propionyl, butanoyl, dodecanoyl, octadecanoyl, t-butanoyl, oleoyl, benzoyl, naphthylcarbonyl and cinnamoyl; and even more preferred are acetyl, propionyl and butanoyl.

When the acyl substituent to be substituted for the hydroxyl group in cellulose is substantially at least two types selected from an acetyl group, a propionyl group and a butanoyl group and when the overall degree of substitution with it is in a range of 2.50 to 3.00, then the optical anisotropy of the cellulose acylate film may be lowered. More preferably, the degree of acyl substitution is in a range of 2.60 to 3.00, and even more preferably 2.65 to 3.00.

When the acyl substituent to be substituted for the hydroxyl group in cellulose is composed only of an acetyl group, the degree of substitution is preferably in a range of 2.80 to 2.99, and more preferably 2.85 to 2.95, from the viewpoint of compatibility with additives and solubility in organic solvents to be used, in addition to a decrease in optical anisotropy of the cellulose acylate film.

The degree of polymerization of the cellulose acylate is in a range of 180 to 700 in terms of the viscosity-average degree of polymerization thereof. Specifically, the viscosity-average degree of polymerization of cellulose acetate is in a range of 180 to 550, more preferably from 180 to 400, and even more preferably 180 to 350. If the degree of polymerization is too high, the viscosity of the dope solution of the cellulose acylate may increase, and the film formation from it by casting may be difficult. On the other hand, if the polymer has too low a degree of polymerization, then the strength of the film formed from it may lower. The average degree of polymerization may be determined according to Uda et al's limiting viscosity method (Kazuo Uda, Hideo Saito; the Journal of the Textile Society of Japan, Vol. 18, No. 1, pp. 105-120, 1962). It is described in detail in JP1997-95538A (JP-H9-95538A).

The molecular weight distribution of the cellulose acylate may be determined through gel permeation chromatography, and it is desirable that the polydispersion index Mw/Mn (Mw is a mass-average molecular weight, and Mn is a number-average molecular weight) of the polymer is smaller and the molecular weight distribution thereof is narrower. Specifically, the value of Mw/Mn of the polymer preferably falls between 1.0 and 3.0, more preferably between 1.0 and 2.0, and even more preferably between 1.0 and 1.6.

When a low-molecular-weight component is removed from it, then the average molecular weight (degree of polymerization) of the cellulose acylate may increase but the viscosity thereof may be lower than that of ordinary cellulose acylate, and therefore the cellulose acylate of the type is favorable. The cellulose acylate having a reduced low-molecular-weight content may be obtained by removing a low-molecular-weight component from cellulose acylate produced in an ordinary method. For removing the low-molecular-weight component from it, cellulose acylate may be washed with a suitable organic solvent. When the cellulose acylate having a reduced low-molecular-weight content is produced, it is desirable that the amount of a sulfuric acid catalyst in acetylation is controlled to fall in a range of 0.5 to 25 parts by mass relative to 100 parts by mass of cellulose. The amount of the sulfuric acid catalyst falling within the above-specified range is preferable in that the cellulose acylate produced may have a preferred (uniform) molecular weight distribution. In forming it into films, the cellulose acylate preferably has a water content of 2% by mass or less, more preferably 1% by mass or less, particularly preferably 0.7% by mass or less. It is known that cellulose acylate generally contains water and its water content is in a range of 2.5 to 5% by mass. In order that the cellulose acylate for use in the present invention is made to have the preferred water content as above, it must be dried. The method of drying the cellulose acylate is not specifically defined as long as the dried polymer may have the desired water content. The method for producing cellulose acylate is described in detail in Journal of Technical Disclosure (KOUKAI GIHOU) from Japan Institute of Invention and Innovation, (Technical Disclosure No. 2001-1745, issued Mar. 15, 2001, pp. 7-12).

Any cellulose acylate may be used herein so far as it satisfies the above-mentioned range in point of the substituent therein, the degree of substitution, the degree of polymerization and the molecular weight distribution thereof. One or more different types of cellulose acylates may be used herein either singly or as combined.

To the cellulose acylate may be added various additives (e.g., an optical anisotropy-reducing compound, a wavelength dispersion-controlling agent, fine particles, a plasticizer, a UV inhibitor, a degradation inhibitor, a release agent, optical properties-controlling agent, etc.). In an embodiment in which the cellulose acylate film is formed by solution film forming method (solvent casting method), additives may be added to the dope anytime while the dope is prepared (production process of a cellulose acylate solution). For example, the dope-preparing process may include a final step of adding the additives to the dope prepared.

By adjusting the addition amount of these additives, a cellulose acylate film satisfying $0 \leq Re(550) \leq 10$ can be prepared.

The cellulose acylate film used as a transparent support may preferably contain at least one compound having the ability to reduce the optical anisotropy, particularly retardation, Rth in the film thickness direction. The compound is a compound capable of preventing cellulose acylate in the film from being aligned in the in-plane direction and in the thickness direction. Accordingly, a cellulose acylate film with low Re and Rth can be obtained by adding such a compound to fully reduce the optical anisotropy of the film. For this purpose, it is advantageous that the optical anisotropy-reducing compound is highly miscible with the cellulose acylate and the compound itself does not have a rod-like structure and a flat structure. For example, when the compound has a plurality of flat functional groups such as aromatic groups, then it is advantageous that the structure of the compound is so designed that it may have the functional groups not in the same plane but in a non-plane.

The optical anisotropy-reducing compound is preferably a compound having an octanol-water partition coefficient (log P value) of 0 to 7. The compound having a log P value of larger than 7 is poorly miscible with cellulose acylate, and it may whiten the film formed or may make the film dusty. On the other hand, the compound having a log P value of smaller than 0 is highly hydrophilic and it may decrease the waterproofness of the cellulose acylate film. The log P value of the compound is more preferably in a range of 1 to 6, and particularly preferably 1.5 to 5.

The octanol-water partition coefficient (log P value) may be determined according to the flask dipping method described in JIS, Japan Industrial Standards Z7260-107 (2000). In place of actually measuring it, the octanol-water partition coefficient (log P value) may be estimated according to a calculative chemical method or an experiential method. For the calculative method, preferred are a Crippen's fragmentation method (J. Chem. Inf. Comput. Sci., 27, 21 (1987)), a Viswanadhan's fragmentation method (J. Chem. Inf. Comput. Sci., 29, 163 (1989)), a Broto's fragmentation method (Eur. J. Med. Chem.-Chim. Theor., 19, 71 (1984)); and more preferred is a Crippen's fragmentation method (J. Chem. Inf. Comput. Sci., 27, 21 (1987)). When a compound has different log P values, depending on the measuring method or the computing method employed, then the compound may be judged as to whether or not it falls within the scope of the present invention preferably according to the Crippen's fragmentation method. In addition, log P values described in the present specification are values calculated by a Crippen's fragmentation method (J. Chem. Inf. Comput. Sci., 27, 21 (1987).).

The compound capable of reducing optical anisotropy may or may not have an aromatic group. Preferably, the compound capable of reducing optical anisotropy has a molecular weight of from 150 to 3000, more preferably from 170 to 2000, and even more preferably from 200 to 1000. Having a molecular weight that falls within this range, the compound may have a specific monomer structure or may have an oligomer structure or polymer structure that contains the plural number of such monomer units bonded.

The compound capable of reducing optical anisotropy is preferably liquid at 25° C. or a solid having a melting point of 25 to 250° C., more preferably liquid at 25° C. or a solid having a melting point of 25 to 200° C. Also preferably, the compound capable of reducing optical anisotropy does not vaporize in the process of dope casting and drying for formation of a cellulose acylate film.

The amount of the optical anisotropy-reducing compound to be added is preferably in a range of 0.01 to 30% by mass relative to the cellulose acylate, more preferably 1 to 25% by mass, and particularly preferably from 5 to 20% by mass.

One or more different types of the optical anisotropy-reducing compounds may be used herein either singly or as combined in any desired ratio.

Regarding the content of the optical anisotropy-reducing compound, the average content of the compound in the part of 10% of the overall thickness from the surface of at least one side of the cellulose acylate film is preferably in a range of 80 to 99% of the average content of the compound in the center part of the cellulose acylate film. The amount of the compound existing in the film may be determined by measuring the amount of the compound in the surface and in the center part of the film, according to a method of infrared spectrometry as in JP1996-57879A (JP-H8-57879A).

Specific examples of the optical anisotropy-reducing compound usable in the cellulose acylate film include, but are not limited to, the compounds described in JP2006-199855A, paragraphs [0035] to [0058].

The film used as the transparent support disposed at the viewing side is vulnerable to light from the outside, particularly ultraviolet rays. Therefore, the film used as the support preferably contains a UV absorber. The UV absorber is preferably a compound that has absorption in an ultraviolet region of 200 to 400 nm and lowers |Re(400)-Re(700)| and |Rth(400)-Rth(700)| of the film, and is preferably used in an amount of 0.01 to 30% by mass relative to the solid content of cellulose acylate.

The film used in the support is required to have a high transmittance. From this viewpoint, when a compound having absorption in an ultraviolet region of 200 to 400 nm and lowering |Re (400)-Re (700)| and |Rth (400)-Rth (700)| of a film is added to the cellulose acylate film, it is required to have an excellent spectral transmittance. The UV absorber for use in the cellulose acylate film as the support is desirable to have a spectral transmittance of from 45% to 95% at the wavelength of 380 nm and a spectral transmittance of 10% or less at the wavelength of 350 nm.

The UV absorber preferably has a molecular weight of 250 to 1000 from the viewpoint of volatilization property. More preferably it is in a range of 260 to 800, further preferably 270 to 800, and particularly preferably 300 to 800. When the molecular weight of the UV absorber falls in these ranges, it may have a specific monomer structure, or an oligomer structure or polymer structure formed by plural bonds of the monomer units.

The UV absorber is preferably not volatile during the steps of dope casting and drying in manufacturing the cellulose acylate film.

Specific examples of UV absorber that can be added to the cellulose acylate film include the compounds described in JP A 2006-199855, paragraphs [0059] to [0135].

The cellulose acylate film used as a support may preferably contain fine particles as a mat agent. The fine particles usable in the present invention are silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. As the fine particle, the one containing silicon is preferable because of its low turbidity, and particularly silicon dioxide is preferable. The fine particles of silicon dioxide preferably have a primary average particle diameter of 20 nm or less, and an apparent specific gravity of 70 g/l or more. Particles having an average diameter of primary particles of as small as 5 to 16 nm are more preferred because they can reduce the haze of the film. The apparent specific gravity is preferably 90 to 200 g/l or more, and further preferably 100 to 200 g/l or more. Particles with a larger apparent specific gravity are preferred because they can form a high-concentration dispersion, resulting in improvements of the haze and aggregation.

These fine particles generally form secondary particles having an average particle diameter of 0.1 to 3.0 µm. These fine particles are present in the form of aggregates of primary particles in the film and form 0.1- to 3.0-µm unevenness on the film surface. The secondary average particle diameter is preferably from 0.2 µm to 1.5 µm, more preferably from 0.4 µm to 1.2 µm, and most preferably from 0.6 µm to 1.1 µm. The primary or secondary particle diameter is defined as follows. The particles in the film are observed by a scanning electron microscope, and the diameter of the circle circumscribing the particle is taken as the particle diameter. Whereas, in another site, 200 particles are observed. The average value thereof is taken as the average particle diameter.

As the fine particles of silicon dioxide, there can be used commercially available products such as AEROSIL R972, R972V, R974, R812, 200, 200V, 300, R202, OX50, TT600 (all manufactured by Nippon Aerosil). The fine particles of zirconium oxide are commercially available under the trade names of AEROSIL R976 and R811 (all manufactured by Nippon Aerosil).

Out of these, AEROSIL 200V and AEROSIL R972V are fine particles of silicon dioxide having a primary average particle diameter of 20 nm or less and an apparent specific gravity of 70 g/l or more, and these are particularly preferable as these have a large effect of reducing the friction coefficient of optical films while maintaining the low turbidity of the optical film.

In the present invention, in order to obtain a cellulose acylate film having particles with a small secondary average particle diameter, some techniques are conceivable for preparing dispersions of fine particles. For example, there is the following method: a fine particle dispersion obtained by stirring and mixing a solvent and fine particles is previously formed; the fine particle dispersion is added to a small amount of a cellulose acylate solution separately prepared, and dissolved therein with stirring; and the resulting solution is further mixed with a main cellulose acylate solution (dope solution). This method is a preferable preparation method in that the dispersibility of silicon dioxide fine particles is good, and that silicon dioxide fine particles are less likely to further aggregate again. Other than this, there is another method as follows: a small amount of cellulose ester is added to a solvent, and dissolved therein with stirring; then, fine particles are added thereto, and dispersed therein by means of a dispersing machine, so that the resulting dispersion is taken as a solution with added fine particles; then, the solution with added fine particles is sufficiently mixed with a dope solution by means of an inline mixer. The present invention is not limited to these methods. However, the concentration of silicon dioxide when silicon dioxide fine particles are mixed with a solvent or the like, and dispersed therein is preferably in a range of 5 to 30% by mass, further preferably 10 to 25% by mass, and most preferably 15 to 20% by mass. A higher dispersion concentration is preferred because the solution turbidity becomes lower relative to the amount added, resulting in improvements of the haze and the aggregate. The amount of the mat agent fine particles to be added in the final cellulose acylate dope solution is preferably in a range of 0.01 to 1.0 $g/m^3$, further preferably 0.03 to 0.3 $g/m^3$, and most preferably 0.08 to 0.16 $g/m^3$.

As the solvents to be used for dispersion, lower alcohols are preferred. Examples thereof include methyl alcohol, ethyl alcohol, propyl alcohol, isopropyl alcohol, and butyl alcohol. Other solvents than lower alcohols have no particular limitation. However, the solvents to be used for the film formation of cellulose ester are preferably used.

Other than an optical anisotropy-reducing compound and a UV absorber, to the cellulose acylate film used as the support may be added various additives (e.g., a plasticizer, a UV inhibitor, a degradation inhibitor, a release agent, and an infrared absorber). They may be each either a solid or an oily substance. Namely, it has no particular limitation on the melting point or the boiling point. For example, mention may be made of mixing of ultraviolet absorbing materials of 20° C. or less and 20° C. or more, and, similarly, mixing of a plasticizer. For example, they are described in JP2001-151901A or the like. Still further, examples of the infrared absorber are described in, for example, JP2001-194522A. For the timing of addition, the additives may be added at any timing in the dope production process. The additives may be added to the final step in the dope production process. Still further, the amount of each material to be added has no particular limitation so long as it allows the function to be exerted. When the cellulose acylate film is formed in a multilayered structure, the types and the amounts of additives for respective layers may be different. The method described in, for example, JP2001-151902A, may be used. For the details thereof, there can be used the materials described in details on pp. 16 to 22 in Journal of Technical Disclosure (KOUKAI GIHOU) from Japan Institute of Invention and Innovation, (Technical Disclosure No. 2001-1745, issued on Mar. 15, 2001, Institute of Invention and Innovation).

Other Optional Layers:

The printing paper in accordance with the present invention may include other optional layers. For example, a protective layer for protecting a coating-type patterned linear polarizing layer, and an adhesive layer for adhesion. Since a distance between an image-receiving layer and a patterned linear polarizing layer has an effect on the occurrence of crosstalk or ghost images, when other optional layers are disposed between the image-receiving layer and the patterned linear polarizing layer, the thickness thereof is preferably thin. For example, where the distance between the patterned linear polarizing layer and the image-receiving layer is long due to the disposition of an adhesive layer or a protective layer between the patterned linear polarizing layer and the image-receiving layer, crosstalk takes place when an image is obliquely observed in the direction not parallel to the boundary line of each pattern. The crosstalk occurring upon oblique observation of images can be reduced by sufficiently decreasing a ratio of the distance d between the patterned linear polarizing layer and the image-receiving layer: the distance p between pattern boundaries. The ratio of d/p is preferably 3 or less, more preferably 2 or less, still more preferably 1 or less, and even more preferably 0.8 or less. If the distance p between pattern boundaries is excessively large, this results in deterioration of image quality. Therefore, in order to decrease the ratio of d/p while maintaining p low to some extent, the distance d between the patterned linear polarizing layer and the image-receiving layer is preferably 2 mm or less, more preferably 1 mm or less, still more preferably 500 μm or less, even more preferably 200 μm or less, and particularly preferably 100 μm or less. In particular, if the distance d is 20 μm or less, the occurrence of crosstalk can be greatly reduced even when an image is watched from the inclined direction.

Method for Producing Printing Paper:

An example of the method for producing a printing paper in accordance with the present invention is as follows.

First, a photo-aligning material is applied onto the surface of a polymer film, thereby forming a film, and a photo-aligned film consisting of first and second photo-aligned film domains whose alignment axes are at an angle of 90° with respect to each other is formed through pattern exposure.

A liquid crystal composition containing a dichroic dye is applied onto the surface of the patterned photo-aligned film, and the formed coating is fixed to a desired alignment state to thus form a coating-type linear polarizing film. The resulting linear polarizing layer becomes a patterned linear polarizing layer having first and second domains whose polarizing axes are orthogonal to each other, by means of alignment control force of the patterned photo-aligned film. On the surface of the linear polarizing layer, a polymer film functioning as a protective layer may be laminated.

Then, on the surface of the linear polarizing layer (if desired, on the surface of the polymer film in an embodiment in which a polymer film serving as a protective layer is laminated), a material for forming an image-receiving layer is applied and dried to form an image-receiving layer. Alternatively, an image-receiving layer is formed on a transparent support, a laminate is prepared separately, and the laminate may be adhesively attached to the surface of the linear polarizing layer or to the rear surface of the transparent support made of a polymer film and supporting the linear polarizing layer.

If desired, a quarter-wave layer may be formed by applying a curable liquid crystal composition containing rod-like liquid crystals or discotic liquid crystals onto the rear surface of the transparent support made of a polymer film and supporting the linear polarizing layer (surface opposite to the side with the formation of the linear polarizing film), and subjecting the rod-like liquid crystals to horizontal alignment or subjecting the discotic liquid crystals to vertical alignment. The resulting quarter-wave layer has an in-plane slow axis in the predetermined direction, but the in-plane slow axis and the polarizing axis of one of first and second domains of the linear polarizing layer are at an angle of +45° with respect to each other and the in-plane slow axis and the polarizing axis of the other one of first and second domains are at an angle of −45°. For the purpose of controlling the in-plane slow axis, an alignment film such as a rubbing-aligned film or a photo-aligned film may also be used. In other words, an alignment film is formed on the rear surface of the transparent support and then a quarter-wave layer may be formed on the surface of the alignment film. Further, a birefringent polymer film as the quarter-wave layer may be attached to the rear surface of the transparent support which supports the linear polarizing layer. Further, the linear polarizing layer-supporting transparent support itself may be a birefringent polymer film that functions as a quarter-wave layer.

There is no particular limitation on the thickness of the printing paper in accordance with the present invention. Similar to ordinary printing paper, the thickness of the printing paper in accordance with the present invention is preferably in a range of 10 to 1000 μm, and more preferably 20 to 200 μm.

Further, the printing paper in accordance with the present invention is generally preferably light-transmissive. In other words, throughout the printing paper, the light transmittance is preferably 70% or more, more preferably 80% or more, and particularly preferably 90% or more.

Further, the printing paper in accordance with the present invention is not limited to embodiments shown in FIGS. 1 to 6. The printing paper may have an additional functional layer, for example, an oxygen barrier layer for preventing an invasion of oxygen, a hard coat layer, or an antireflective layer. Further, the printing paper may have a transparent cured resin layer formed by curing a clear resin composition, as a protective layer. These layers may be disposed, for example, as a protective layer for a linear polarizing layer (in particular, a linear polarizing layer formed from a liquid crystal composition containing a dichroic dye). Further, as shown in FIG. 6, substantially in order to functionally convert a patterned linear polarizing layer into a circular polarizing layer, an embodiment of laminating a quarter-wave layer on the patterned linear polarizing layer is also preferable. By laminating the quarter-wave layer on the patterned linear polarizing layer such that the slow axis of the quarter-wave layer is at an angle of 45° with respect to the slow axis of the patterned linear polarizing layer, the light passed through the printing paper becomes a circularly polarized light, and a viewer with a circular polarized glasses can recognize a stereoscopic image without the occurrence of crosstalk, even when the viewer leans his/her face to the right or left side.

2. Stereoscopic Image Printed Matter and Method for Producing the Same

Further, the present invention relates to a stereoscopic image printed matter using the printing paper in accordance with the present invention.

The stereoscopic image printed matter in accordance with the present invention is a stereoscopic image printed matter having the printing paper in accordance with the present invention, and a left eye image and a right eye image having a parallax therebetween and formed on the light-transmitting image-receiving layer of the printing paper, wherein pixels constituting each of the left eye image and the right eye image are formed at positions corresponding to a first domain and a second domain of the linear polarizing layer of the printing paper.

A first embodiment of the method for producing a stereoscopic image printed matter in accordance with the present invention is an embodiment using a printing paper having a reversal film, including forming a left eye image and a right eye image having a parallax therebetween at positions corresponding to a first domain and a second domain of the linear polarizing layer of the printing paper, respectively, by a light jet method.

There is no particular limitation on the light jet recording device that can be used in the present embodiment. Based on the digital data, a light jet recording device capable of recording by laser light can be used variously.

A second embodiment of the method for producing a stereoscopic image printed matter in accordance with the present invention is a method for producing a stereoscopic image printed matter, including superimposing a thermal transfer sheet containing a dye on a light-transmitting image-receiving layer of the printing paper in accordance with the present invention; and heating the thermal transfer sheet by a thermal head whose heat generation is controlled by means of electrical signals, thereby transferring the dye to form a left eye image and a right eye image which have a parallax therebetween at positions corresponding to a first domain and a second domain of the linear polarizing layer of the printing paper.

There is no particular limitation on the thermal transfer sheet (ink sheet) used in the second embodiment. Generally, any ink sheet may be used which is provided with a dye layer containing a diffusion transfer dye on a support.

The means of imparting thermal energy in thermal transfer may be any conventional known impartation means. For example, using a recording device such as a thermal printer (e.g., Hitachi's trade name, Video Printer VY-100) or the like, the recording time may be controlled, and thermal energy on a level of from 5 to 100 $mJ/mm^2$ or so may be given to fully attain the intended object.

Further, a third embodiment of the method for producing a stereoscopic image printed matter in accordance with the present invention is a method for producing a stereoscopic image printed matter, including forming a left eye image and a right eye image which have a parallax therebetween at positions corresponding to a first domain and a second domain of the linear polarizing layer of the printing paper, on a light-transmitting image-receiving layer of the printing paper in accordance with the present invention by an inkjet method.

Further, there is no particular limitation on the inkjet recording device used in the third embodiment. Any inkjet recording device may be used as long as it is a recording device equipped with an inkjet head.

In an example of the above-mentioned embodiment method, image data are digitized into image data-for-left-eye and image data-for-right-eye which have a parallax therebetween, by an image data processing device. Examples of the digitized image data include data of images captured by a digital camera, more specifically, digital data of images or the like captured by a digital camera equipped with two image pick-up lenses at right and left sides. To this image data processing device are connected a light jet recording device in the first embodiment, a thermal printer in the first embodiment, and an inkjet recording device in the second embodiment, respectively, and delineation by laser light, operation of the thermal head, and operation of the inkjet head are respectively controlled in response to digital signals transmitted from the image data processing device.

According to the foregoing embodiments, since an image can be correctly formed with a high image density on an image-receiving layer based on digital data through a light jet method, a thermal transfer method or an inkjet method, a left eye image and a right eye image which have a parallax therebetween can be respectively formed at positions corresponding to a first domain and a second domain of the linear polarizing layer of the printing paper. As a result, a stereoscopic image printed matter with reduced crosstalk and ghost images can be produced.

When the stereoscopic image printed matter produced by individual methods of the foregoing embodiments is observed from the linear polarizing layer, an image at the position corresponding to the first domain 14a is incident to viewer's eyes as a linearly polarized image of the direction determined by the polarizing axis a, and an image at the position corresponding to the second domain 14b is incident to viewer's eyes as a linearly polarized image of the direction determined by the polarizing axis b. Since polarizing axes a and b are orthogonal to each other, when it is watched by a viewer wearing a linearly polarized glasses having the correspondingly axis-aligned polarizing lenses as right and left lenses, the polarizing image from the first and second domains 14a and 14b can be made incident to only either of left and right eyes, and are recognized as stereoscopic images.

Figure 8:
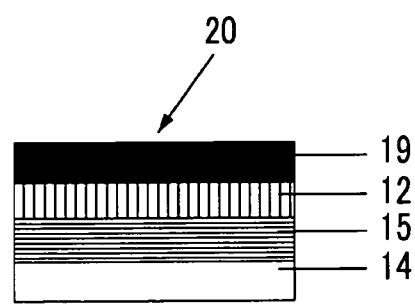
FIG. 8 is a cross-sectional schematic diagram of an example of a stereoscopic image printed matter in accordance with the present invention.

FIG. 8 shows a cross-sectional schematic diagram of an example of the stereoscopic image printed matter in accordance with the present invention which is produced by the foregoing method. The same parts as those in FIGS. 1 to 6 are identified by like numbers and details thereof are omitted.

The stereoscopic image printed matter shown in FIG. 8 is a stereoscopic image printed matter in which a left eye image and a right eye image which have a parallax therebetween are formed on the image-receiving layer 12 of the printing paper 10B of the embodiment shown in FIG. 3, by using any method of the foregoing first to third embodiments, and then a non-depolarizing reflective layer 19 is laminated on the image-receiving layer 12. The stereoscopic image printed matter shown in FIG. 8 is an embodiment in which a stereoscopic image can be observed by reflected light of outside light. The stereoscopic image printed matter in accordance with the present invention is also preferably an embodiment which is observed using transmitted light without laminating of the reflective layer 19.

Further, the embodiment of the stereoscopic image printed matter in accordance with the present invention is not limited to the above-exemplified embodiments and appropriate modifications are possible without departing from the scope and spirit of the present invention. For example, the image-receiving layer 12 may be disposed at any position as long as depolarization such as by scattering is low. On the other hand, when depolarization of the image-receiving layer 12 is high, the image-receiving layer 12 should not be disposed at the viewer side than the linear polarizing layer 14.

Reflective Layer:

The non-depolarizing reflective layer that can be used in the present embodiment is preferably, for example, a paper coated with a metallic thin film, a mirror made of a metallic thin film, a metal foil, or metal flakes suspended in plastic.

3. Method of Displaying Stereoscopic Image Printed Matter

Further, the present invention relates to a method of displaying the stereoscopic image printed matter in accordance with the present invention to a viewer. The foregoing method in accordance with the present invention is a method for providing a stereoscopic image, including preparing the stereoscopic image printed matter in accordance with the present invention, and displaying the stereoscopic image printed matter to a viewer with polarized glasses in which a lens-for-left-eye and a lens-for-right-eye are linear polarizing lens or circular polarizing lens in the opposite direction to each other.

The method of the present invention is applicable to, for example, outdoor and indoor advertising of goods.

Further, for the purpose of displaying a stereoscopic image printed matter with high brightness to a viewer, the stereoscopic image printed matter may be subjected to light irradiation from a viewer side or a rear surface side.

EXAMPLES

The present invention will be described in more detail with reference to the following Examples. Materials, amounts thereof to be used, ratios, treatment details, treatment procedure and the like given in the following Examples may be appropriately modified without departing from the scope and spirit of the present invention. Therefore, the present invention should not be construed as being limited to the following Examples.

1. Example 1

Preparation of Stereoscopic Image Printing Paper (Preparation of Image-Receiving Film for Stereoscopic Image)

A dispersion was prepared by mixing the following composition of (1) sedimentation-process silica fine particles, (2) ion-exchange water, (3) "SHALLOL DC-902P", (4) "ZA-30", and by dispersing the mixture using an ultrasonic disperser (manufactured by SMT Co., Ltd.). The resulting dispersion was heated at 45° C. and kept for 20 hours.

Thereafter, (5) boric acid, (6) a polyvinyl alcohol solution, (7) SUPERFLEX 650, and (8) ethanol were added thereto at 30° C. to prepare an ink-receiving layer coating liquid A <Composition of Coating Liquid A for Image-Receiving Layer>
(1) Sedimentation-process silica fine particles (inorganic fine particles): 10.0 parts (mixture of P-78A (particle diameter: 7.7 μm) and P-604 (particle diameter: 0.64 μm) in a ratio of 75:25 (by mass); all manufactured by Mizusawa Industrial Chemicals, Ltd.; hereinafter referred to as silica fine particles.)
(2) Ion-exchange water: 62.8 parts
(3) SHALLOL DC-902P (51.5% aqueous solution): 0.87 parts
(dispersant, manufactured by Dai-Ichi Kogyo Seiyaku Co., Ltd.)
(4) ZA-30 (zirconyl acetate): 0.54 parts
(manufactured by Daiichi Kigenso Kagaku Kogyo Co., Ltd.)
(5) Boric acid (crosslinking agent): 0.44 parts
(6) Polyvinyl alcohol (water-soluble resins) solution: 34.9 parts
   Composition—
   PVA-235: 2.43 parts
   (saponification degree: 88%, polymerization degree: 3500, manufactured by Kuraray Co., Ltd.)
   Polyoxyethylenelauryl ether: 0.08 parts
(EMULGEN 109P (10% aqueous solution), HLB value: 13.6, manufactured by Kao Corporation; surfactant)
   Diethylene glycol monobutyl ether: 0.74 parts
(BUTYCENOL 20P, manufactured by Kyowa Hakko Kirin Co., Ltd.)
   Ion-exchange water: 31.0 parts (7) SUPERFLEX 650 (25% aqueous dispersion): 2.47 parts
(manufactured by Dai-Ichi Kogyo Seiyaku Co., Ltd.)
(8) Ethanol: 1.3 parts The above-obtained coating liquid A for an image-receiving layer was applied in a coating amount of 204 ml/m$^2$ onto the undercoat surface of a biaxially stretched polyethylene terephthalate film having a thickness of 175 μm whose surface is undercoated with gelatin. At this time, 8% by mass of an aqueous solution of polyaluminum chloride (ALFINE 83, manufactured by Taimei Chemicals Co., Ltd.) was mixed in advance in a coating amount of 12.0 ml/m$^2$ in the coating liquid A for an image-receiving layer immediately prior to application.

After the application was completed, the coating film was dried in a hot-air dryer at 80° C. (air flow rate of 3 to 8 m/sec) until the concentration of the solid fraction of the coating film was 20%. This coating film exhibited a constant rate of drying during this time. The coating film was then, before the coating film exhibited a decreasing rate of drying, immersed for 3 seconds in a basic solution C with the below composition to allow the solution to adhere onto the coating film at an amount of 13 g/m$^2$, followed by further drying at 80° C. for 10 minutes.

An image-receiving film for a stereoscopic image with a post-drying thickness of 33 μm was thus prepared.

<Composition of Basic Solution C>
(1) Boric acid: 0.65 parts
(2) Ammonium zirconium carbonate: 2.5 parts
(ZIRCOZOL AC-7 (28% aqueous solution), manufactured by Daiichi Kigenso Kagaku Kogyo Co., Ltd.)
(3) Ammonium carbonate (reagent grade, manufactured by Kanto Chemical Co., Inc.): 3.5 parts
(4) Ion-exchange water: 63.3 parts
(5) Polyoxyethylenelauryl ether (surfactant): 30.0 parts
(manufactured by Kao Corporation, EMULGEN 109P (2% aqueous solution), HLB value 13.6)

[Printing on Image-Receiving Film for Stereoscopic Image]

Each of data-for-right-eye and data-for-left-eye captured by a digital camera equipped with two image pick-up lenses at right and left sides was converted into digital data, and an inkjet ink was ejected and deposited on the image-receiving layer of the image-receiving film for a stereoscopic image using a piezo-type inkjet head, thereby preparing a pixel-for-right-eye and a pixel-for-left-eye. The pixel-for-right-eye and the pixel-for-left-eye were printed out in the form of an image with alternating horizontal stripes at intervals of 254 μm.

[Preparation of Stereoscopic Image Printed Matter]
(Preparation of Transparent Support)

The following composition was introduced into a mixing tank and stirred with heating to dissolve individual components, thereby preparing a cellulose acylate solution A.

<Composition of Cellulose Acylate Solution A>
Cellulose acetate with a substitution degree of 2.86: 100 parts by mass
Triphenyl phosphate (plasticizer): 7.8 parts by mass
Biphenyldiphenyl phosphate (plasticizer): 3.9 parts by mass
Methylene chloride (first solvent): 300 parts by mass
Methanol (second solvent): 54 parts by mass
1-butanol: 11 parts by mass The following composition was introduced into another mixing tank and stirred with heating to dissolve individual components, thereby preparing an additive solution B.

<Composition of Additive Solution B>
Compound B1 (Re-reducing agent): 40 parts by mass
Compound B2 (wavelength dispersion-controlling agent): 4 parts by mass
Methylene chloride (first solvent): 80 parts by mass
Methanol (second solvent): 20 parts by mass

[Chem. 75]

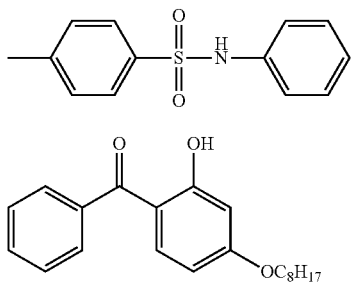

Compound B1

Compound B2

<Preparation of Cellulose Acetate Transparent Support>

To 477 parts by mass of the cellulose acetate solution A was added 40 parts by mass of the additive solution B, and the mixture was thoroughly stirred to prepare a dope. The dope was cast on a drum while being cooled to 0° C. from a casting nozzle. The film was peeled apart in the state at which the solvent content was 70% by mass, opposite ends of the film in the width direction were each fixed by a pin tenter (pin tenter as described in FIG. 3 of JP1992-1009A (JP-H4-1009A)), and the film was dried while maintaining a gap such that the stretching ratio in the transverse direction (the direction perpendicular to the machine direction) was 3% in the state having a solvent content of 3 to 5% by mass. Thereafter, the film was further dried by traveling between rolls of a thermal treatment unit, thereby preparing a cellulose acetate transparent support 1 having a thickness of 60 μm. The front Re of the support 1 was 2.0 nm.

(Preparation of Patterned Linear Polarizing Layer)
<Preparation of Photo-Aligned Film>

Onto one surface of the cellulose acetate transparent support 1 was spin-coated a 1% aqueous solution of a photo-aligning material E-1 having the structure below, followed by drying at 100° C. for one minute. The coated film was then irradiated with ultraviolet rays using an air-cooled metal halide lamp having an output of 160 W/cm (manufactured by Eye Graphics Co., Ltd.) in an atmosphere. At this time, a wire grid polarizer (ProFlux PPL02, manufactured by Moxtek) was set the direction 1, as shown in FIG. 5, followed by further exposure through a mask A (a quartz-made photomask having a pattern with a horizontal stripe width of 254 μm). Thereafter, the wire grid polarizer was set in the direction 2 to be orthogonal with respect to the direction 1, followed by further exposure through a mask B. The distance between the photomask surface and the photo-aligned film was set to be 200 μm. Ultraviolet rays used herein was irradiated at an illuminance of 100 mW/cm² in a UV-A region (integration of wavelength 380 nm to 320 nm) and a dose of 1000 mJ/cm² in a UV-A region. The resulting photo-aligned film had a thickness of 0.05 μm.

[Chem. 76]

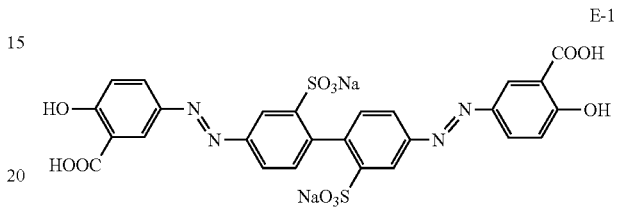

E-1

<Preparation of Patterned Linear Polarizing Layer>

To 99 parts by mass of chloroform were added 0.24 parts by mass of a yellow azo dye A2-3 having the structure given below (a compound of formula (II)), 0.33 parts by mass of a magenta azo dye A-46 having the structure given below (a compound of formula (I)), 0.37 parts by mass of a cyan azo dye A3-1 having the structure given below (a compound of formula (III)), and 0.06 parts by mass of a squarylium dye VI-5 having the structure given below, and the mixture was stirred to dissolve individual components, followed by filtration to obtain a coating liquid for a linear polarizing layer. Then, the coating liquid was applied onto the pattern-exposed photo-aligned film, followed by spontaneous cooling at room temperature to prepare a patterned linear polarizing layer. FIG. 5 is a plan view of the patterned linear polarizing layer. Polarizing axes of the patterned linear polarizing layer are orthogonal to each other, and the resulting linear polarizing layer had a thickness of 0.4 μm, a dichroic ratio of 42, and a pattern pitch of 254 μm. Further, the composition for a linear polarizing layer exhibited thermotropic liquid crystallinity and had an isotropic phase transition temperature of 240° C.

[Chem. 77]

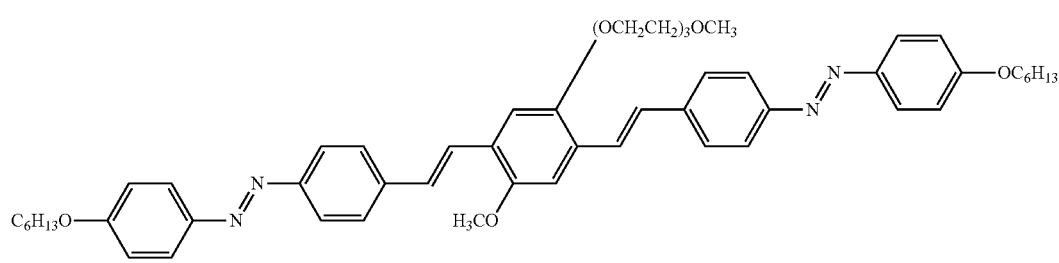

A2-3

K 138° C. N 284° C. I

[Chem. 78]

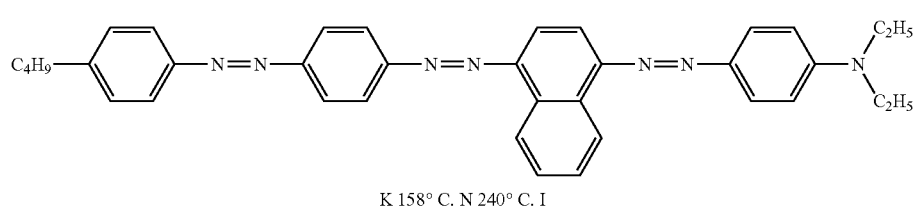

A-46

K 158° C. N 240° C. I

[Chem. 79]

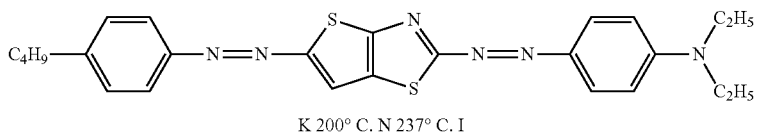

A3-1

K 200° C. N 237° C. I

[Chem. 80]

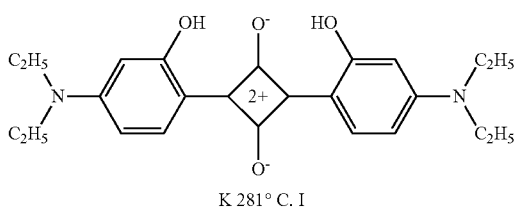

VI-5

K 281° C. I

<Laminating of Patterned Linear Polarizing Layer and Image-Receiving Film for a Stereoscopic Image>

The above-prepared patterned linear polarizing layer was adhesively attached to an image-receiving film for a stereoscopic image. In a manner such that stripes of the patterned linear polarizing layer are consistent with stripes printed on the image-receiving film for a stereoscopic image, an attachment was performed between the support side of the patterned linear polarizing layer and the image-receiving layer of the image-receiving film for a stereoscopic image. At this time, the thickness of the adhesive layer was 16 μm, the total Re of the support and the adhesive layer was 2.0 nm, and Rth thereof was 0 nm.

[Chem. 81]

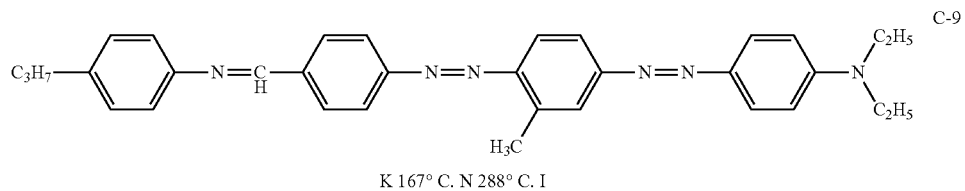

C-9

K 167° C. N 288° C. I

In this manner, a stereoscopic image printed matter having the configuration shown in FIG. 4 was obtained.

[Observation of Stereoscopic Image]

When a viewer observes the stereoscopic image printed matter from the front thereof through linearly polarized glasses, a clear stereoscopic image without crosstalk or ghost images can be observed.

Further, even when a viewer observes the stereoscopic image printed matter at an inclined angle of 30° through linearly polarized glasses, a clear stereoscopic image can be observed with virtually no recognition of crosstalk.

It is considered that the stereoscopic image printed matter exhibits no occurrence of crosstalk because the distance d between the patterned linear polarizing layer and the image-receiving layer is 76.05 μm, the pattern width p is 254 μm, and the ratio of d/p is 0.30.

2. Example 2

Preparation of Stereoscopic Image Printed Matter

A stereoscopic image printed matter was prepared in the same manner as in Example 1, except that the composition for a linear polarizing layer in preparing the patterned linear polarizing layer was changed to the following composition. At this time, the thickness of the linear polarizing layer was 0.4 μm, the dichroic ratio was 37, the total Re of the support and the adhesive layer was 2.0 nm, and Rth was 0 nm.

<Composition for Linear Polarizing Layer>

(1) Yellow azo dye A2-3: 0.2 parts by mass
(2) Magenta azo dye C-9: 0.4 parts by mass
(3) Cyan azo dye A3-1: 0.4 parts by mass
(4) Chloroform: 99 parts by mass

[Observation of Stereoscopic Image]

When a viewer observes the stereoscopic image printed matter through linearly polarized glasses, a clear stereoscopic image without crosstalk or ghost images can be observed.

3. Example 3

Preparation of Stereoscopic Image Printed Matter

A stereoscopic image printed matter was prepared in the same manner as in Example 1, except that the composition for a linear polarizing layer in preparing the linear polarizing layer was changed to the following composition. At this time, the thickness of the linear polarizing layer was 0.8 μm, the dichroic ratio was 71, the total Re of the support and the adhesive layer was 2.0 nm, and Rth was 0 nm.

<Composition for Linear Polarizing Layer>

(1) Magenta azo dye A-16: 1.2 parts by mass
(2) Magenta azo dye B-4: 0.8 parts by mass
(3) Chloroform: 98 parts by mass

[Chem. 82]

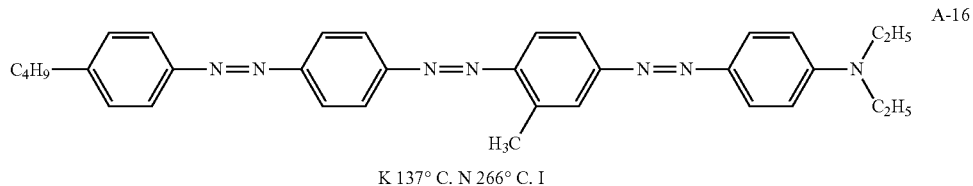

A-16

K 137° C. N 266° C. I

[Chem. 83]

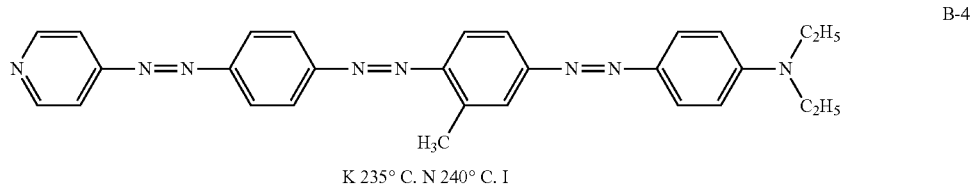

B-4

K 235° C. N 240° C. I

[Observation of Stereoscopic Image]

When a viewer observes the stereoscopic image printed matter through linearly polarized glasses, a clear stereoscopic image without crosstalk or ghost images can be observed.

4. Example 4

Preparation of Stereoscopic Image Printed Matter (Preparation of Quarter-Wave Layer)

A 4% aqueous solution of polyvinyl alcohol "PVA103" by manufactured by Kuraray Co., Ltd. was spin-coated on the surface of the patterned linear polarizing layer prepared in Example 1, followed by drying at 80° C. for one minute. Thereafter, one forward/backward rubbing treatment at 400 rpm was performed at an angle of 45° with respect to the polarizing axis a of the first domain of the linear polarizing layer, thereby preparing a patterned linear polarizing layer with a rubbing-aligned film attached thereto. The resulting rubbing-aligned film had a thickness of 0.8 μm.

The following composition for a quarter-wave layer was prepared, filtered through a polypropylene filter having a pore diameter of 0.2 μm, and then used as a coating liquid for ¼ wavelength. The coating liquid was applied, dried at a film surface temperature of 100° C. for one minute to be a liquid crystal phase, subjected to uniform alignment, cooled to a temperature of 80° C., and fully irradiated with 20 mW/cm² for 20 seconds, followed by fixing the alignment state to prepare a quarter-wave layer. The film thickness was 0.8 μm, the tilt angle was nearly 90°, Re at the measuring wavelength of 550 nm was 138 nm, and Rth was −40 nm.

<Composition for Quarter-Wave Layer>

Discotic liquid crystal E-1: 100 parts by mass
Alignment film interface aligning agent (II-1): 1.0 parts by mass
Air interface aligning agent (P-1): 0.4 parts by mass
Photopolymerization initiator: 3.0 parts by mass
(IRGACURE 907, manufactured by Ciba Specialty Chemicals K.K. Japan)
Sensitizer (KAYACURE-DETX, manufactured by Nippon Kayaku Co., Ltd.): 1.0 parts by mass
Methyl ethyl ketone: 300 parts by mass

[Chem. 84]

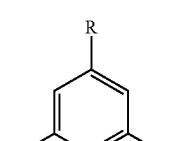

E-1

Discotic liquid crystal

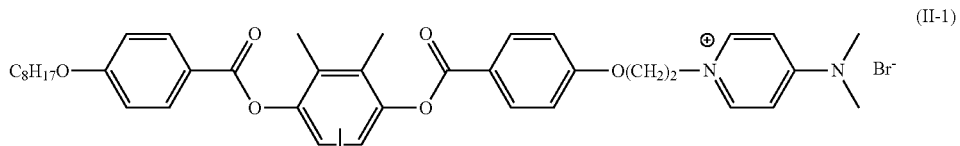

(II-1)

Alignment film interface aligning agent (P-1)

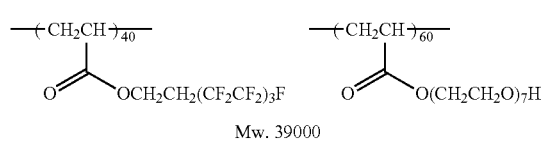

Mw. 39000

Air interface aligning agent

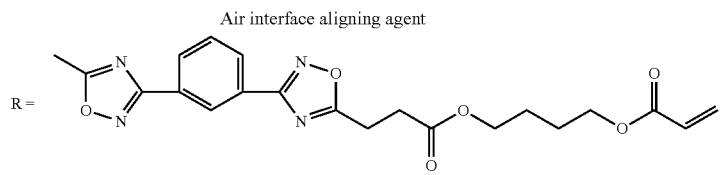

(Laminating of Patterned Linear Polarizing Layer with Attached Quarter-Wave Layer and Stereoscopic Image Printing Paper)

The above-prepared patterned linear polarizing layer with a quarter-wave layer attached thereto was adhesively attached to the image-receiving film for a stereoscopic image prepared in Example 1.

In a manner such that stripes of the patterned linear polarizing layer were consistent with stripes printed on the image-receiving layer of the image-receiving film for a stereoscopic image, an attachment was performed between the support side of the patterned linear polarizing layer and the image-receiving film for a stereoscopic image. At this time, the thickness of the adhesive layer was 16 μm, the total Re of the support and the adhesive layer was 2.0 nm, and Rth thereof was 0 nm.

In this manner, a stereoscopic image printed matter having the configuration shown in FIG. 6 was obtained.

[Observation of Stereoscopic Image]

When a viewer observes the stereoscopic image printed matter through circular polarized glasses, a clear stereoscopic image without crosstalk or ghost images can be observed.

Further, even when a viewer observes the stereoscopic image printed matter at an inclined angle of 30° through circular polarized glasses, a clear stereoscopic image can be observed with virtually no recognition of crosstalk.

It is considered that the stereoscopic image printed matter exhibits no occurrence of crosstalk because the distance d between the patterned linear polarizing layer and the image-receiving layer is 16 μm, the pattern width p is 254 μm, and the ratio of d/p is 0.063.

5. Example 5

Preparation of Stereoscopic Image Printed Matter

An aluminum reflective layer was laminated on the upper layer of the image-receiving layer of the image-receiving film for a stereoscopic image prepared in Example 1, thereby preparing a stereoscopic image printed matter as shown in FIG. 8.

[Observation of Stereoscopic Image]

When a viewer observes the stereoscopic image printed matter through linearly polarized glasses, a clear stereoscopic image without crosstalk or ghost images can be observed.

6. Example 6

Preparation of Stereoscopic Image Printed Matter

A stereoscopic image printed matter was prepared in the same manner as in Example 1, except that the method of producing a patterned linear polarizing layer was changed to the following method. Specifically, the stereoscopic image printed matter was prepared with reference to the method of Example 1 described in JP1995-261024A (JP-H7-261024A).

4-Methacryloyloxyazobenzene was dissolved in benzene to make a 20% by mass solution which was then subjected to polymerization, using azobisisobutyronitrile as a polymerization initiator under deaeration at 60° C. for 12 hours. The solution of 10 parts by mass of the resulting polymer containing azobenzene in 90 parts by mass of toluene was spin-coated on one surface of the support, and this substrate was dried by heating at 105° C. for 10 minutes. The light source was an ultra-high pressure mercury lamp having an output of 500 W/h. Light being emitted from the light source was changed into visible light using a cut-off filter (>400 nm). Using a polarizing plate, visible light was changed into linearly polarized light. The linearly polarized light was irradiated from a distance of 50 cm at room temperature for 1 minute to the coated surface of the substrate which was placed parallel to the polarizing axis of the polarizing plate. Patterning was carried out in the same manner as in Example 1. One part by mass of EMULGEN 108 (nonionic surfactant, manufactured by Kao Corporation) was added to 10 parts by mass of C.I. Direct Blue 67 having lyotropic liquid crystallinity, and the mixture was diluted with 89 parts by mass of distilled water to make an aqueous solution. The resulting dye aqueous solution was spin-coated on the linearly polarized light-irradiated surface of the substrate, followed by drying under the conditions of 25° C. and 50% RH. The dichroic ratio of the linear polarizing layer at this time was 16.

[Observation of Stereoscopic Image]

When a viewer observes the stereoscopic image printed matter through linearly polarized glasses, the observed image may be recognized as a stereoscopic image but crosstalk was observed. It can be understood that such a result is due to a low dichroic ratio of the patterned linear polarizing layer.

7. Example 7

Preparation of Stereoscopic Image Printing Paper

<Preparation of Image-Receiving Layer>

A corona discharge treatment was applied to the surface opposite to the side where the patterned linear polarizing layer prepared in Example 1 was formed, and then a gelatin undercoat layer containing sodium dodecyl benzene sulfonate was provided therein. Further, an intermediate layer A having the following composition was applied by using a bar coater, followed by drying. Subsequently, a receiving layer A having the following composition was applied by using a bar coater, followed by drying. The application by a bar coater was carried out at 40° C., and the drying was carried out at 50° C. for each layer for 16 hours. The application was carried out such that the coating amount upon drying of each layer was 1.0 g/m² for the intermediate layer A and 3.0 g/m² for the receiving layer A1.

<Intermediate Layer A>
Polyester resin (trade name: BYRON 200, manufactured by Toyobo Co. Ltd.): 10 parts by mass
Fluorescent whitening agent: 1 part by mass
(trade name: UVITEX OB, manufactured by Ciba Specialty Chemicals K.K. Japan)
Titanium oxide: 30 parts by mass
Methyl ethyl ketone/toluene (mass ratio: 1/1): 90 parts by mass <Receiving Layer A>
Polyester resin: 100 parts by mass
(resin described in Example 1-1 of JP1990-265789A (JP-H2-265789A))
Amino-modified silicone: 5 parts by mass
(trade name: X-22-3050C, manufactured by Shin-Etsu Chemical Co., Ltd.)
Epoxy-modified silicone epoxy-modified silicone: 5 parts by mass
(trade name: X-22-300E, manufactured by Shin-Etsu Chemical Co., Ltd.)
Methyl ethyl ketone/toluene (mass ratio: 1/1): 400 parts by mass In this manner, a stereoscopic image printing paper was prepared.

(Preparation of Ink Sheet for Stereoscopic Image)

A polyester film having a thickness of 6.0 μm (trade name: RUMIRER, manufactured by Toray Industries, Inc.) was used as a substrate film. A heat-resistant slip layer (thickness: 1 μm) was formed on the rear side of the film, and the surface was coated monochromatically with each of yellow, magenta and cyan compositions having the following composition formula (post-drying coating amount: 1 g/m²).

Yellow Composition
Dye (trade name: MACROLEX YELLOW 6G, manufactured by Bayer AG): 5.5 parts by mass
Polyvinyl butyral resin: 4.5 parts by mass
(trade name: S-LEC BX-1, manufactured by Sekisui Chemical Co., Ltd.)
Methyl ethyl ketone/toluene (mass ratio: 1/1): 90 parts by mass
Magenta Composition
Magenta dye (DISPERSE RED 60): 5.5 parts by mass
Polyvinyl butyral resin: 4.5 parts by mass
(trade name: S-LEC BX-1, manufactured by Sekisui Chemical Co., Ltd.)
Methyl ethyl ketone/toluene (mass ratio: 1/1): 90 parts by mass
Cyan Composition
Cyan dye (SOLVENT BLUE 63): 5.5 parts by mass
Polyvinyl butyral resin: 4.5 parts by mass
(trade name: S-LEC BX-1, manufactured by Sekisui Chemical Co., Ltd.)
Methyl ethyl ketone/toluene (mass ratio: 1/1): 90 parts by mass

[Preparation of Stereoscopic Image Printed Matter]
(Formation of Images for Right Eye and Left Eye)

The ink sheet and the printing paper were worked to be made loadable in a sublimation printer DPB1500 (trade name, manufactured by Nidec Copal Corporation).

At a high-speed printing mode, image outputs were produced by localizing a right eye pixel in the part for right eye of the patterned linear polarizing layer and localizing a left eye pixel in the part for the left eye of the patterned linear polarizing layer, thereby preparing a stereoscopic image printed matter.

[Observation of Stereoscopic Image]

When a viewer observes the stereoscopic image printed matter from the front thereof through linearly polarized glasses, a clear stereoscopic image without crosstalk or ghost images can be observed.

Further, even when a viewer observes the stereoscopic image printed matter at an inclined angle of 30° through linearly polarized glasses, a clear stereoscopic image can be observed with virtually no recognition of crosstalk.

It is considered that the stereoscopic image printed matter exhibits no occurrence of crosstalk because the distance d between the patterned linear polarizing layer and the image-receiving layer is 60.05 μm, the pattern width p is 254 μm, and the ratio of d/p is 0.236.

8. Example 8

Preparation of Reversal Film for Stereoscopic Image

A reversal film (FUJICHROME Velvia 50, manufactured by Fujifilm Corporation) was prepared.

Using a digital camera equipped with two image pick-up lenses at right and left sides (FinePix Real 3D W1, manufactured by Fujifilm Corporation), a right eye image and a left eye image were prepared. Then, an image with alternating a right eye image and a left eye image at intervals of 200 μm was prepared using software for preparing a 3D image (Stripper). Finally, the image data were output on the above commercially available reversal film by using light jet 2080 (resolution: 1016 dpi, reversal (RDPIII)), thereby obtaining a transparent image for a 3D stereograph (effective screen size: 178 mm×232 mm).

<Preparation of Patterned Linear Polarizing Layer>

A cellulose acylate transparent support 1 was prepared in the same manner as in Example 1, and similarly, a patterned photo-aligned film and a patterned linear polarizing layer were formed thereon.

<Laminating of Patterned Linear Polarizing Layer and Image-Receiving Film for a Stereoscopic Image>

The above-prepared patterned linear polarizing layer was adhesively attached to an image-receiving film for a stereoscopic image. In a manner such that stripes of the patterned linear polarizing layer are consistent with stripes printed on the image-receiving film for a stereoscopic image, an attachment was performed between the support side of the patterned linear polarizing layer and the image-receiving layer of the image-receiving film for a stereoscopic image. At this time, the thickness of the adhesive layer was 16 μm, the total Re of the support and the adhesive layer was 2.0 nm, and Rth thereof was 0 nm.

In this manner, a stereoscopic image printed matter was obtained.

[Observation of Stereoscopic Image]

When a viewer observes the stereoscopic image printed matter from the front thereof through linearly polarized glasses, a clear stereoscopic image without crosstalk or ghost images can be observed.

Further, even when a viewer observes the stereoscopic image printed matter at an inclined angle of 30° through linearly polarized glasses, a clear stereoscopic image can be observed with virtually no recognition of crosstalk.

It is considered that the stereoscopic image printed matter exhibits no occurrence of crosstalk because the distance d between the patterned linear polarizing layer and the image-receiving layer is 76.05 μm, the pattern width p is 254 μm, and the ratio of d/p is 0.299.

9. Comparative Example 1

A laminate having the same configuration as in Example 1 was prepared, except that an image-receiving film was not formed.

An image in the same manner as in Example 1 was formed on the surface of the support of the patterned linear polarizing layer according to an inkjet method, but the formed image density was low, and the dye migrated out of the support, thus being incapable of forming a desired image. As a result, even when observed with polarized glasses, the observed image could not be recognized as a stereoscopic image.

10. Comparative Example 2

A laminate having the same configuration as in Example 7 was prepared, except that an image-receiving film was not formed. An image was formed in the same manner as in Example 7 according to a thermal transfer method, but the formed image density was low, and the dye migrated out of the cellulose acetate film, thus being incapable of forming a desired image. As a result, even when observed with polarized glasses, the observed image could not be recognized as a stereoscopic image.

11. Comparative Example 3

A laminate having the same configuration as in Example 8 was prepared, except that only a support film was disposed with the removal of an emulsion layer from a reversal film, in place of using the reversal film. The stereoscopic image was observed in the same manner as in Example 8. However, even when observed with polarized glasses, the observed image could not be recognized as a stereoscopic image.

What is claimed is:

1. A printing paper for printing a stereoscopic image, comprising:
    a light-transmitting image-receiving layer; and
    a linear polarizing layer,
    wherein the linear polarizing layer is patterned in a first domain and a second domain whose directions of polarizing axes are at an angle of 90° with respect to each other,
    wherein the linear polarizing layer is a coating-type linear polarizing layer formed by coating a liquid crystal composition containing a dichroic dye.

2. The printing paper according to claim 1, wherein the linear polarizing layer is formed of a liquid crystal composition containing at least one of dichroic dyes represented by formula (I), formula (II), formula (III), formula (IV) or formula (VI) below Formula (I)

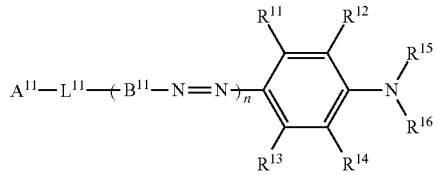

(In Formula (I), $R^{11}$ to $R^{14}$ each independently represent a hydrogen atom or a substituent; $R^{15}$ and $R^{16}$ each independently represent a hydrogen atom or an alkyl group which may have a substituent; $L^{11}$ represents —N═N—, —N═CH—, —N═CH—, —C(═O)O—, —OC(═O)—, or —CH═CH—; $A^{11}$ represents a phenyl group which may have a substituent, a naphthyl group which may have a substituent, or an aromatic heterocyclic group which may have a substituent; $B^{11}$ represents a divalent aromatic hydrocarbon group or divalent aromatic heterocyclic group which may have a substituent; and n denotes an integer of 1 to 5, and when n is 2 or more, plural $B^{11}$'s may be the same as or different from each other)

Formula (II)

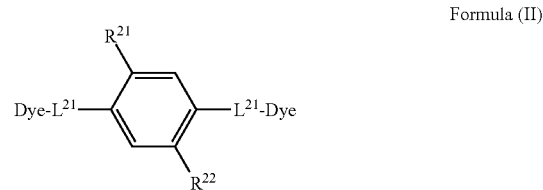

(In Formula (II), $R^{21}$ and $R^{22}$ each represent a hydrogen atom, an alkyl group, an alkoxy group, or a substituent represented by -$L^{22}$-Y, provided that at least one of $R^{21}$ and $R^{22}$ represents a group other than a hydrogen atom; $L^{22}$ represents an alkylene group wherein one $CH_2$ group or two or more non-adjacent $CH_2$ groups present in the alkylene group may be substituted by —O—, —COO—, —OCO—, —OCOO—, —NRCOO—, —OCONR—, —CO—, —S—, —SO_2—, —NR—, —NRSO_2—, or —SO_2NR— (R represents a hydrogen atom or an alkyl group having 1 to 4 carbon atoms); Y represents a hydrogen atom, a hydroxy group, an alkoxy group, a carboxyl group, a halogen atom, or a polymerizable group; each of $L^{21}$ represents a linking group selected from the group consisting of an azo group (—N═N—), a carbonyloxy group (—C(═O)O—), an oxycarbonyl group (—O—C(═O)—), an imino group (—N═CH—), and vinylene group (—C═C—); each of Dye represents an azo dye residue represented by formula (IIa) below;

(IIa)

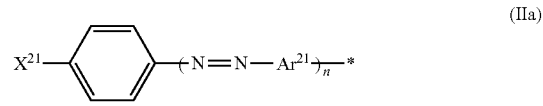

In formula (IIa), * represents a binding site to $L^{21}$; $X^{21}$ represents a hydroxy group, a substituted or unsubstituted alkyl group, a substituted or unsubstituted alkoxy group, an unsubstituted amino group, or a mono or dialkylamino group; each of $Ar^{21}$ represents an aromatic hydrocarbon ring group or aromatic heterocyclic group which may have a substituent; and n denotes an integer of 1 to 3, and when n is 2 or more, two $Ar^{21}$ may be the same as or different from each other)

Formula (III)

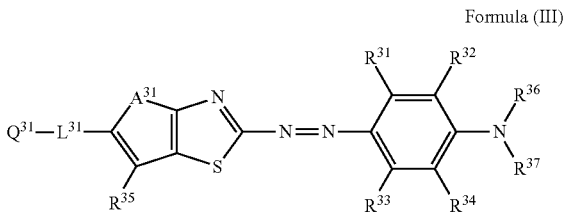

(In Formula (III), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, aromatic heterocyclic group or cyclohexane ring group which may have a substituent; $L^{31}$ represents a divalent linking group; and $A^{31}$ represents an oxygen atom or a sulfur atom)

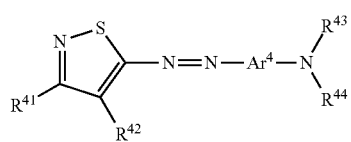

Formula (IV)

(In Formula (IV), $R^{41}$ and $R^{42}$ each represent a hydrogen atom or a substituent, or alternatively $R^{41}$ and $R^{42}$ taken together may form a ring; $Ar^4$ represents a substituted or unsubstituted divalent aromatic hydrocarbon group or aromatic heterocyclic group; and $R^{43}$ and $R^{44}$ each represent a hydrogen atom or a substituted or unsubstituted alkyl group, or alternatively $R^{43}$ and $R^{44}$ taken together may form a heterocyclic ring)

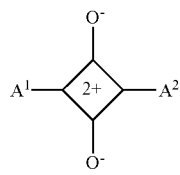

Formula (VI)

(In Formula (VI), $A^1$ and $A^2$ each independently represent a substituted or unsubstituted hydrocarbon ring group or heterocyclic group).

3. The printing paper according to claim 1, wherein the linear polarizing layer is formed by alignment immobilization of a dichroic dye composition which is alignment-controlled by a pattern-exposed photo-aligned film.

4. The printing paper according to claim 1, wherein the light-transmitting image-receiving layer is a layer formed by any unit of coating unit, spray unit and dropping unit.

5. The printing paper according to claim 1, wherein the light-transmitting image-receiving layer is an image-receiving layer which is capable of receiving an image by silver halide photography, thermal transfer method or inkjet method.

6. The printing paper according to claim 1, wherein the light-transmitting image-receiving layer is an image-receiving layer capable of receiving an image by silver halide photography and has a blue photosensitive emulsion layer, a green photosensitive emulsion layer and a red photosensitive emulsion layer.

7. The printing paper according to claim 1, wherein the light-transmitting image-receiving layer is an image-receiving layer capable of receiving an image by a thermal transfer method, and contains at least one dyeability-receiving polymer.

8. The printing paper according to claim 1, wherein the image-receiving layer is an image-receiving layer capable of receiving an image by an inkjet method, and is formed of a composition containing at least a water-soluble polymer and inorganic fine particles.

9. A printing paper for printing a stereoscopic image, comprising:
  a light-transmitting image-receiving layer; and
  a linear polarizing layer,
  wherein the linear polarizing layer is patterned in a first domain and a second domain whose directions of polarizing axes are at an angle of 90° with respect to each other,
  wherein the printing paper has a quarter-wave layer on an upper layer of the linear polarizing layer, and a polarizing axis of the linear polarizing layer and a slow axis of the quarter-wave layer are at an angle of ±45°, and
  wherein the quarter-wave layer is formed by curing a curable liquid crystal composition.

10. A stereoscopic image printed matter, comprising:
  a printing paper for printing a stereoscopic image, comprising:
    a light-transmitting image-receiving layer; and
    a linear polarizing layer;
    wherein the linear polarizing layer is patterned in a first domain and a second domain whose directions of polarizing axes are at an angle of 90° with respect to each other;
  a left eye image and a right eye image formed on a light-transmitting image-receiving layer of the printing paper and having a parallax therebetween; and
  a non-depolarizing reflective layer at the side opposite to the viewing side of a viewer,
  wherein pixels constituting each of the left eye image and the right eye image are formed at positions corresponding to a first domain and a second domain of the linear polarizing layer of the printing paper.

* * * * *